US006212524B1

(12) United States Patent
Weissman et al.

(10) Patent No.: US 6,212,524 B1
(45) Date of Patent: *Apr. 3, 2001

(54) METHOD AND APPARATUS FOR CREATING AND POPULATING A DATAMART

(75) Inventors: Craig David Weissman, Belmont; Gregory Vincent Walsh, Cupertino; Lynn Randolph Slater, Jr., Fremont, all of CA (US)

(73) Assignee: E.piphany, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/073,752

(22) Filed: May 6, 1998

(51) Int. Cl.[7] ....................................................... G06F 17/30
(52) U.S. Cl. ................................................ 707/101; 707/3
(58) Field of Search ........................ 707/1–10, 100–104, 707/200–206

(56) References Cited

U.S. PATENT DOCUMENTS

| 5,386,556 | * | 1/1995 | Hedin et al. | 707/4 |
| 5,550,971 | * | 8/1996 | Brunner et al. | 707/3 |
| 5,659,724 | * | 8/1997 | Borgida et al. | 707/3 |
| 5,675,785 | * | 10/1997 | Hall et al. | 707/102 |
| 5,806,060 | * | 9/1998 | Borgida et al. | 707/3 |
| 5,995,958 | * | 11/1999 | Xu | 707/3 |

OTHER PUBLICATIONS

Kimball, R., "The Data Warehouse Toolkit", (1996) John–Wiley & Sons, Inc., 388 pages (includes CD ROM).
Chawathe, S. et al., "Change Detection in Hierarchically Structured Information", *SIGMOD Record*, vol. 25, No. 2, Jun. 1996, pp. 493–504.
Chawathe, S. et al., "Meaningful Change Detection in Structured Data",Proceedings of the 1997 ACM SIGMOD International Conference, ACM Press, 1997, pp. 26–37.
Labio, W. et al. "Efficient Snapshot Differential Algorithms for Data Warehousing", Department of Computer Science, Stanford University, (1996), pp. 1–13.
Wiener, J. et al., "A System Prototype for Warehouse View Maintenance", *The Workshop on Materialized Views*, pp. 26–33, Montreal, Canada, Jun. 1996.
Kawaguchi, A. et al., "Concurrency Control Theory for Deferred Materialized Views", Database Theory–ICDT '97, Proceedings of the 6th International Conference, Delphi, Greece, Jan. 1997, pp. 306–320.
Zhuge, Y. et al., "Consistency Algorithms for Multi–Source Warehouse View Maintenance", *Distributed and Parallel Databaes*, vol. 6, pp. 7–40 (1998), Kluwer Academic Publishers.
Zhuge, Y. et al., "View Maintenance in a Warehousing Environment", *SIGMOD Record*, vol. 24, No. 2, Jun. 1995, pp. 316–327.
Widom, J., "Research Problems in Data Warehousing", Proc. of 4th Int'l Conference on Information and Knowledge Management (CIKM), Nov. 1995, 6 pages.

(List continued on next page.)

Primary Examiner—Ruay Lian Ho
(74) Attorney, Agent, or Firm—Skjerven Morrill MacPherson LLP; Fabio E. Marino

(57) ABSTRACT

A method of generating a datamart is described. The datamart includes tables having rows and columns. The method comprises accessing a description of a schema. The schema defines the relationships between the tables and columns. The description further defines how data is to be manipulated and used to populate the tables in the datamart. That is, the description defines the semantic meaning of the data. The description is further used to create a set of commands to create the tables. The commands are executed causing the creation of the tables. Importantly, when the semantic meaning is associated with the column and rows, programs for manipulating and propagating data into those columns and rows are automatically defined. Previously, consultants would have to hand code the creation, manipulation, and population programs for a datamart. Thus, the amount of work required to create and populate the datamart is significantly reduced.

21 Claims, 48 Drawing Sheets

OTHER PUBLICATIONS

Yang, J. et al., "Maintaining Temporal Views Over Non–Historical Information Sources For Data Warehousing", *Advances in Database Technology—EDBT '98*, Proceedings of the 6th International Conference on Extending Database Technology, Valencia, Spain, Mar. 1998, pp. 389–403.

Quass, D., "Maintenance Expressions for Views with Aggregation", Proceedings of the 21st International Conference on Very Large Data Bases, IEEE, Zurich, Switzerland, (Sep. 1995), 9 pages.

Mumick, I. et al., "Maintenance of Data Cubes and Summary Tables in a Warehouse", Proceedings of the 1997 ACM SIGMOD International Conference, ACM Press, 1997, pp. 100–111.

Huyn, N., "Multiple–View Self–Maintenance in Data Warehousing Environments", Proceedings of the 23rd International Conference on Very Large Data Bases, IEEE, (1997), pp. 26–35.

Quass, D. et al., "Making Views Self–Maintainable for Data Warehousing", Proceedings of the Fourth International Conference on Parallel and Distributed Information Systems, IEEE, Dec. 1996, pp. 158–169.

Quass, D. et al., "On–Line Warehouse View Maintenance", Proceedings of the 1997 ACM SIGMOD International Conference, ACM Press, 1997, pp. 393–404.

Gupta, H., "Selection of Views to Materialize in a Data Warehouse", Database Theory—ICDT '97, Proceedings of the 6th International Conference, Delphi, Greece, Jan. 1997, pp. 98–112.

Harinarayan, V. et al., "Implementing Data Cubes Efficiently", *SIGMOD Record*, vol. 25, No. 2, Jun. 1996, pp. 205–216.

Gupta, H. et al., "Index Selection for OLAP", IEEE Paper No. 1063–6382/97, *IEEE* (1997), pp. 208–219.

Labio, W. et al., "Physical Database Design for Data Warehouses", IEEE Paper No. 1063–6382/97, *IEEE* (1997), pp. 277–288.

Gupta, A. et al., "Aggregate–Query Processing in Data Warehousing Environments", Proceedings of the 21st VLDB Conference, Zurich, Switzerland, Sep. 1995, 358–369.

O'Neill, P. et al., "Improved Query Performance with Variant Indexes", Proceedings of the 1997 ACM SIGMOD International Conference, ACM Press, 1997, pp. 38–49.

McAlpine, G. et al., "Integrated Information Retrieval in a Knowledge Worker Support System", Proc. of the Intl. Conf. on Research and Development In Information Retrieval (SIGIR), Cambridge, MA, Jun. 25–28, 1989, Conf. 12, pp. 48–57.

Tsuda, K. et al., "IconicBrowser: An Iconic Retrieval System for Object–Oriented Databases", Proc. of the IEEE Workshop on Visual Languages, Oct. 4, 1989, pp. 130–137.

"Multiple Selection List Presentation Aids Complex Search", IBM Technical Disclosure Bulletin, vol. 36, No. 10, Oct. 1993, pp. 317–318.

* cited by examiner

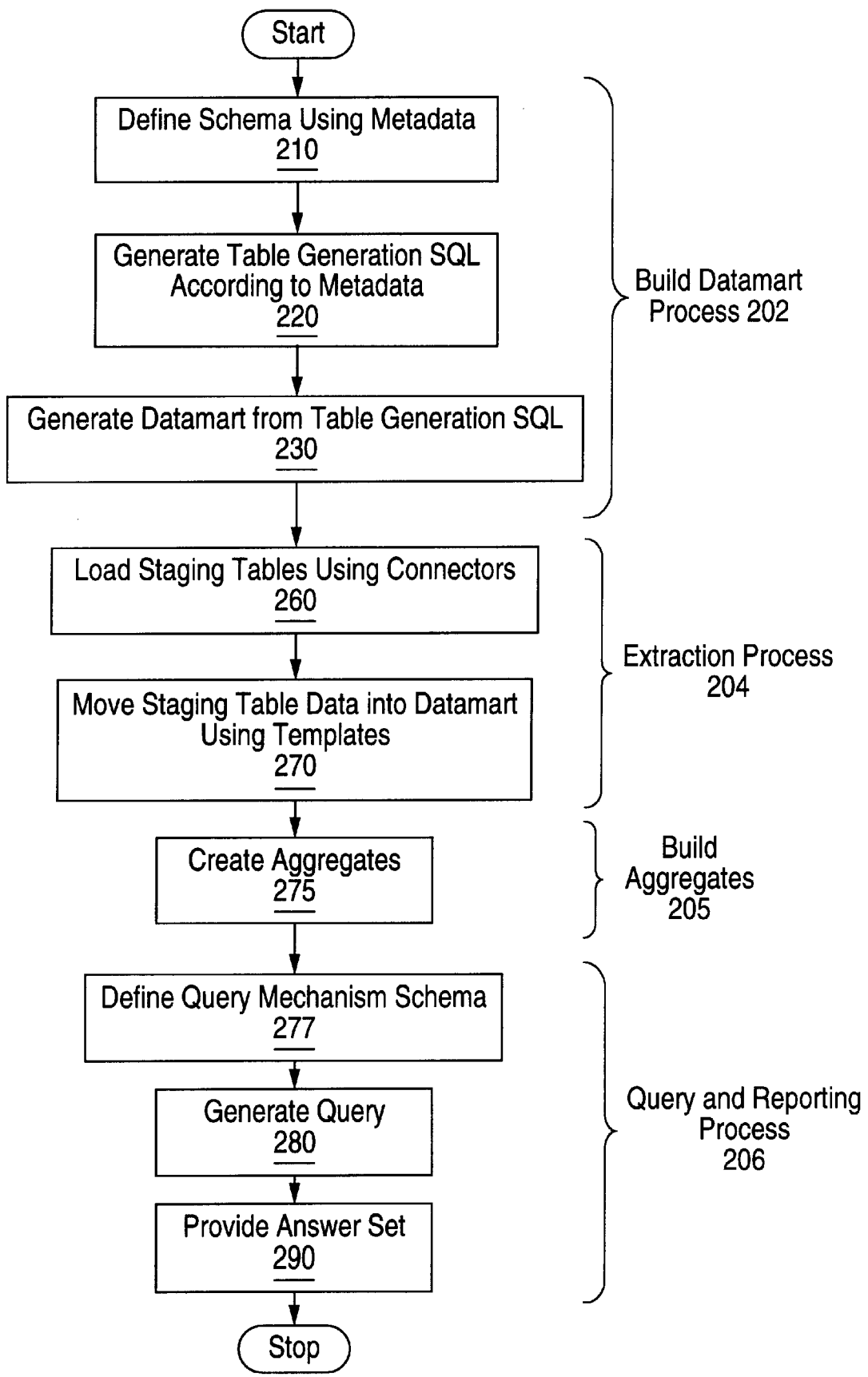

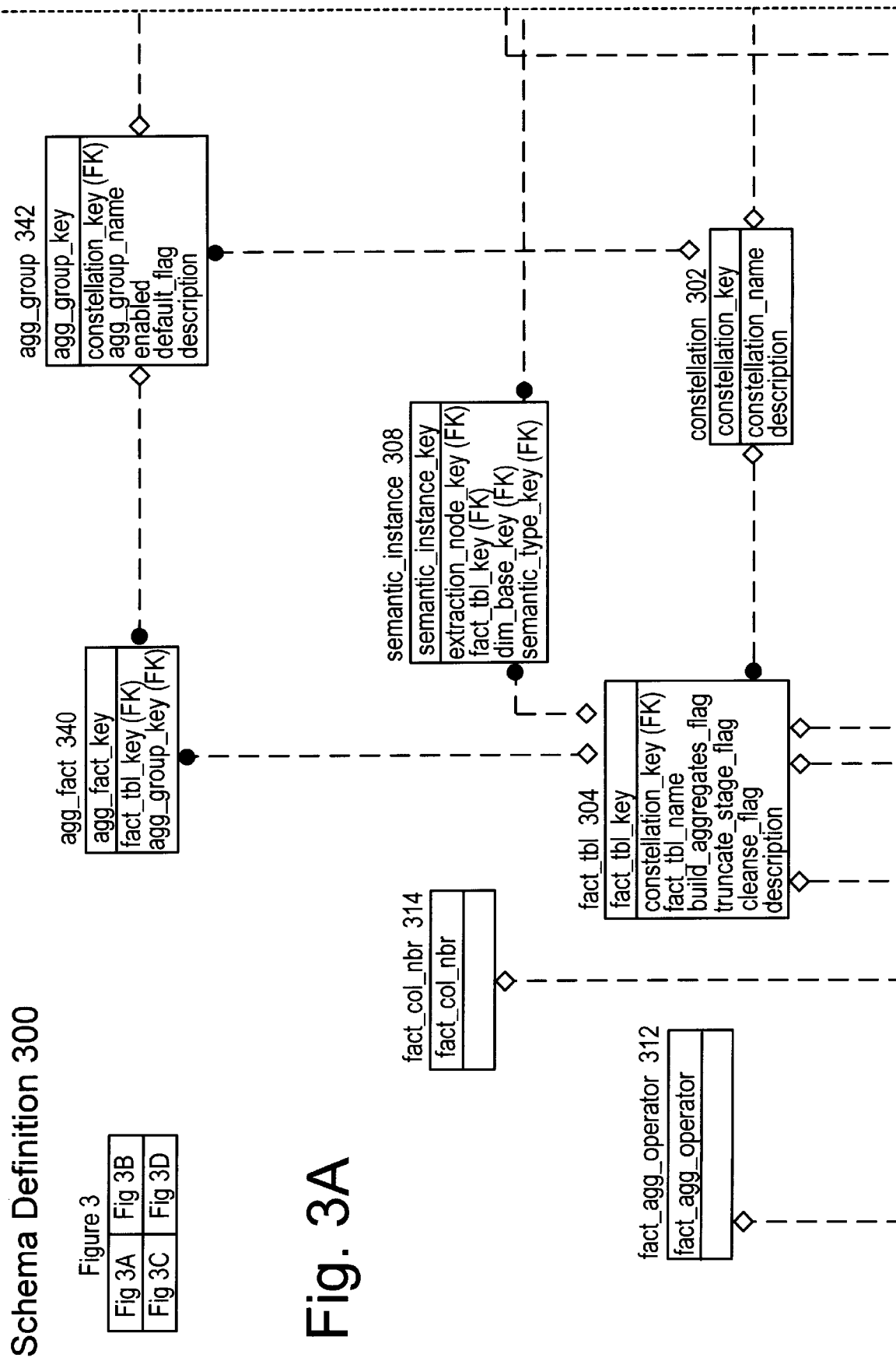

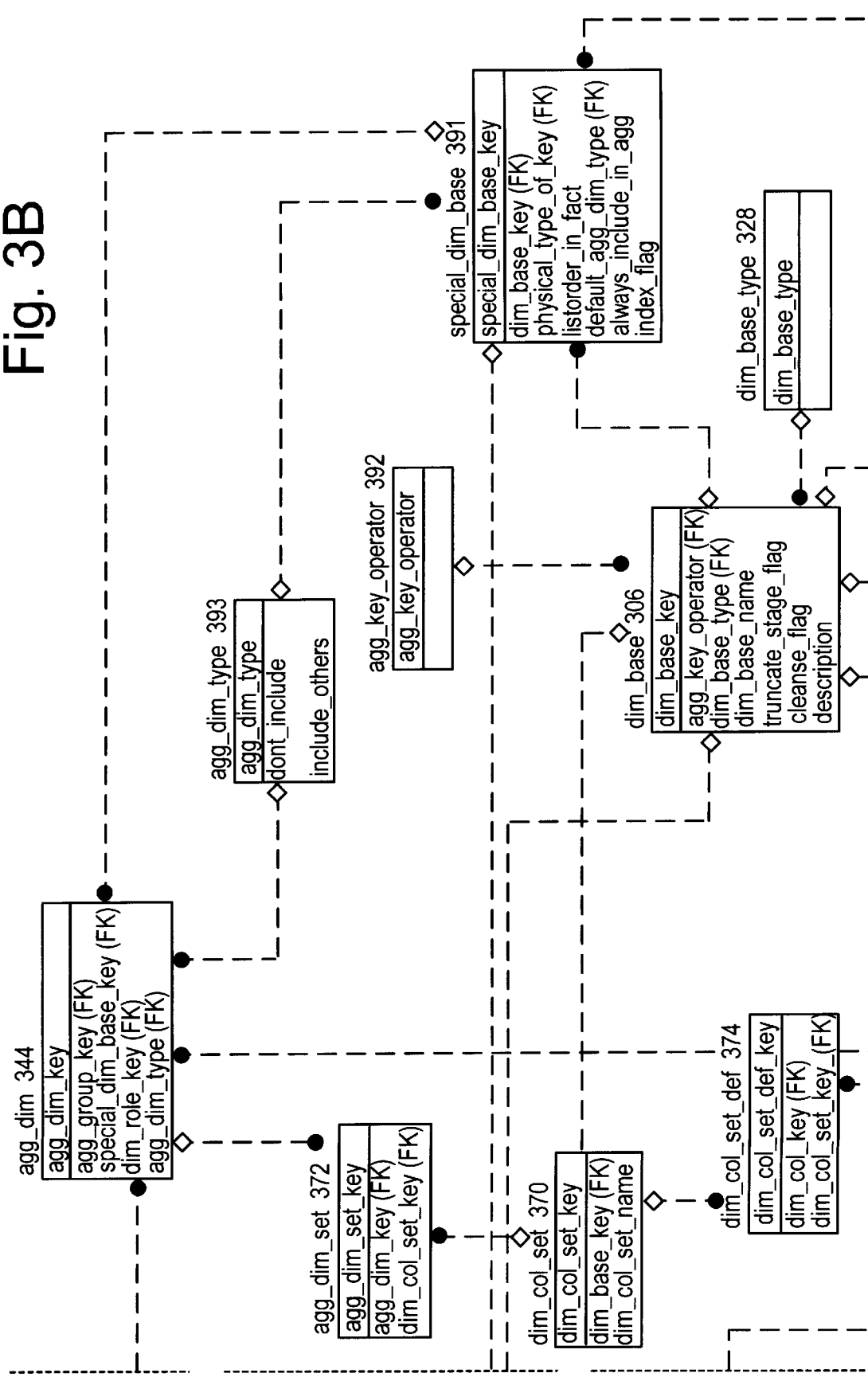

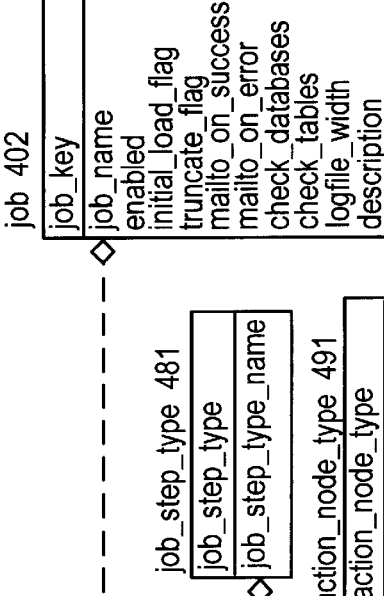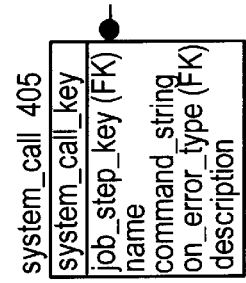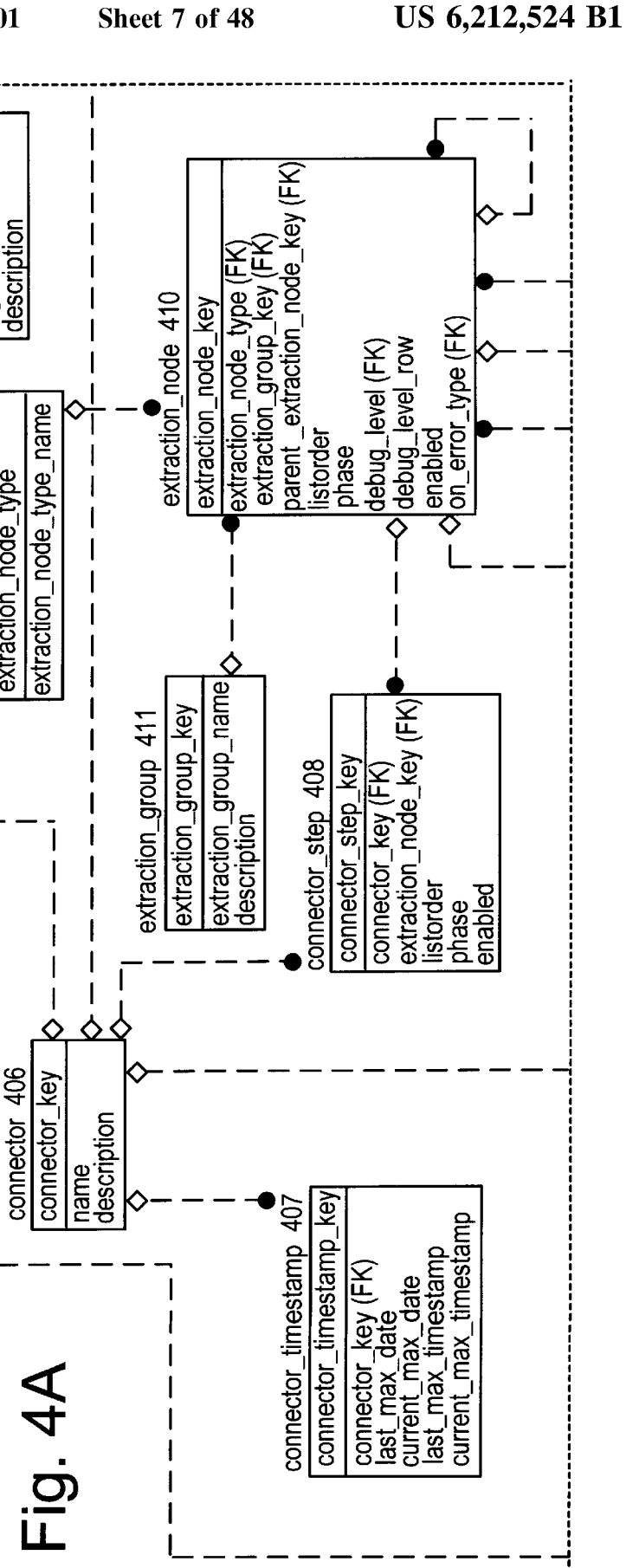
Extraction 400 Schema
Figure 4
| Fig. 4A | Fig. 4B |
| Fig. 4C | Fig. 4D |
Fig. 4A Runtime Schema 500

| Fig. 5A | Fig. 5B |
| Fig. 5C | Fig. 5D |

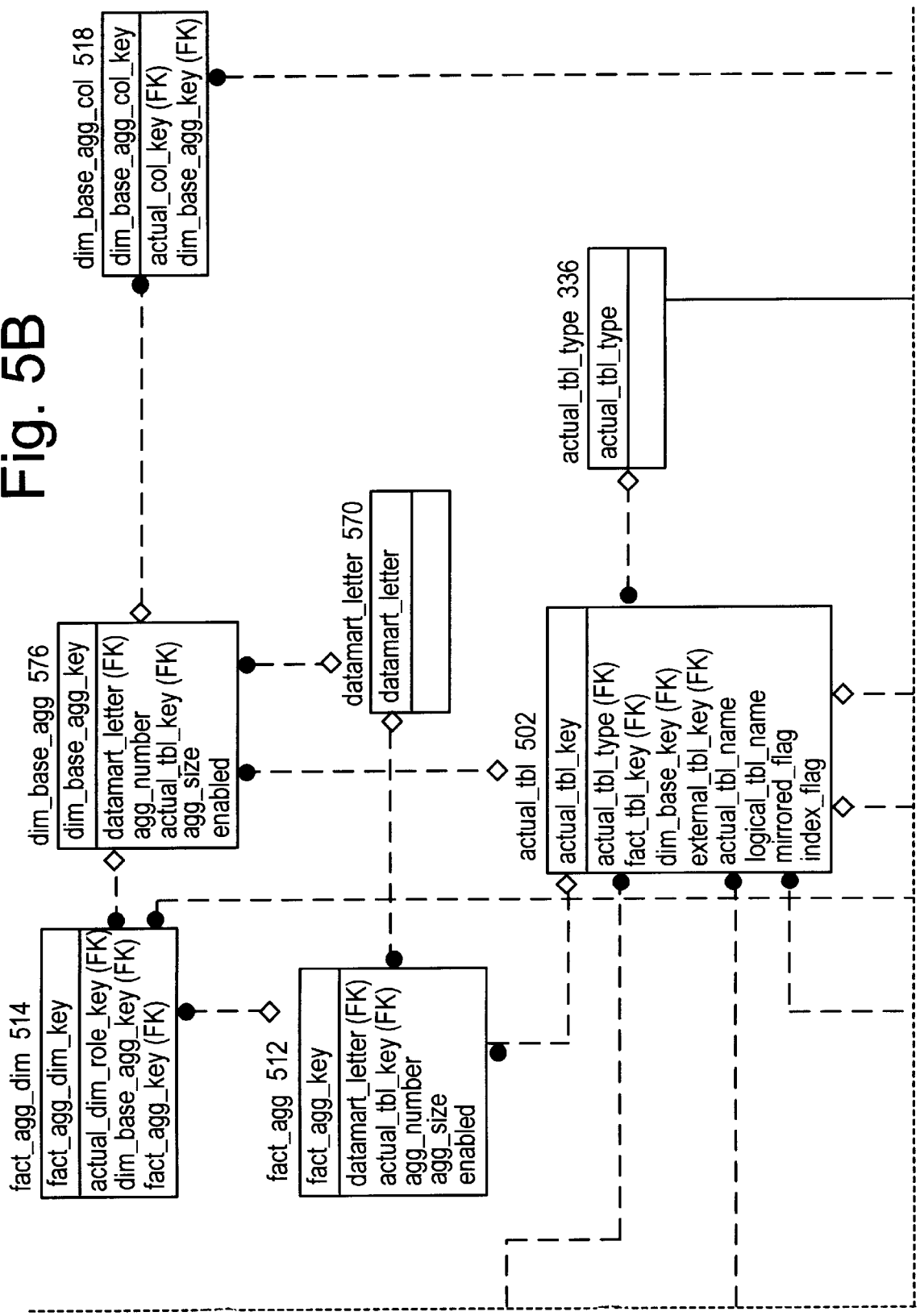

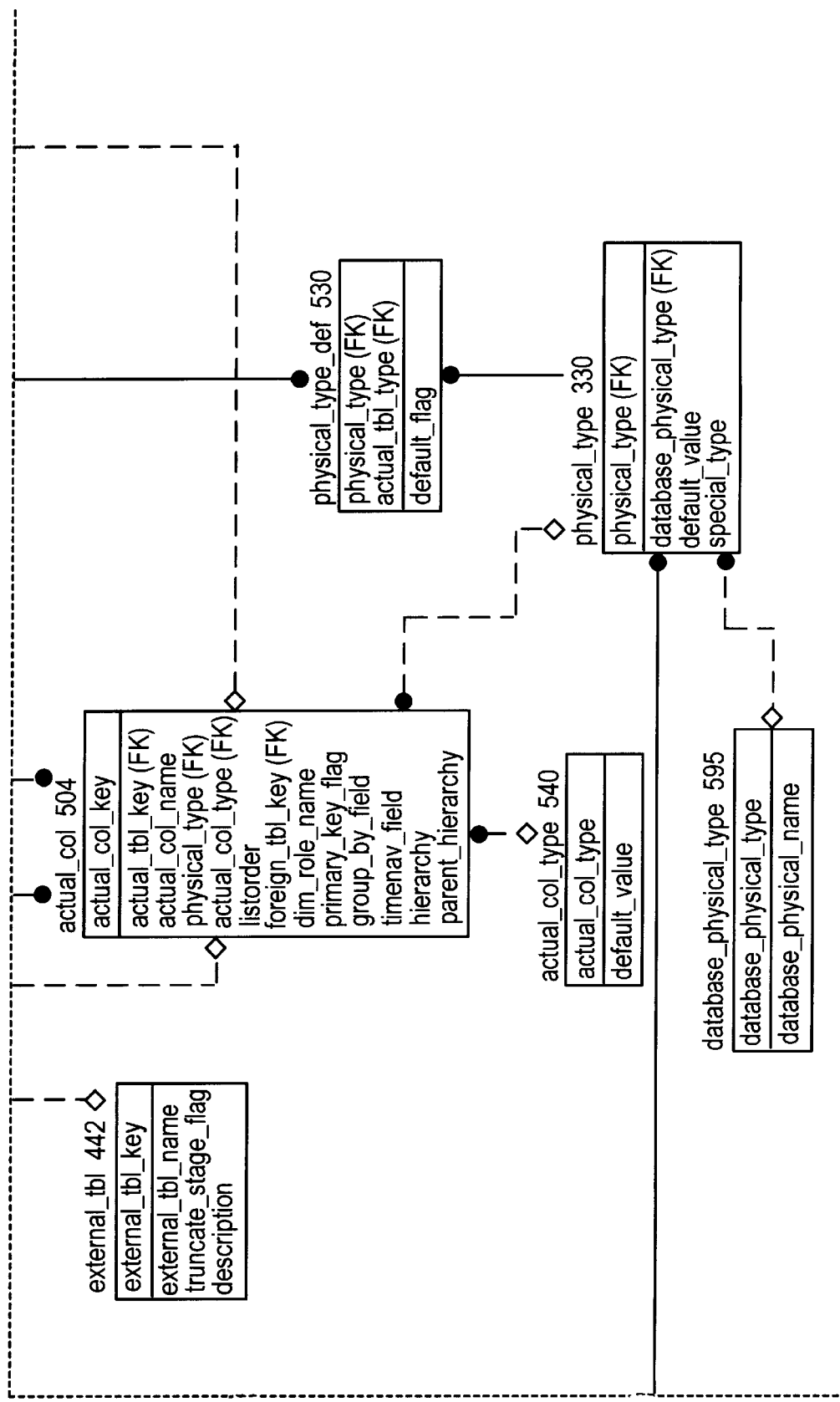

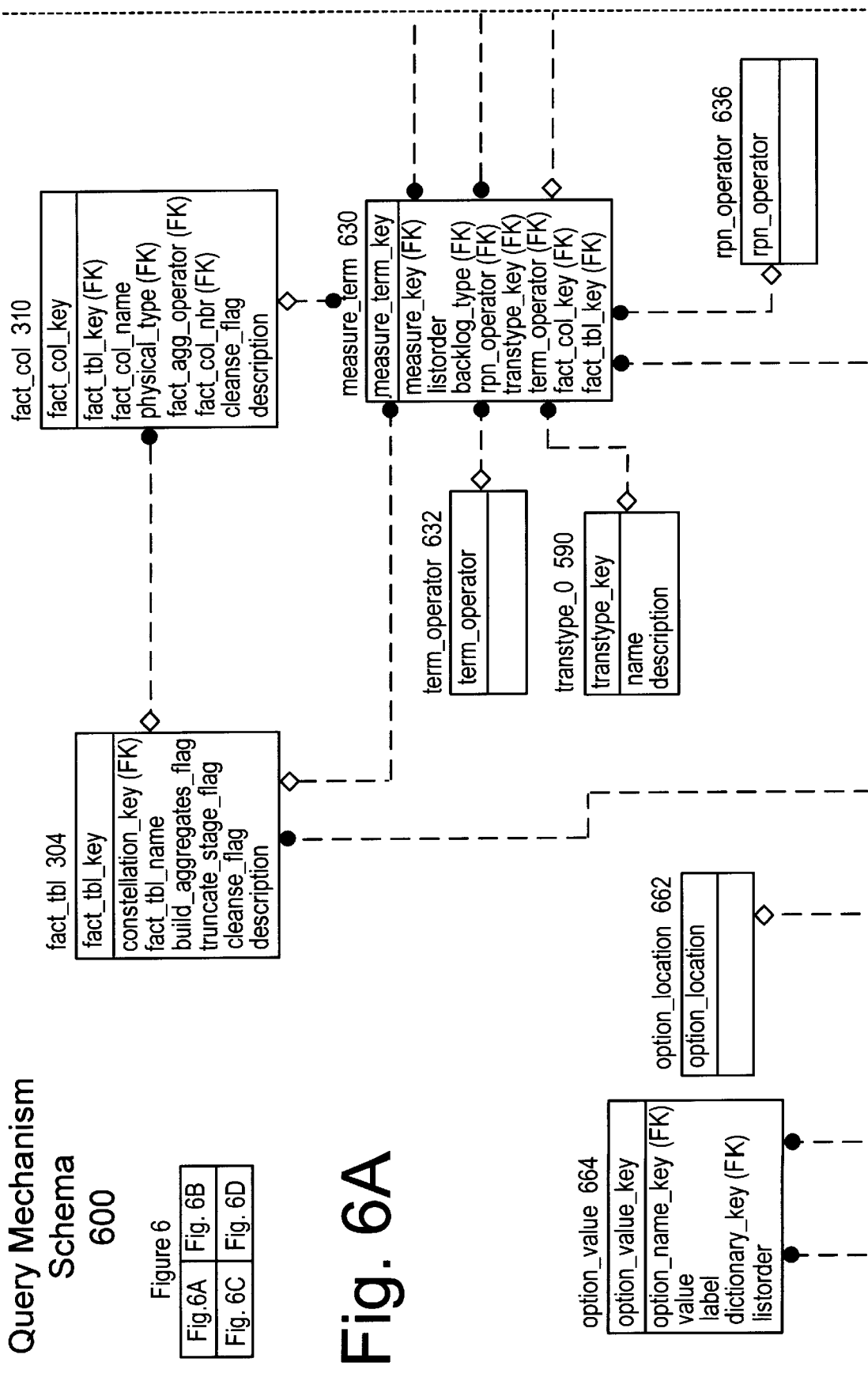

METHOD AND APPARATUS FOR CREATING AND POPULATING A DATAMART

CROSS REFERENCES TO RELATED APPLICATIONS

This application relates to the following group of applications. Each application in the group relates to, and incorporates by reference, each other application in the group. The invention of each application is assigned to the assignee of this invention. The group of applications includes the following.

U.S. patent application Ser. No. 09/385,119, entitled "Method and Apparatus for Creating a Well-Formed Database System Using a Computer," filed Aug. 27, 1999, and having inventors Craig David Weissman, Greg Vincent Walsh and Eliot Leonard Wegbreit.

U.S. patent application Ser. No. 09/073,752, entitled "Method and Apparatus for Creating and Populating a Datamart," filed May 6, 1998, and having inventors Craig David Weissman, Greg Vincent Walsh and Lynn Randolph Slater, Jr.

U.S. patent application Ser. No. 09/073,733, entitled "Method and Apparatus for Creating Aggregates for Use in a Datamart," filed May 6, 1998, and having inventors Allon Rauer, Gregory Vincent Walsh, John P. McCaskey, Craig David Weissman and Jeremy A. Rassen.

U.S. patent application Ser. No. 09/073,753, entitled "Method and Apparatus for Creating a Datamart and for Creating a Query Structure for the Datamart," filed May 6, 1998, and having inventors Jeremy A. Rassen, Emile Litvak, abhi a. shelat, John P. McCaskey and Allon Rauer.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

THE FIELD OF THE INVENTION

This invention relates to the field of databases. In particular, the invention relates to creating databases, and loading and accessing data in the databases.

BACKGROUND OF THE INVENTION

Many different types of databases have been developed On line transaction processing (OLTP) databases are examples of typical databases used today. OLTP databases are concerned with the transaction oriented processing of data. On line transaction processing is the process by which data is entered and retrieved from these databases. In these transaction-oriented databases, every transaction is guaranteed. Thus, at a very low level, the OLTP databases are very good at determining whether any specific transaction has occurred.

Another type of database is a data warehouse or datamart. A datamart transforms the raw data from the OLTP databases. The transformation supports queries at a much higher level than the OLTP atomic transaction queries. A data warehouse or a datamart typically provides not only the structure for storing the data extracted from the OLTP databases, but also query analysis and publication tools.

The advantage of datamarts is that users can quickly access data that is important to their business decision making. To meet this goal, datamarts should have the following characteristics. First, datamarts should be consistent in that they give the same results for the same search. The datamart should also be consistent in the use of terms to describe fields in the datamart. For example, "sales" has a specific definition, that when fetched from a database, provides a consistent answer. Datamarts should also be able to separate and combine every possible measure in the business. Many of these issues are discussed in the following book, Ralph Kimball, *The Data Warehouse Toolkit,* John Whiley and Sons, Inc., New York, N.Y. (1996).

Multi-dimensional datamarts are one kind of datamart. Multi-dimensional datamarts rely on a dimension modeling technique to define the schema for the datamart. Dimension modeling involves visualizing the data in the datamart as a multi-dimension data space (e.g., image the data as a cube). Each dimension of that space corresponds to a different way of looking at the data. Each point in the space, defined by the dimensions, contains measurements for a particular combination of dimensions. For example, a three dimensional cube might have product, customer, and territory dimensions. Any point in that cube, defined by those three dimensions, will represent data that relates those three dimensions.

The data in the datamart is organized according to a schema. In a dimensional datamart, the data is typically organized as a star schema. At the center of a standard star schema is a fact table that contains measure data Radiating outward from the fact table, like the points of a star, are multiple dimension tables. Dimension tables contain attribute data, such as the names of customers and territories. The fact table is connected, or joined, to each of the dimension tables, but the dimension tables are connected only to the fact table. This schema differs from that of many conventional relational databases where many tables are joined. The advantage of such a schema is that it supports a top down business approach to the definition of the schema.

Present datamarts have a number of drawbacks that are now discussed. First, datamarts are typically difficult to build and maintain. This is because of the requirements that they be consistent and flexible. A related drawback of present day datamarts is that they do not allow the consultants of the datamart to make changes to the schema simply and easily. Because datamarts support very high level queries about the business processes in the business, they require a great deal of consistency in the use of data from the OLTP systems. Additionally, the datamarts need to be very flexible to address changes in the types of high level queries supported. Changing typical datamarts require the changing of hundreds, or potentially thousands, of lines of SQL code. For example, if a fact column is added to a fact table, the change propagates throughout the datamart. These changes are typically implemented by hand, a very time consuming and error prone process. As a result of the hand coding involved, it is quite possible to construct the database in an arbitrary fashion that does not conform to good rules for constructing datamarts. Thus, well-formed datamarts may not result.

Thus an improved data warehousing technology is desired.

A SUMMARY OF THE INVENTION

One embodiment of the invention includes a method of generating a datamart. The datamart includes tables having rows and columns. The method comprises accessing a description of a schema. The schema defines the relationships between the tables and columns. The description further defines how data is to be manipulated and used to populate the tables in the datamart. That is, the description defines the semantic meaning of the data. The description is further used to create a set of commands to create the tables. The commands are executed causing the creation of the tables. Importantly, when the semantic meaning is associated with the column and rows, programs for manipulating and propagating data into those columns and rows are automatically defined. Previously, consultants would have to hand code the creation, manipulation, and population programs for a datamart. Thus, this embodiment of the invention significantly reduces the amount of work required to create and populate the datamart.

In some embodiments, the semantic meaning of the columns and rows are defined by semantic templates. Each template defines how a particular type of data is populated into the datamart. The template includes program code that can be used to populate the tables and columns in a consistent manner for subsequent querying. Importantly, the specific programs are generated from both the template programs and the schema definition.

In some embodiments of the invention, populating the datamart includes two phases. The first phase includes loading a set of staging tables with data extracted from the source systems. The second phase includes using the semantic templates to convert the extracted data into a format that can be used in the tables.

In some embodiments, the system does not necessarily include the extraction of the data from the source systems, but does include automatically generating a set of commands to convert data, provided by another system, into formats that can be used by the datamart.

In some embodiments, the schema is a star schema having one or more fact tables and one or more dimension tables (or dimensions). The schema can be held in a constellation that includes additional information. The constellation can correspond to a business process.

In other embodiments, the datamart created is object based, therefor rather than tables being created, objects are created.

Although many details have been included in the description and the figures, the invention is defined by the scope of the claims. Only limitations found in those claims apply to the invention.

A BRIEF DESCRIPTION OF THE DRAWINGS

The figures illustrate the invention by way of example, and not limitation. Like references indicate similar elements.

FIG. 2 illustrates an embodiment of a method of defining the datamart, loading the datamart, and then querying the data.

Figure 1:
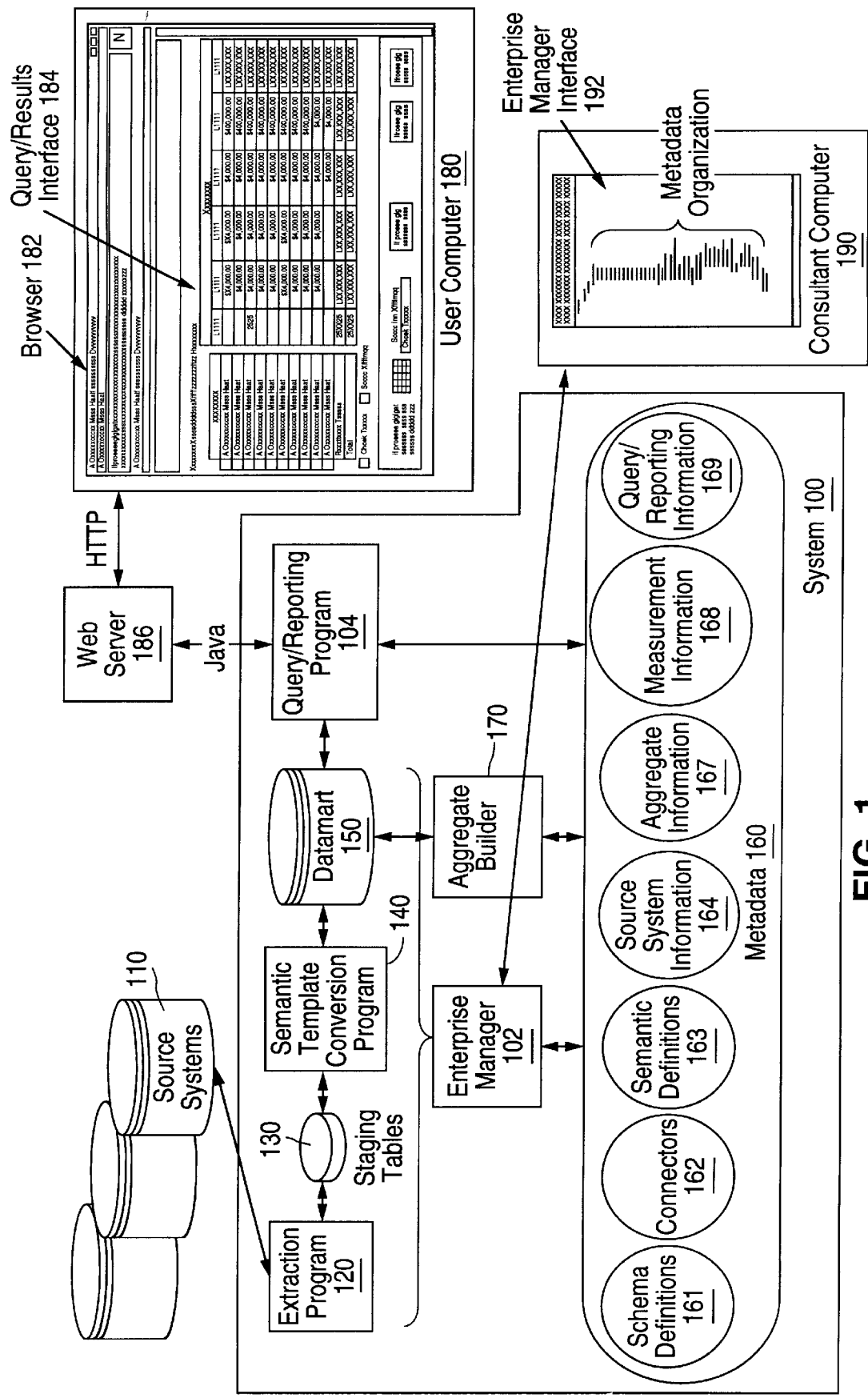
FIG. 1 illustrates a datamart system representing one embodiment of the invention.

FIG. 7 through FIG. 29 describe a user interface that can be used to define a schema, build a datamart, load the datamart, and query the datamart.

FIG. 30 through FIG. 36 describe a user interface that can be used by a consultant to set up the query interface for a user and to provide the reporting interface.

THE DESCRIPTION

Table of Contents

CROSS REFERENCES TO RELATED APPLICATIONS . . . 1

COPYRIGHT NOTICE . . . 2

THE FIELD OF THE INVENTION . . . 2

BACKGROUND OF THE INVENTION . . . 2

A SUMMARY OF THE INVENTION . . . 5

A BRIEF DESCRIPTION OF THE DRAWINGS . . . 7

THE DESCRIPTION . . . 8

TABLE OF CONTENTS . . . 8

INTRODUCTION TO THE DESCRIPTION . . . 9

DEFINITIONS . . . 11

DATAMART SYSTEM . . . 12
  System Element List . . . 13
  System Element Descriptions . . . 14
    Metadata Overview . . . 14
    System Overview . . . 16
    External Elements . . . 18

EXAMPLE METHOD OF DEFINING AND USING THE DATAMART . . . 20

TOP LEVEL METADATA SCHEMA . . . 24
  Top Level Metadata List . . . 25
  Top Level Metadata Descriptions . . . 26
    Fact Related Tables . . . 26
    Dimension Related Tables . . . 28
    Semantic Instance Table . . . 31
    Aggregate Related Tables . . . 31
    Data Store Related Tables . . . 33
    Cleansing Related Tables . . . 34
    Additional Tables . . . 34
  Top Level Metadata Use . . . 35

EXTRACTION METADATA . . . 37
  Extraction Metadata List . . . 38
  Extraction Metadata Descriptions . . . 38
    Job Related Tables . . . 38
    Connector Related Tables . . . 40
    Extraction Group Related Tables . . . 42
    SQL Statement Related Tables . . . 43
    Error Handling . . . 44
    Data Semantic Related Tables . . . 45
    Data Store Related Tables . . . 46
  Extraction Metadata Use . . . 48
  Further Discussion of Templates . . . 51
  Examples . . . 52
    Additional Templates . . . 53

RUNTIME METADATA . . . 55
  Runtime Metadata List . . . 56
  Runtime Metadata Descriptions . . . 57
  Time Navigation . . . 61

QUERY MECHANISM METADATA . . . 63
  Query Mechanism Schema List . . . 64
  Query Mechanism Schema Metadata Descriptions . . . 65
    Ticksheets Metadata . . . 65
    Measurement Metadata . . . 68
    Filtering Metadata . . . 69
    Display Options Metadata . . . 71

USER INTERFACE EXAMPLE OF DEFINING META-
DATA . . . 72
   General Schema Definitions User Interface . . . 72
   Extraction Interface Elements . . . 75
   Additional Interface . . . 77
   End User Interface Definition and Example . . . 78
ALTERNATIVE EMBODIMENTS . . . 85
CLAIMS . . . 87
THE ABSTRACT . . . 95
APPENDIX A . . . 96

Introduction to the Description

The following describes a system according to various embodiments of the invention. Generally, the system allows a consultant to define a well-formed datamart. The system includes tables and columns that conform to the definition of the datamart. The system also includes additional columns for foreign key tracking, source system key mapping, time and date tracking. The system has automatic indexing. The system enforces typing information about the data stored in the datamart. These additional features cause the datamart to operate in a consistent manner. One benefit of such consistent operation is that results are consistent in meaning from query to query.

Focusing on the datamart creation, the system allows a consultant to build a datamart from a schema definition and a definition of the sources of the data. From the schema definition, the system automatically builds the tables needed in the datamart. Also, from the schema definition, and the sources definition, the system can automatically extract the data from those sources. Depending on the semantic meaning of the data, as defined by the schema definition, the system automatically converts the data from the sources into forms that are readily usable in the datamart. Once the datamart has been created, and the data has been loaded, users can then perform queries on the data.

As part of the datamart creation, the system allows the consultant to define aggregates for the datamart. The aggregates correspond to pre-computed query results for different types of queries. For example, an aggregate can be created for a query that asks for all sales, by region, by quarter. The corresponding aggregate table would include a set of rows that have the results for this query (e.g., each row includes the quarterly sales for each region). The aggregates are specified using the schema definition. This makes defining and changing aggregates relatively simple.

To allow a user to query the datamart, the system includes an interface for defining what fields can be used by the user to query the datamart. Additionally, by allowing the consultant to define measure and related information, the system allows the consultant to specify how the results are to appear to the users.

The following description first presents a system level view of primarily one embodiment. Then, an example use of the system is presented. Next, the metadata used in the system is described. This metadata description is broken into four parts: a top level description of the metadata used in defining schemas, a description of the metadata used during the extraction, a description of the metadata used while the datamart is running, and a description of the query interface metadata. Next, an example set of user interface screen shots illustrates how consultants can quickly and efficiently define schemas, aggregates, and query interfaces, and how users can query the datamart. Next, additional alternative embodiments are described.

Definitions

Datamart or Data Warehouse—is a database.

Schema—is a description of the organization of data in a database. Often, the schema is defined using a data definition language provided by a database management system. More abstractly, the schema can be the logical definition of a data model for use in a database.

Metadata—is data that defines other data. This is not the actual data in the datamart, but is the data that defines the data in the datamart.

Constellation—a grouping of dimension definitions, fact definitions, like-structured facts (all facts in a constellation have the same dimensional foreign keys), or stars, and other metadata definitions. Often the grouping relates to a business process (e.g., sales).

Fact Table—the central table of a star schema. It stores the numeric measurements of the business that is supplying the information to the datamart.

Measurement—is a piece of data in a fact table, or an arithmetic combination of data.

Dimension—the tables that link to the fact table in a star schema. The tables store the descriptions of the dimensions of the business. Examples of dimensions are product and territory.

Attributes—are the fields of a dimension table (e.g., product name, country name).

User—any end user who would normally wish to query a datamart, but would not usually be concerned with the implementation or maintenance of the datamart.

Consultant—is a person responsible for the creation and maintenance of a datamart.

Source System—is any computer system that holds the raw data used by the system. Examples of such source systems are OLTP database systems.

Data Store—any data storage (physical or logical) from which data is received or to which data is stored. Examples of a data store are files, a database, etc.

Computer—is any computing device (e.g., PC compatible computer, Unix workstation, etc.). Generally, a computer includes a processor and a memory. A computer can include a network of computers.

Program—a sequence of instructions that can be executed by a computer. A program can include other programs. A program can include only one instruction.

Datamart System

FIG. 1 illustrates a datamart system representing one embodiment of the invention. The system supports the creation of a well-formed datamart. This system allows consultants to use metadata to define schemas for a datamart. From the definition of the schema, the system can automatically generate the tables in the datamart. Further, the system can automatically extract the data from the source systems, perform conversions on that data and populate the datamart. The system supports the automatic creation and processing of aggregates from aggregate definitions. The system also supports the creation of the query mechanisms from query definitions.

The following description first lists all the elements of FIG. 1, then describes each of those elements, and then discusses how those elements operate together.

System Element List

FIG. 1 includes the following elements: source systems 110, a system 100, a web server 186, a consultant computer 190, and a user computer 180. The system 100 includes the metadata 160, an enterprise manager 102, an extraction program 120, staging tables 130, a semantic template conversion program 140, a datamart 150, an aggregate builder 170, and a query and reporting program 104. The metadata 160 includes the following data: schema definitions 161, connectors 162 (connectors are also referred to as extractors), semantic definitions 163, source system information 164, aggregate information 167, measurement information 168, and query/reporting information 169. The user computer 180 is shown running a browser 182. The browser 182 includes a query/results interface 184. The consultant computer 190 shows the enterprise manager interface 192 which shows the metadata organization of the system 100.

System Element Descriptions

The following describes the metadata 160, then the other elements of the system 100, and finally, the elements that are external to the system 100. These elements are all described in greater detail below.

Metadata Overview

The metadata 160 includes many different types of data and information. This information can be broken down into information related to (1) the definition of the schema for the datamart 150, (2) the data needed during the extraction from the source systems 110 and loading of the datamart 150, and (3) the information used in the querying of the datamart 150 and supplying the result sets. The relationships between the elements of the metadata 160 are described in greater detail below. However, the following provides brief descriptions of these elements.

The schema definitions 161 hold the definition of the schema for the datamart 150. Typically, a consultant, using the consultant computer 190, can interface with the enterprise manager 102 to define the schema definition 161 for the datamart 150. In particular, the consultant can use the enterprise manager interface 192 to define a star schema for the datamart 150. This star schema is organized around the business processes of the business for which the datamart is being created. What is important is that the consultant can easily define a schema for the datamart 150 and that definition is kept in the schema definitions 161. From the schema definitions 161, not only can the tables in the datamart 150 be generated, but also the automatic extraction and conversion of the data from the source systems 110 can be performed, aggregates are set up, and a query mechanism is generated.

The connectors 162, the semantic definitions 163, and the source system information 164, are all related to the extraction of the data from the source systems 110. The connectors 162 define the access routines for extracting the source systems data 110. The semantic definitions 163 define how that extracted data should be converted when it is loaded into the datamart 150. The semantic definitions 163 provide important advantages to the system 100. In particular, the semantic definitions 163 allow for a simplified definition of the datamart 150, consistent meaning of the data in the datamart 150, and allow for complex changes to the schema to be easily propagated to the datamart 150. The source system information 164 defines how to extract the data from the systems 110.

The aggregate information 167 defines how data in the datamart 150 is treated once it is extracted. The aggregate information 167 allows for the creation of aggregates. Aggregates are aggregations of various fields of data in the datamart 150. Aggregates support more complex and powerful queries to be executed on the datamart 150. The aggregates also improve the performance of the system during the querying process and allow for time navigation of the data in the datamart 150. Time navigation is the process of creating backlog result sets by hopping through date aggregates from the beginning of time in the datamart 150 to the present.

The measurement information 168 and the query/reporting information 169 support the querying of the datamart 150. A measure is a piece of numeric data in the datamart 150 that is useful to a user. That is, individual fact columns from source systems can be very implementation specific. These columns may not correspond to what users would prefer to see. For example, a user may want to see a net price added with a total cost. However, the fact table may only include the net price or the total cost. The measure information 168 allows the consultant to define the abstract notion of the calculation associated with the net price added to the total cost.

In some embodiments of the invention, the metadata 160 also includes security information. The security information defines the level of access for various users to the various tables and fields in the datamart 150. This security information automatically restricts access to that data.

System Overview

The system 100 can be implemented on a network of computers running Windows NT and UNIX. The datamart 150 can be implemented on top of an Oracle (SQL Server, or ODBC) database. However, this physical structure of the system 100 can be implemented in any number of ways, and the invention does not require this specific hardware configuration.

The enterprise manager 102 is a program that is responsible for supporting the definition of the schema, and the creation of the tables in the datamart 150 from the schema definitions 161. The enterprise manager 102 also controls the extraction program 120. (In some embodiments, the extraction program 120 and the semantic template conversion program 140 are included in the enterprise manager 102). During the execution of the extraction program 120, the extraction program 120, the staging tables 130, the semantic template conversion 140, and the datamart 150 are all used. The extraction program 120 uses the connectors 162 and the source system information 164 to extract the information from the source systems 110. The extracted data is loaded into the staging tables 130.

The staging tables 130 are temporary tables used to hold the source system data before performing any semantic conversions on that data. The staging tables 130 also allow for the conversion of the source system data prior to moving the data into the datamart 150.

Once the staging tables 130 have been loaded, the semantic definitions 163 can be accessed from the enterprise manager 102 to convert the information in the staging tables 130 to predefined data semantics. These predefined data semantics allow for powerful queries, consistency in the definition of the meaning of the data in the datamart 150, and allow for changes to be made to the schema Generally, the semantic template conversion 140 takes data stored in the staging tables 130, performs a conversion of that data according to a corresponding semantic definition (defined in the schema definitions 161), and populates the datamart 150 with the converted data.

Importantly, the predefined data semantics substantially simplify the creation and population of the datamart 150. In previous systems, the consultant would have to implement all of the data manipulation and population programs by hand. By selecting a particular semantic definition for a particular fact, or dimension, in the schema, the consultant has automatically defined the access and manipulation for populating programs for that table. Allowing the consultant to select a predefined data semantic not only reduces the tedious coding previously required of the consultant, but also allows for the automatic insertion of foreign keys, transaction types, date, and other information into the schema, and therefore the datamart 150. This additional information causes the datamart 150 to be well-formed.

The aggregate builder 170, as mentioned above, aggregates data in the datamart 150 according to the aggregate information 167 and the schema definitions 161. The results of the aggregate builder 170 allow for more powerful and faster queries to be performed on the datamart 150.

The query/reporting program 104 supports the querying of the datamart 150 and presents results of those queries. The query and reporting process 104 uses the measurement information 168 and the query and reporting information 169, in addition to the schema definitions 161, to query the datamart 150 and provide that information to the web server 186. The query/reporting information 169 includes filters and form definitions. The filters allow the user to filter different fields out of the datamart 150. The forms allow the users to indicate which fields a user is particularly interested in.

The metadata 160, although including many different types of definitional data, importantly includes the schema definition 161 and the semantic definitions 163. The enterprise manager 102 can use the schema definitions 161 to build the tables in the datamart 150. Through the combination of these two pieces of metadata 160, the enterprise manager 102 can take data from a source system 110, perform semantic conversions on that data and populate the datamart 150. Thus, in some embodiments of the invention, the system includes only the schema definitions 161 and the semantic definitions 163.

External Elements

The source systems 110, as defined above, represent large databases from which data for the datamart 150 is pulled. Examples of such systems include large on line transaction processing (OLTP) systems. Typically these source systems 110 are relational databases having multiple tables and relations between those tables. The source systems 110 do not generally support powerful queries that provide high level information about the business in which the source systems 110 are used. Thus, the system 100 is used to extract the data from the source systems 110 and to provide an improved schema for querying that data. In some embodiments, the source systems 110 include non-relational databases such as object databases. In other embodiments, the source systems 110 can include flat file systems or combined relational and object databases. What is important is the source systems 110 can provide data to the system 100 through the connectors 162 and the source system information 164.

The consultant computer 190 represents any computing device that allows a consultant to access the system 100. (Access to the system 100 can be through a network.) What is important is that the consultant computer 190 allows the consultant to interface with the enterprise manager 102. Note, that the enterprise manager 102 can run on the consultant computer 190.

The user can access the web server 186 through the user computer 180. In this example, the user computer 180 can access the web server 186 through an HTTP connection. The user computer 180 sends a file request to the web server 186. This file request represents a request for a query of the datamart 150. The web server 186 runs a Java program upon receiving the request. The query and reporting program 104 converts the information from the Java program into a query that the datamart 150 will understand. In one embodiment, the query/reporting program 104 converts the query into a set of SQL statements. The SQL statements are run against the datamart 150. The results of the statements are processed and provided back to the user computer 180.

Example Method of Defining and Using the Datamart

FIG. 2 illustrates an embodiment of a method of defining the datamart 150, loading the datamart 150, and then accessing the data in the datamart 150. This example can be broken into four subparts: a build datamart process 202, an extraction and loading process 204, a build aggregates process 205, and a query and reporting process 206. This example can be implemented using the system 100.

At block 210, a consultant uses the enterprise manager 102 to define the schema. The schema is defined using the metadata 160. This process is illustrated in greater detail in FIG. 7 through FIG. 35. Generally, defining the schema involves determining the business processes of the organization for which the system 100 is being implemented. The consultant then defines the star schema for those business processes. The star schema has a fact table and a number of dimensions. The consultant also defines from where the data in the schema is to be derived. That is, the consultant defines from which fields and tables the information is to be extracted from the source systems 110. The consultant also defines how that data is to be put into the datamart 150. That is, the consultant associates each piece of data with a semantic meaning. This semantic meaning defines how the data from the source system is to be manipulated and how it is to populate the datamart 150. At this point, the consultant can also define the aggregates that can be used in the datamart 150.

Once the datamart 150 has been defined, it can then be automatically built. At block 220, the enterprise manager 102 generates table creation SQL statements according to the definition of the metadata. In one embodiment of the invention, block 220 is accomplished by performing queries on the schema definitions 161 to generate the fact table creation statements, the fact staging table creation statements, the dimension table creation statements, the dimension staging table creation statements, and the dimension mapping table creation statements. These tables are described in greater detail below. From the results of these queries, SQL CREATE TABLE statements are created. Importantly, the schema definitions 161 provide the information the enterprise manager 102 needs to build the datamart 150.

Note that this process can also be used to modify the schema of an existing datamart 150. Therefore, at block 220, the SQL tables being created will cause the existing datamart 150 to be modified without losing the data in the datamart 150.

At block 230, the enterprise manager 102 issues the table generation statements to the database upon which the datamart 150 is being created. That database creates the tables, which correspond to the datamart 150. After block 230, the build the datamart process 202 is complete.

Now the extraction process 204 can be performed. The extraction process 204 is run on a periodic basis to load data from the source systems 110 into the datamart 150. This process can be run multiple times for the datamart 150.

At block 260, the connectors 162 are used by the enterprise manager 102, and in particular, they are used by the extraction program 120 to extract the data from the source systems 110. The connectors 162 can include SQL statement templates (not to be confused with semantic templates, as described below) for extracting data from the source systems 110. The extraction program 120 uses these templates, in addition to the source system information 164, to generate SQL statements. These SQL statements are issued to the source system 110 and the results are loaded into the staging tables 130. (The staging tables 130 had been created as a result of block 230.) Once the staging tables have been loaded, the data can then be moved into the datamart 150.

At block 270, the staging table data is moved into the datamart 150 using the semantic definitions 163. The semantic definitions 163 are templates for converting the staging tables 130 data according to predefined data semantics. These predefined data semantics, as described below, provide semantic meaning to the data being loaded from the staging tables 130. Note that the data from the staging tables 130, as processed by the semantic template conversion 140, is placed in the tables in the datamart 150.

Thus, the schema definition and the semantic definitions 163 are used to generate and populate the datamart 150 such that the datamart 150 is well-formed. Examples of the well-formedness of the datamart 150 are as follows. (1) Two columns related by a relational join will be from the same domain. (2) If table A has a many-to-one relationship to table B, then table A has a foreign key that corresponds to table B. (3) A many-to-many relationship, between two tables A and B, is always expressed by an associative table that is created in a uniform way. For each unique many-to-many relationship, a unique value is created in the associative table and reused whenever that many-to-many relationship occurs. Denormalization is always done correctly. (4) Pulling information from one table to be put into another table, for access efficiency, is done correctly. Previous systems cannot guarantee such a well-formed database system because hand coding of the creation and population operations is required. This hand coding can easily introduce errors into datamart creation and population processes.

Once the extraction process 204 has completed, the aggregates can be built in the build aggregates process 205. The aggregates are tables of pre-calculated combinations of dimensions and facts. Importantly, they greatly increase the speed of queries. Generally, the aggregate definitions, stored in the aggregate information 167, are accessed and built using the aggregate definitions (which interface with the schema definitions). At block 275, the aggregate builder 170 accesses the metadata 160 to build the aggregates. Often, the aggregate building is done at night.

After aggregates are built, the querying and reporting process 206 can be performed. The querying and reporting process 206 can be performed anytime after the creation of the datamart 150. Importantly, when an aggregate is created, the appropriate operation for that aggregate is used. For example, revenue elements are added to produce an aggregate, while daily account balances are averaged to produce an aggregate.

At block 277, the consultant defines the query mechanism schema for the system 100. In particular, the consultant defines the query/reporting information 169 and the measurement information 168. These two pieces of metadata 160 allow the system 100 to report meaningfully consistent information to users. Also, the consultant is not burdened with having to hand create the possible reports.

At block 280, a query is generated. In one embodiment of the invention the query is generated at the query/reporting program 104. In other embodiments, the query can be generated at the user computer 180 through the HTTP, web server 186, Java coupling to the query/reporting program 104. What is important here is that some query is generated that can be used to access the datamart 150. Importantly because the schema definitions 161 are available to the query and reporting program 104, the user can be presented with forms from which a query can be easily and automatically generated.

At block 290, the answer set (the results) is created by the datamart 150. This answer set is then propagated back through the query/reporting program 104, and ultimately to the user computer 180. The results are formatted according to the query/reporting information 169.

Top Level Metadata Schema

Figure 3C:
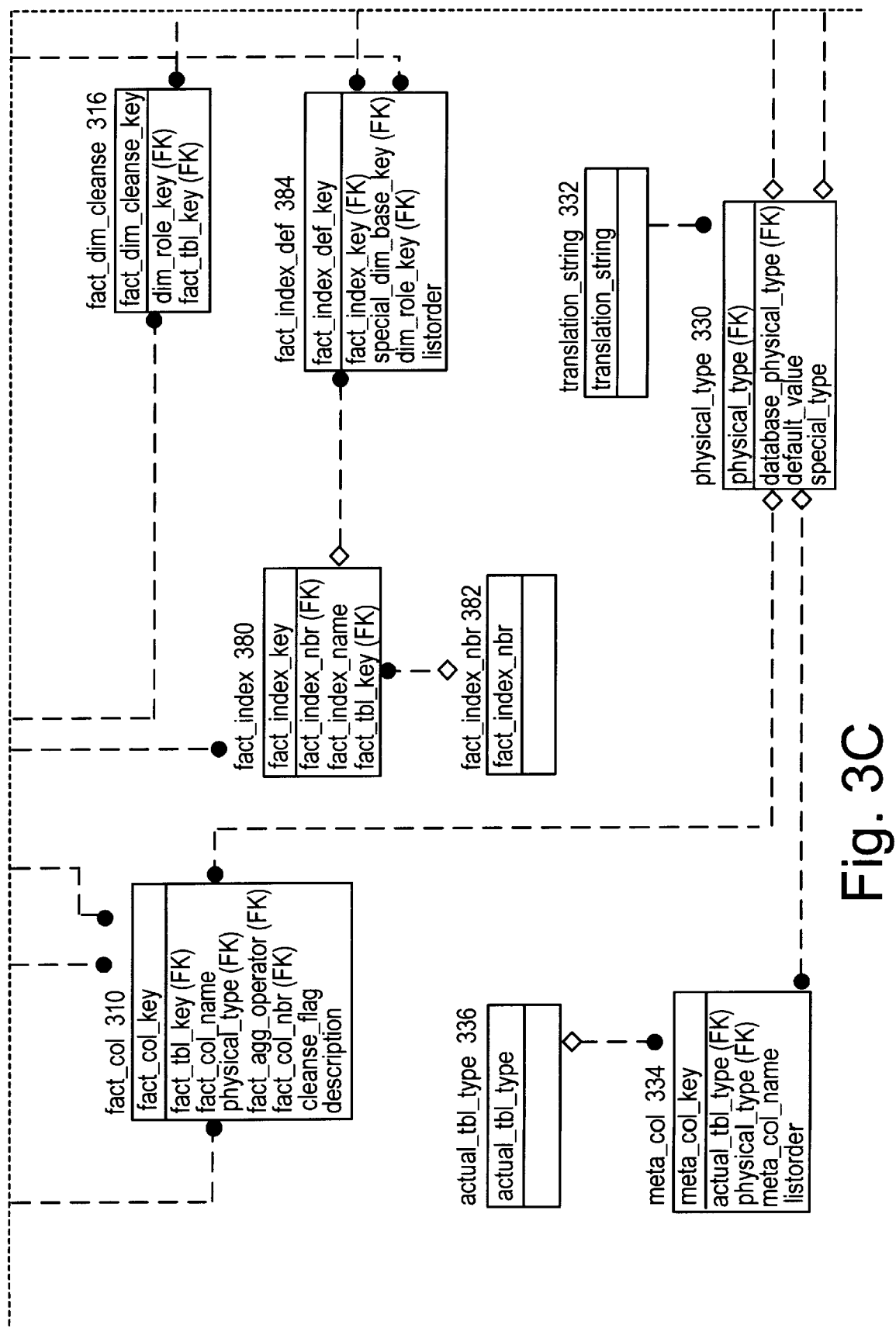
FIG. 3 illustrates a schema used in the system of FIG. 1 to define schemas for the datamart.
Figure 3D:
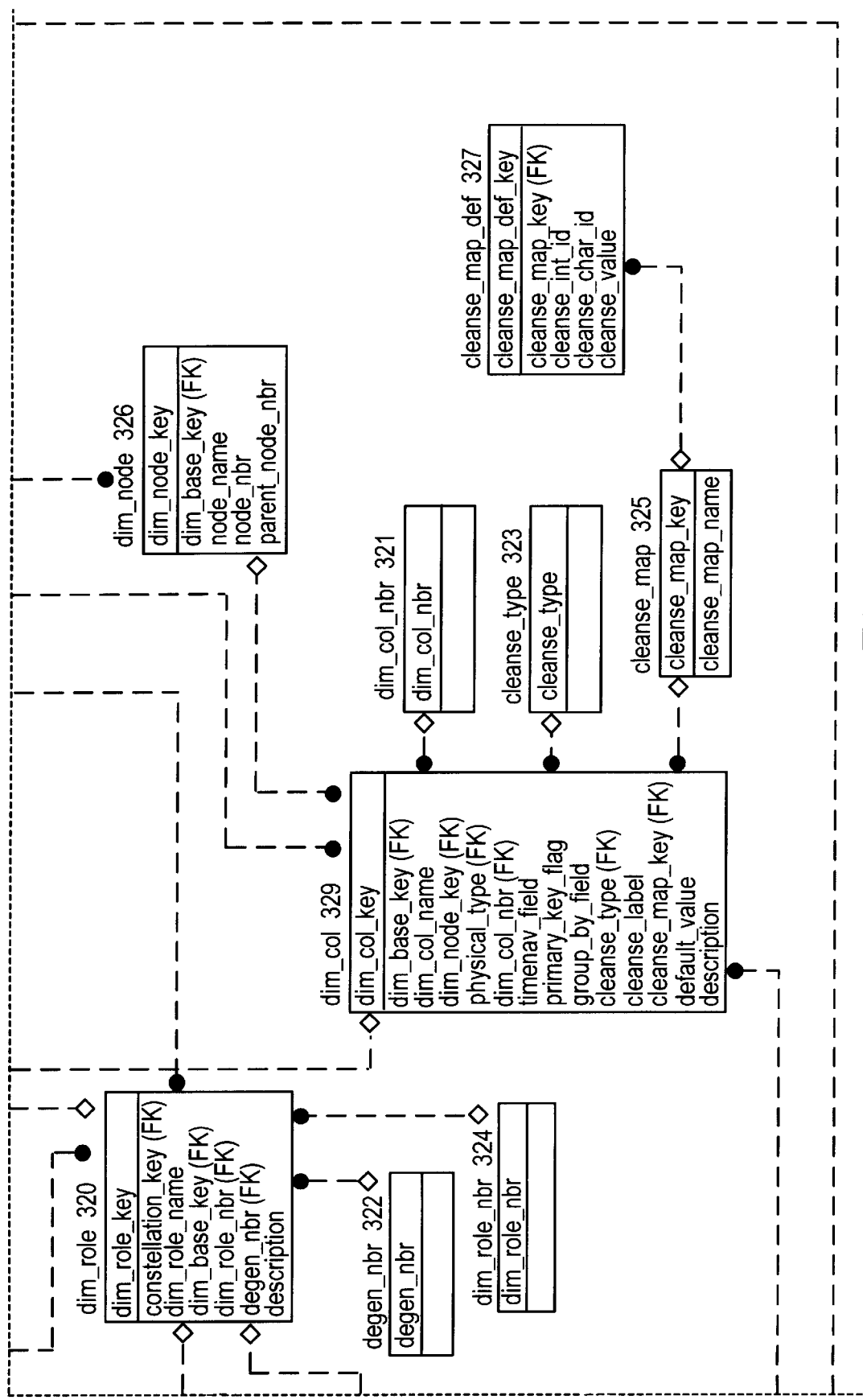

As noted in the background, multi-dimensional datamarts use star schemas. The system 100 uses star schemas in a larger organization that allows for the sharing of dimension tables by sets of similar facts. This larger organization is called a constellation. FIG. 3 illustrates a schema for the schema definitions tables that support constellations. (The schema of FIG. 3 is labeled the schema for schema definitions 300.) That is, FIG. 3 illustrates a schema used in the system 100 to define schemas for the datamart. FIG. 3 also illustrates some of the aggregate information 167 schema.

Figure 4B:
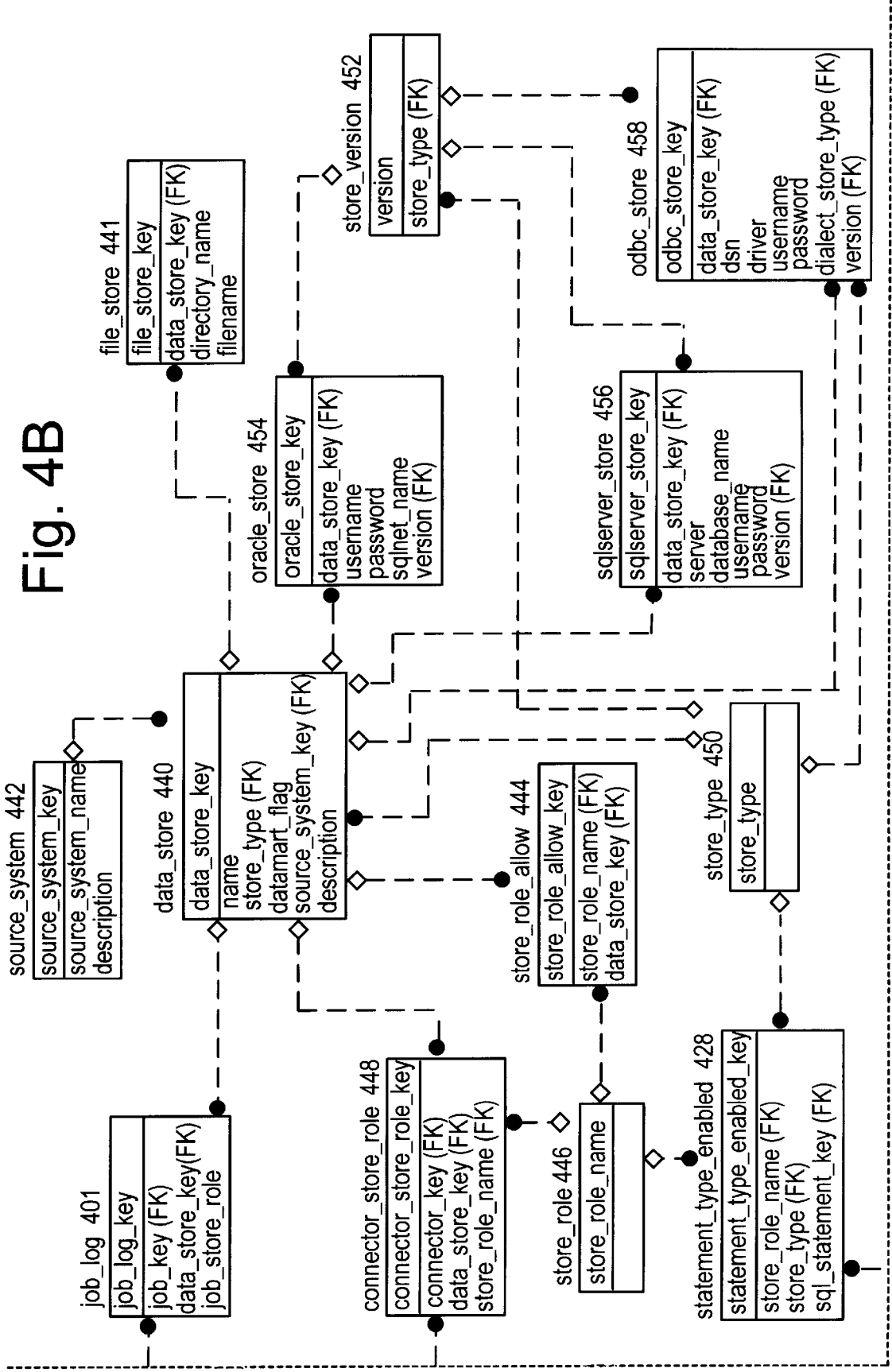
FIG. 4 illustrates a schema used in the data extraction and loading process.
Figure 4C:
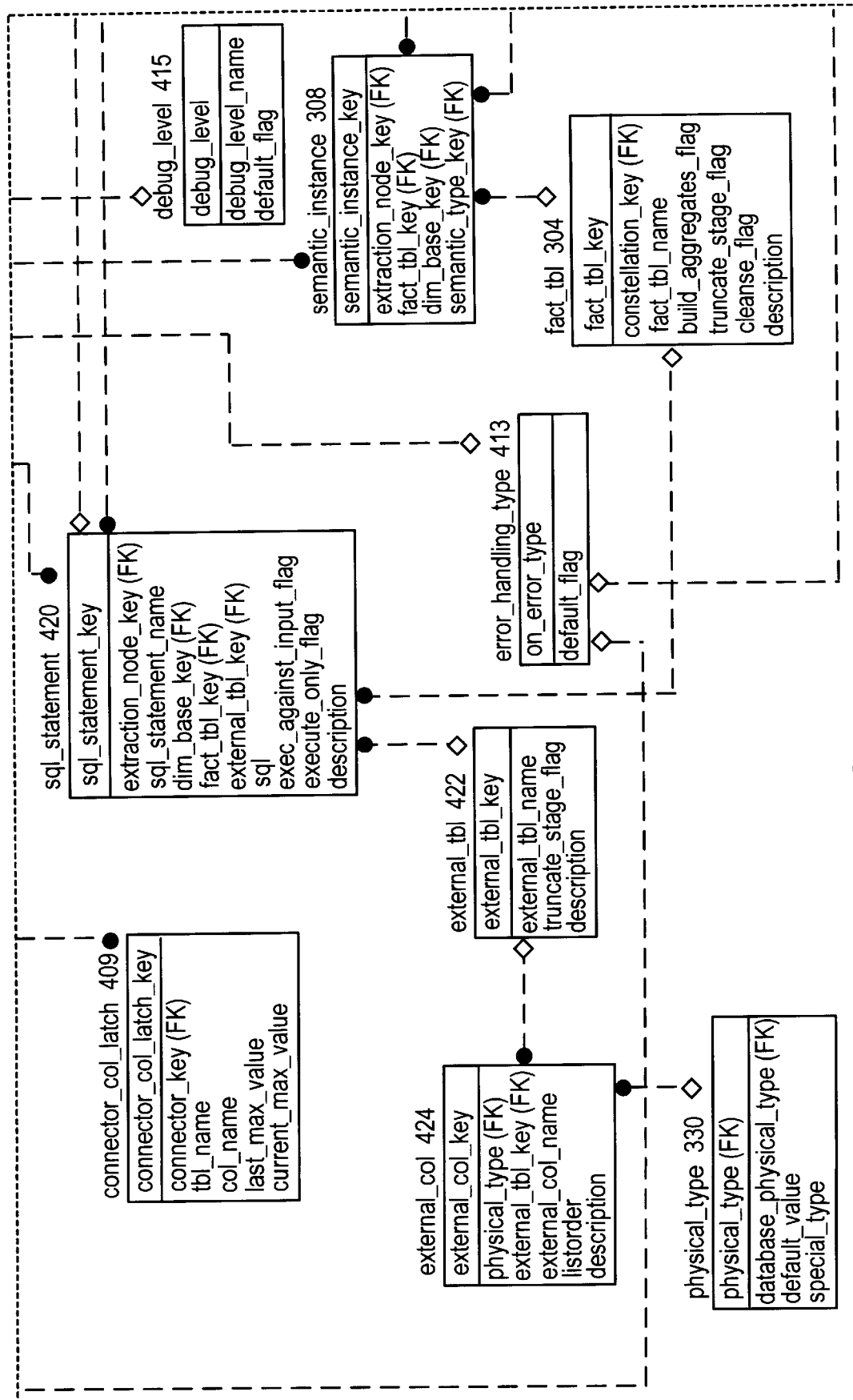
Figure 4D:
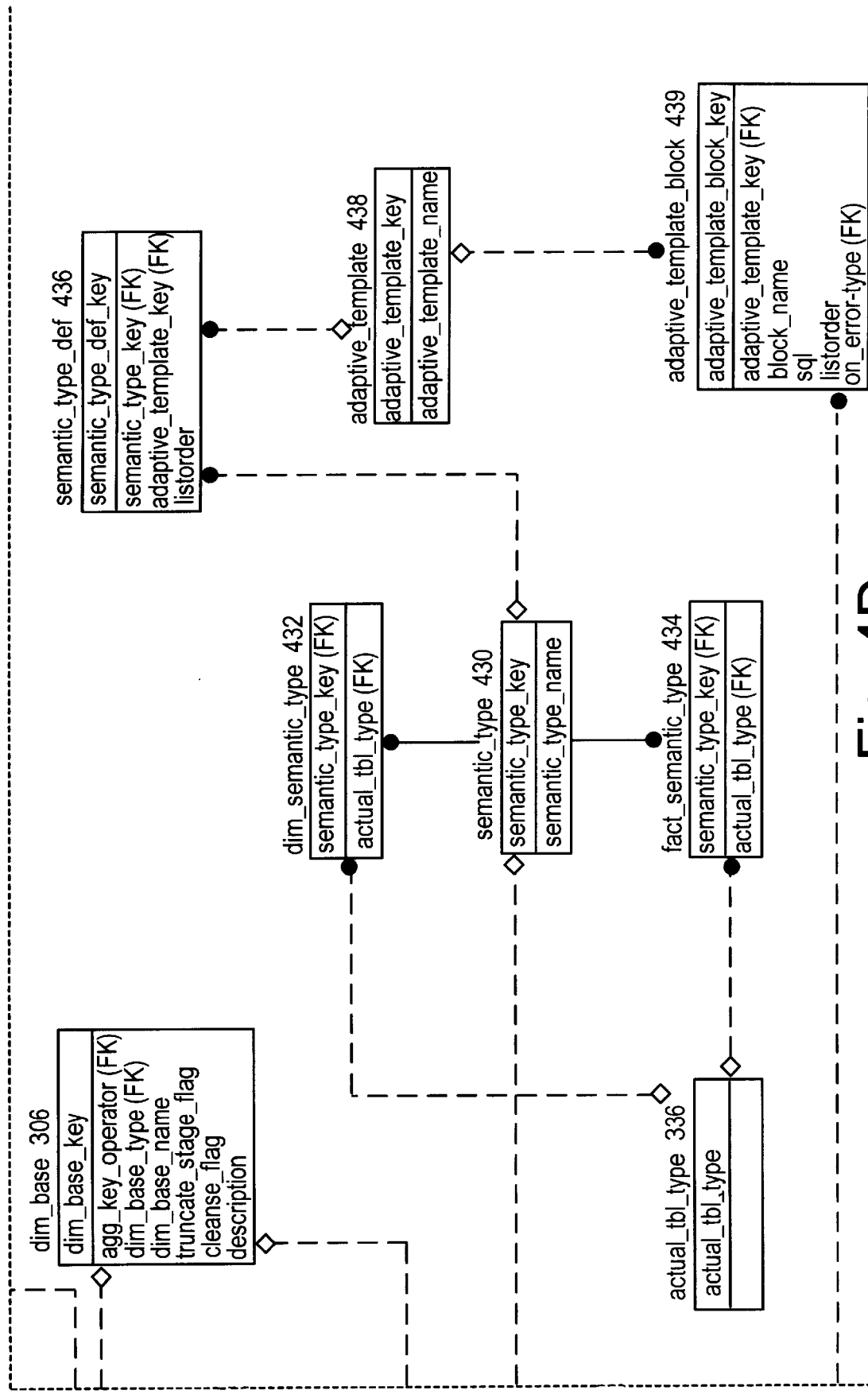
Figures 5, 5A:
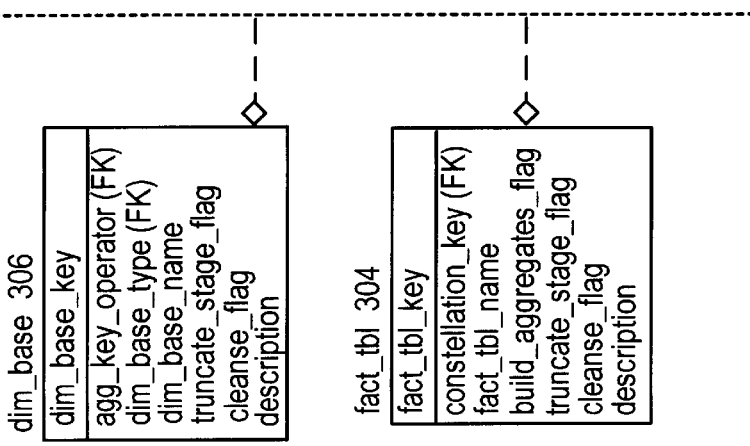
FIG. 5 illustrates a runtime schema including aggregates.
Figure 5C:
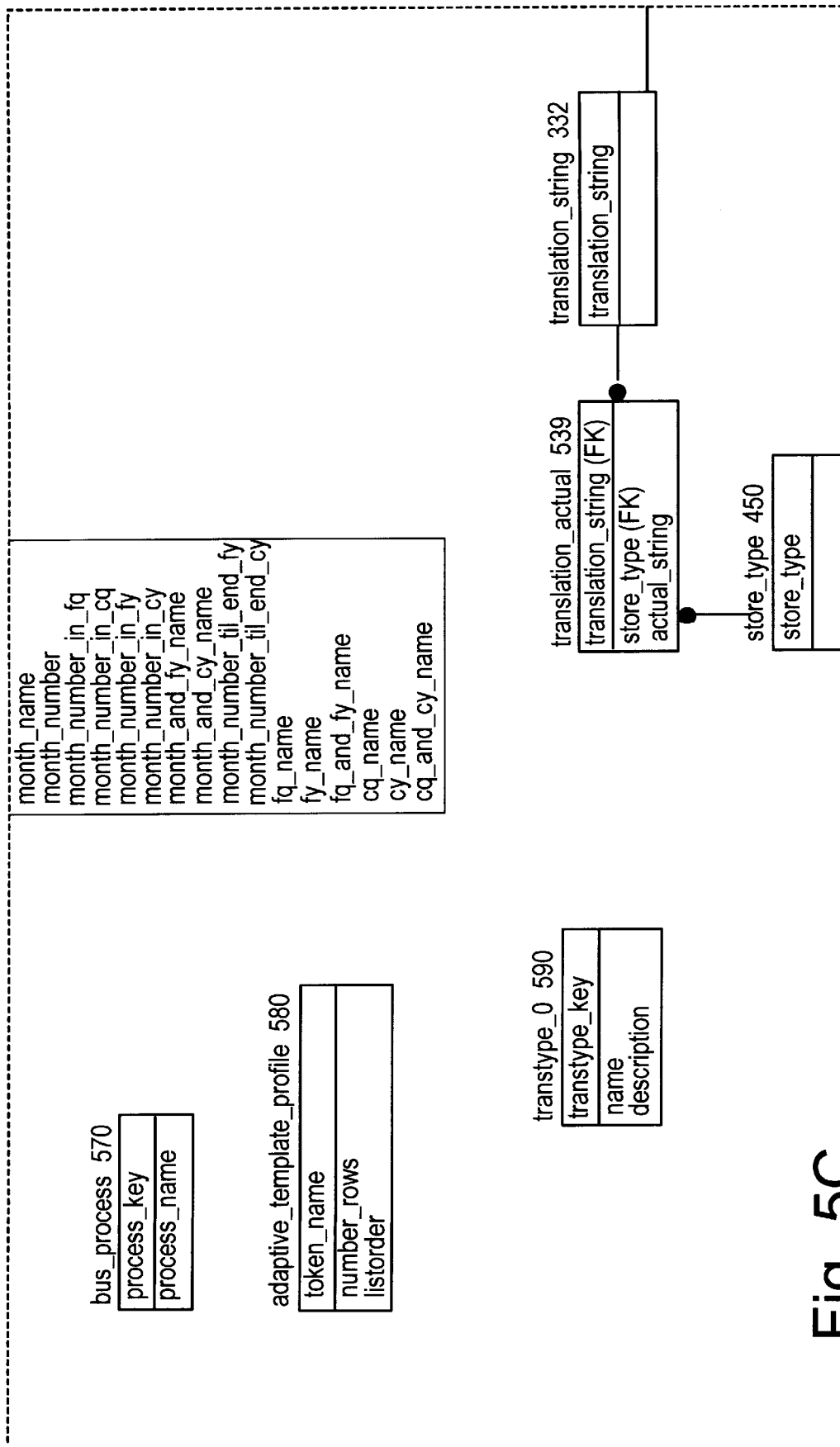

The following describes the meaning of the various graphical elements in FIG. 3 through FIG. 5. Each box in the figure represents a table having one or more attributes. A first table having a diamond graphic extending to second table (with a dot on the end) indicates that that second table has a foreign key pointing to the first table. This can be thought of as a parent child relationship.

It is important to remember that FIG. 3 through FIG. 5 illustrate the schema of the system used to generate and run the datamart 150. Rows in these tables define the schema for use in the datamart 150. From these rows, create table, table query, etc., commands are created. These commands are used to create the tables in the datamart 150 and to access that datamart.

Also, as mentioned previously, the datamart 150 is well-formed because, among other reasons, the system 100 automatically includes additional columns in the table created in the datamart 150. For example, source system key, foreign key, and time and date columns are automatically added (where appropriate). The rest of the elements of the system can then rely on the existence of these columns. This prevents, for example, the creation of an inconsistent schema where only some of the tables include date and time information.

The following first lists all of the elements in FIG. 3 and then describes those elements and their relationships.

Top Level Metadata List

FIG. 3 includes the following elements: a constellation 302, a fact table 304, a dimension base 306, a semantic instance 308, a fact column 310, a fact aggregate operator 312, a fact column number 314, a fact dimension cleansing 316, a dimension role 320, a degenerative number 322, a dimension role number 324, a dimension node 326, a dimension column 329, a dimension column number 321, a cleanse type 323, a cleanse map definition 327, a cleanse map 325, a physical type 330, a transaction string 332, a metacolumn 334, an actual table type 336, a dimension base type 328, a special dimension base 391, an aggregate key operator 392, an aggregate dimension type 393, an aggregate dimension 344, an aggregate group 342, an aggregate fact 340, a aggregate dimension set 372, a dimension column set 370, a dimension column set definition 374, a fact index 380, a fact index definition 384, and a fact index number 382.

Top Level Metadata Descriptions

It is important to remember that the tables in FIG. 3 are only used to define the schema in the datamart 150. Thus, a fact table 304 in FIG. 3 is not the actual fact table in the datamart 150, but the definition of that fact table. Each row in a table corresponds to an instance of that table.

The constellation 302 defines the organization of the schema in the datamart 150. It is the top level table in the schema definition.

Fact Related Tables

The fact table 304 defines the metadata 160 table describing all of the fact tables within a given constellation 302. The attributes of the fact table 304 include a build aggregates flag, a cleanse flag, a constellation key, a description, a fact table key, a fact table name, and a truncate stage flag. Each attribute corresponds to a column in the fact table 304. The build aggregate flag indicates whether or not to build aggregates for a particular fact on the next execution of the aggregate builder 170. The cleanse flag is a flag that is used in many of the tables to obliterate the actual measures within a table in the datamart 150 (particularly useful in demonstrations of the system 100 where sensitive data would otherwise be revealed). The constellation key points to the parent constellation 302 for a given fact table 304. The fact table name is the name of the fact table used in constructing the corresponding physical table names in the datamart 150. The truncate stage flag is used to indicate whether or not to truncate the fact staging table on the next extraction.

The fact column 310 lists all of the fact attributes within a single fact table 304. The fact column 310 includes a cleanse flag, a description, a fact aggregate operator, a fact column key, a fact column name, a fact column number, a fact table key, and a physical type. The fact aggregate operator is an SQL operator used to aggregate this fact column in the datamart 150. The fact column key is the primary key for the fact column. The fact column name is the physical name of the fact column. The fact column number counts and orders the number of columns in the fact table. The fact table key points to the fact table to which the corresponding fact column belongs. The fact table key points to the fact table to which the fact column belongs. The physical type is the database type for the fact column. This type is a logical type and provides for independence of implementation of the datamart 150 from the underlying database used.

The fact column number 314 and the fact aggregate operator 312 are used by the fact column 310. These have already been described in the context of the fact column 310.

The fact dimension cleanse table 316 has rows that indicate the dimension foreign keys in a fact that should be cleansed. The fact dimension cleanse table 316 includes a dimension role key, a fact dimension cleanse key, and a fact table key. The dimension role key indicates that this dimension role 320 is part of the "group by" set for cleansing a fact table without distorting trends in the data. The fact dimension cleanse key is the primary key for the fact dimension cleanse table 316. The fact table key is the fact table having its cleansing properties.

Dimension Related Tables

The dimension base 306 is the metadata 160 describing all the dimension tables that can be used in a given constellation 302. These dimension bases can then be used in multiple constellations. The dimension base 306 includes the following attributes: an aggregate key operator, a cleanse flag, a description, a dimension base key, dimension base name, a dimension base type, and a truncate stage flag. The aggregate key operator is an SQL operator used by the aggregate builder 170 to build aggregates from a dimension. The cleanse flag and description act similarly to those attributes in other tables. The dimension base key is the primary key for the dimension base 306. The dimension base name is the name of the base dimension used in constructing real tables in the datamart 150. The dimension base type indicates the type of a dimension base (either default or special (special includes "date" and "transaction type," which are used by the system 100). The truncate stage flag operates in the manner similar to other truncate stage flags.

The dimension column 329 defines the list of dimension attributes that are valid for a single base dimension 306 and inherited by a dimension usage. The dimension column 329 includes a cleanse label, a cleanse map key, a cleanse type, a description, a dimension base key, a dimension column key, a dimension column name, a dimension column number, a dimension number key, grouped by field, a physical type, a primary key, a time navigation field, and a default value. The cleanse label is a label presented to users after this column has been cleansed. The cleanse map key is for use when cleansing using value mapping. The cleanse map key indicates the mapping group to use. The cleanse type is the method for cleansing the dimension column 329. The description is for documenting the dimension column 329. The dimension base key is the numbered base in which the column resides. The dimension column key is the primary key for the dimension column 329. The dimension column name is the physical name of the column. The dimension column number is the count of the dimension columns (to prevent too many from being created in the datamart 150). The dimension node key is the aggregate hierarchy group in which the column resides. The "group by" field is used for special dimensions to indicate whether or not this column needs to be "grouped by" during the processing by the aggregate builder 170. The physical type is a logical database type for this dimension column 329. The primary key is used in special dimensions to indicate whether or not this column is the primary key. The time navigation field is for the date special dimension to indicate whether or not time navigation should use this field. The default value is the default value for the dimension column.

The dimension column number 321 is a look up table for the valid number of dimension columns that can be created. The dimension column number counts the number of dimension columns to make sure there are not too many being defined by the consultant.

The dimension role 320 is a metadata 160 table that describes all of the dimension tables used in a constellation 302. The dimension role 320 includes a constellation key, a degenerative number, a description, a dimension base key, a dimension role key, a dimension role name, and a dimension role number. The constellation key points to the constellation 302 in which the dimension role 320 resides. The degenerative number defines the order of degenerate columns within fact tables in a constellation. The description is a documentation field for describing a dimension role. The dimension base key is the dimension base that this dimension role refers to. The dimension role key is the primary key for the dimension role 320. The dimension role name is the name of the dimension role and is used when constructing the foreign keys in the fact tables in the datamart 150. The dimension role number defines the order of the dimension roles within a constellation. That is, a constellation may have multiple dimension roles and the dimension role number allows for an ordering of those dimension roles.

The dimension node 326 is a table used for defining and grouping hierarchical dimension attributes that are used by the aggregate builder 170. The dimension node includes a dimension base key, a dimension note key, a node name, a node number, and a parent node number. The dimension base key points to the dimension base being defined. The dimension node key is the primary key for the dimension node. The node name is the logical name for the aggregate hierarchy group being defined. The node number is the logical number for the aggregate hierarchy group being defined. The parent node number is a logical number for the parent of the aggregate hierarchy group being defined.

The degenerative number 322 and the dimension role number are defined as described in the dimension role 320.

The dimension base type 328 is defined as described in relation to the dimension base 306.

Semantic Instance Table

The semantic instance 308 is a single record that represents the manner in which a fact or dimension table is extracted from staging tables, manipulated, and then used to populate the corresponding table in the datamart 150. The semantic instance 308 includes an extraction node key, dimension base key, a fact table key, a semantic instance key, and a semantic type key. The extraction node key points to the extraction node that a particular semantic instance belongs to. The dimension base key is the dimension base table owning this semantic instance. The fact table key points to the fact table owning this semantic instance. Only one of the dimension base key and the fact table key is filled in for a semantic instance 308 because the semantic instance can only be applied to one or the other. The semantic instance key is a primary key for the semantic instance 308. The semantic type key is the indicator of the type of transformation necessary to construct this type of semantic instance in the datamart 150.

Aggregate Related Tables

The aggregate builder 170 is a program that uses the aggregate tables and the schema definitions 161 to build aggregates. Often this will be done on a nightly basis.

The aggregate group 342 defines a set of aggregates to be built for a constellation. An aggregate group 342 will cause a combinatorial creation of many aggregate tables in the datamart 150. The consultant defines for which dimensions aggregates are to be built (e.g., the consultant will define that one, none, all, etc. columns of a dimension are to be aggregated on in an aggregate group). The aggregate filtering done by the query and reporting program 104 will select the most appropriate aggregates for a given query.

The aggregate group 342 includes an aggregate group key, an aggregate group name, a constellation key, a default flag, a description, and an enabled field. The aggregate group key is the primary key for the aggregate group 342. The aggregate group name is the logical name of this aggregate group. A constellation key points to the constellation in which this aggregate group resides. The default flag indicates whether or not this group is the default group within a constellation. Default groups have facts and dimensions automatically added to them. They can also not be deleted. The description contains the documentation for this aggregate group. The enabled field indicates whether or not the aggregate builder 170 will actually build this group.

The aggregate fact table 340 tracks the membership of a fact within an aggregate group. The aggregate fact table 340 includes an aggregate fact key, an aggregate group key, and a fact table key. The aggregate fact key is the primary key for the aggregate fact 340. The aggregate group key is the aggregate group being defined by the aggregate fact The fact table key points to the fact table that is being made a member of the group.

The aggregate dimension 344 indicates the membership of a dimension within a constellation in an aggregate group. The aggregate dimension 344 includes an aggregate dimension key, an aggregate dimension type, an aggregate group key, a dimension role key, and a special dimension base key. The aggregate dimension key is the primary key for the aggregate dimension 344. The aggregate dimension type indicates the manner in which this dimension (special or role) will be included in the aggregate group. The aggregate group key indicates the aggregate group being defined. The dimension role key points to the dimension role being included. It is possible that this key is null. The special dimension base key indicates the special dimension being included. The special dimension base key can also be null.

The aggregate key operator 392 is defined as described in the dimension base 306.

The fact aggregate operator 312 is a look up table of valid fact aggregation operations. Each operator is an SQL operator used to aggregate a fact column.

A special dimension base 391 provides details about special built-in dimensions in the system 100. The special dimension base includes an "always include an aggregate" field, a default aggregate dimension type, a dimension base key, a list order in fact, a physical type of key, an index flag, and a special dimension base key. The "always include an aggregate" field indicates whether or not this dimension table must always be included in all aggregates. The default aggregate dimension type is the default manner in which this dimension is included in aggregate groups. The dimension base key is the one to one relationship to a dimension base. The list order in fact is the order in fact tables that the foreign key to this table will be listed. The physical type of key is the logical database type that foreign keys in the fact tables that point to this special dimension will be. The index flag is used in indexing. The special dimension base key is the primary key for the special dimension base 391.

Data Store Related Tables

The physical type 330 defines a look up table of logical data types that are relational database management system (RDBMS) independent. The physical type 330 is a logical data type that works across various source systems storage types. The physical type 330 includes a database physical type, a default value, and a special type.

The translation string 332 defines a list of strings that are translated for different RDBMS's. The translation string is a logical string that can be converted to specific strings for different storage types. Each storage type would correspond to a different source system 110.

Cleansing Related Tables.

The cleanse type 323 is a look up table to indicate how to cleanse a dimension column.

The cleanse map 325 is a mapping table for mapping real names to cleanse names. The cleanse map 325 includes a cleanse map key, which is the primary key, and a cleanse map name, which is the name of a set of mapping pairs for the purpose of scrambling data.

The cleanse map definition 327 defines the details of what should be mapped to which fields. The cleanse map definition 327 includes cleanse map character ID, a cleanse integer ID, a cleanse map definition key, a cleanse map key, and a cleanse value. The cleanse character ID is a character value for indexing into this mapping group. The cleanse integer ID is a numeric value for indexing into this mapping group. The cleanse map definition key is the primary key for the cleanse map definition. The cleanse map key is the mapping set to which this particular cleanse map definition belongs. And the cleanse map value is the translation value after the mapping.

Additional Tables

The metacolumn 334 is a column that occurs by default in tables in the datamart 150. The metacolumn 334 includes an actual table type, a list order, a metacolumn key, a metacolumn name, and a physical type. The actual table type indicates the type of physical table in which this special column should appear. The list order is the order this column occurs in tables of the appropriate type. The metacolumn key is the primary key. The metacolumn name is the physical name of the column when it is used. The physical type is the logical data type for this column.

The actual table type 336 is a look up table for actual table types. Actual table types can be fact, dimension stage, fact stage, dimension map, or dimension.

The aggregate group 342, the aggregate fact 340, the aggregate dimension set 372, the dimension column set 370, the dimension column set definition 374, the fact index 380, the fact index definition 384, and the fact index number 382 are for future use and are therefore optional. Each of these tables provides greater flexibility when defining the metadata 160, improves the performance of the system 100, or may otherwise enhances the system 100.

Top Level Metadata Use

Now that all of the elements in FIG. 3 have been listed and described, their relationships and workings are now described.

It is important to note that many of the tables in FIG. 3 are actually used in providing layers of abstraction to allow for the reuse of information and non-abstract tables. Therefore, a consultant will often only deal with only some of the tables in the FIG. 3. For the purposes of describing how the metadata 160 can be used to define a schema for the datamart 150, these grouping and levels of abstraction tables will be described where appropriate.

Generally, a consultant will create a new datamart 150 by defining instances of the dimension bases 306, and constellations 302. Each instance corresponds to a row in the dimensions bases 306 table or the constellation 302 table. The constellation instances are defined by defining aggregates, dimensions, facts, measures, and ticksheets. The following describes the definition of a schema using the metadata 160. This corresponds to block 210 of FIG. 2.

Beginning with the facts in a constellation, the consultant defines a fact table 304 row that will define the hub table in a star schema supported by the constellation. Again, it is important to remember that the fact tables in FIG. 3 are for definitional purposes, and are not the real fact tables in the datamart 150. A row in the fact column 310 holds the details of what columns will be created for place holders of actual values in a corresponding fact table. Thus, for each fact, the consultant defines the various fact columns.

Once the facts have been defined, the consultant can then define the dimensions of the constellation.

Remember that the dimension base 306 holds the information to define the actual dimensions of the tables in the datamart 150. The dimension role 320 allows for the reuse of the dimension base tables. Thus, different dimension roles can refer to the same dimension base. This provides an important feature of some embodiments of the invention where the same dimension bases can be used in multiple constellations or within the same constellation. The dimension columns 329 define the columns on which queries can be performed in the datamart 150. The dimension node table 326 helps relate the dimension columns 329. Thus, the consultant will have defined the basic schema for the datamart 150.

The aggregate group 342 defines how particular facts or dimensions are to be aggregated by the aggregate builder 170. These aggregated facts provide much faster queries in the datamart 150.

The cleansing map tables are for scrambling the data in the datamart 150 for presentations to people who want to see the functionality of the system 100, without having to reveal the actual data in the datamart 150.

The special dimensions are the transaction type table and date values that are included in every fact table. Because this is included in every fact table, the system 100 can rely on the existence of the transaction type during the various stages of datamart 150 creation, modification, querying, and the like.

Thus, the elements of FIG. 3 can be used to allow the consultant to define the schema definitions 161 for creating the tables in the datamart 150.

Extraction Metadata

The following describes the metadata 160 used in the extraction process 204. This metadata, represented as extraction schema 400, is shown in FIG. 4. The extraction process focuses around the job and connector tables. In general, these tables define the various steps in extracting the source system data into the staging tables 130 and performing the desired semantic conversions on that data.

Extraction Metadata List

FIG. 4 includes the following elements: a job 402, a job step 404, a system call 405, a connector 406, a connector time stamp 407, a connector step 408, a connector column latch 409, and an extraction group 411, an extraction note 410, an SQL statement 420, and error handling type 413, an external table 422, an external column 424, the physical type 330, the fact table 304, a debug level 415, the semantic instance 308, a semantic type 430, a dimension semantic type 432, a fact semantic type 434, the actual table type 336, a semantic type definition 436, an adaptive template 438, and adaptive template block 439, the dimension base 306, a job log 401, a connector store role 448, a store role 446, a statement type enabled 428, a store role allow 444, a data store 440, a source system 442, a file store 441, and Oracle store 454, a store version 452, and SQL server store 456, and ODBC store 458, and a store type 450.

Extraction Metadata Descriptions

Job Related Tables

The job 402 is a top level object for controlling the work flow during the extraction and loading process 204. The job 402 includes a check databases field, a check tables field, a description, a label, an initial load flag, a job key, a job name, a log file width, a mail to on error, a mail to on success, and a truncate flag. The check databases field indicates whether or not an attempt should be made to log into all the data stores before executing the job. The check tables flag indicates whether or not to check for the existence of all the tables in the datamart 150 before executing the job. The description is for documenting the job (usually done by the consultant). The enabled flag indicates whether or not a particular job can be run. The initial load flag indicates whether or not to ignore all previous time stamped constraints when running a particular job. The job key is the primary key for the job table 402. The job name is the internal name of the job. The log file width indicates how many characters wide to make rows in the log file output. The mail to on error, and the mail to on success indicate where E-mail messages should be sent after failure or success of the particular job. The truncate flag indicates whether or not to truncate any tables when running a job.

The job log 401 is the locations where the running job is logged. That is, the location of the output that will be provided to the consultant indicating what occurred during the extraction (e.g., what errors occurred). The job log 401 includes a data store key, a job key, a job log key, and a job store role. The data store key indicates the data store having a role defined within the job. The job key is a reference to the particular job, the job log key is the primary key for the job log 401. The job store role is the role being assigned to that particular job log 401. An example job store role is "<working directory>," indicating the path to the working director where job log files are store.

The job step table 404 includes the detailed steps that make up a job. This includes connectors and system calls. The job step table 404 includes the following attributes: a connector key, a description, an enabled flag, a job key, a job step key, a list order, a phase, a job step type, and a system call key. The connector key indicates the connector being included in any particular job step. The connector key can be null. The description is for documenting the job step. The enabled flag indicates whether or not a particular step is enabled. The job key points to the job being defined by the job step 404. The job step key is the primary key. The list order indicates the order of a particular job step. The phase also indicates the order of a particular step. By supporting both list order and phase, alternative embodiments of the invention can support parallel extraction. Steps in the same phase can then be executed simultaneously. The job step type indicates the type of the job step (which are defined in the job step type table 481). The system call key points to a system call included in a particular job step. The system call key can be null.

The system call 405 is a table including external OS system calls. These external system calls can be used to perform any number of external system functions. The system call 405 includes the system call key, a command string, a description, a name, and an on-error type. The system call key is the primary key for the system call. The command string is the actual operating system command to be run as a result of the system call. The description is for documenting the system call. The name is the logical name of the system call being defined. The on error type is an indicator to point to what to do if the system call fails.

Connector Related Tables

The connector 406 defines a name and a description. The connector 406 is a grouping mechanism for extraction statements and a specification for input and output data stores. The description is used for documenting the connector. The name is the logical name of the connector. The connector 406 represents an ordered collection of connector steps 408.

The connector step 408 defines steps within a connector. The connector step table 408 includes the following attributes: a connector key, a connector step key, an enabled flag, an extraction node key, a list order, and a phase. The connector key points to the connector being defined. The connector step key is the primary key. The enabled flag indicates whether a particular connector step is enabled. The extraction node key points to an extraction node that is, the extraction group of statements and semantics that make up this connector step. The list order is the order of steps in the connector. The phase is also the order of the steps in the connector.

The connector time stamp 407 relates to information about incremental extraction. An incremental extraction is where increments of the data in the source system 110 are extracted. The connector time stamp includes a connector key, a connector time stamp key, current max date, a current max time stamp, a last max date, and a last max time stamp. The connector key points to the connector to which the connector time stamp applies. The connector time stamp key is a primary key. The current max date is an indicator of the proposed new system date of the last successful extraction. The current maximum time stamp is the proposed new SQL server time stamp field for the last successful extraction. The last maximum date is the system date of the last successful extraction. The last maximum time stamp is the SQL server time stamp field for the source system databases at the last successful extraction.

The connector time stamp 407 is particularly useful when only updated data should be pulled from the source systems 110.

The connector column latch 409 defines information about incremental extraction based on a database column. The incremental extraction information is thus kept in the database and can be retrieved. The connector column latch 409 includes the following attributes: a column name, a connector column latch key, a connector key, a current maximum value, a last maximum value, and a table name. The table name is the name in the input data store for the corresponding connector. The column name is the column name within that table. The connector column latch key is the primary key. The connector key points to the connector to which this latch applies. The current max value represents the proposed new maximum value for the incremental extraction. This number is pushed into the last maximum value if the currently executing extraction succeeds. The last maximum value is the maximum value that was extracted during the last run of the extraction.

The connector store role 448 defines the usage of a data store for a particular connector. It indicates whether the data store is input or output. The connector store role points to the connector and the data store. The connector store role also indicates the type of storage usage being defined for this connector (input or output).

Extraction Group Related Tables

The extraction group 411 defines a group of extraction steps. The extraction group 411 includes a description, and a name of the set of extraction steps.

The extraction node 410 is a single node, or step, in the extraction tree. The extraction tree defines the order of extraction steps. An extraction node includes an extraction node type, a debug level, a debug level row, an enabled flag, an extraction group key, an extraction node key, a list order, and on error type, a parent extraction node key, and a phase. The extraction node type defines the type of extraction node (as defined in the extraction node type table 491). This relationship is important and allows for the conversion of data in the staging tables for use in the datamart 150. The debug level indicates how to debug a particular step during execution. The debug level row indicates which row to start debugging at for SQL statements. The enabled flag indicates whether or not to execute a particular SQL statement associated with the extraction node. The extraction group key points to, if not null, the name of the group. The extraction node key is a primary key. The list order and the phase define the order of the corresponding step within an extraction node's parent. The on error type indicates what to do if there is an error during the execution of the step associated with the extraction node. The parent extraction node key points to the parent extraction node of the present extraction node.

SQL Statement Related Tables

The SQL statement 420 defines a single step in an extraction run. A row in the SQL statement 420 table represents an SQL statement. The columns in the SQL statements match those in the corresponding dimension base definition or fact table definition. In one embodiment the consultant supplies the SQL source in SQL statements.

The SQL statement 420 includes an extraction node key, a description, a dimension base key, and execute against input flag, an external table key, a fact table key, SQL source and SQL statement key, and an SQL statement name. The extraction node key points to the extraction node associated with a particular SQL statement 420. The description is for documenting the SQL. The dimension base key points to the dimension base for the corresponding SQL statement. The execution against input flag indicates whether or not to execute this SQL statement against the source or destination data store of the connector that is calling this SQL statement. The external table key points to the external table, if any, being extracted into. The fact table key points to the fact table, if any being extracted into. The SQL source is the actual SQL source to be executed during the SQL statement execution. The SQL statement key is the primary key. The SQL statement name is the logical name for an extraction SQL statement.

The statement type enabled 428 defines which RDBMS types use this extraction statement. The statement type enabled 428 includes the following attributes. An SQL statement key, a statement type enabled key, a store role name, and a store type. The SQL statement key points to the SQL statement. The statement type enabled key is the primary key. The store role name is the role name for which this SQL statement should be used. The store type is the store type for which this statement should be executed.

The external table 422 defines the user defined destination table for use during a multiphase extraction. This user defined destination table can be used to temporarily store data during an extraction. The external table 422 defines the physical name of the external table and whether or not to truncate this external table on the next job run.

The external column 424 defines a column in a user defined extraction table. The external column 424 includes the attributes for documenting a particular external column, and the column name in the external table. A pointer to the external table, a list order of appearance in the external table, and a physical type of the logical database for this column are included in the external column 424.

Error Handling

The error handling type 413 is a look up table to define how to respond to a particular error. An error handling type can be a default action to take when an error occurs.

The debug level 415 defines ways in which extraction steps can be debugged. The debug level includes a logical name for users to pick a debugging behavior. The default level also includes a default flag.

Data Semantic Related Tables

The semantic type 430 defines a set of predetermined semantic types for use in defining a schema. The semantic type includes a logical name for a particular transformation. Associated with the semantic type are a dimension semantic type 432 and a fact semantic type 434. The dimension semantic type table 432 defines the ways in which dimension data in the staging tables 130 can be extracted and put into the datamart 150. Similarly, the fact semantic type defines the ways in which the information in the staging tables 130 can be put into the fact tables of the datamart 150. Both the fact semantic type 434 and the dimension semantic type 432 include pointers to an actual table type and are used to subset the full list of semantic types.

Each semantic type 430 is made up of a semantic type definition. The semantic type definition table 436 defines the set of adaptive templates used in any given semantic type. The semantic type definition 436 includes the semantic type key that points to the semantic type 430 for a particular semantic type definition. The semantic type definition also points to the adaptive template 438 used. The semantic type definition also includes a list order for the ordering of the adaptive templates.

The adaptive template 438 is a semantic transformation template (e.g., an SQL program) that is used in the extraction of the data in the staging tables 130 to turn all source data into transactional data. The adaptive template 438 includes attributes indicating a logical name for an adaptive program used within semantic transformations.

The adaptive template block 439 defines the individual pseudo-SQL statements that make up a template. The adaptive template block 439 has the following attributes: the adaptive template block key, an adaptive template key, a block name, a list order, an on error type, and SQL source. The adaptive template block key is the primary key. The adaptive template points to the adaptive template to which this block belongs. The block name is the internal logical name for this block of pseudo-SQL source code. The list order is the order of this block within the template. The on error type indicates what to do if this block causes an SQL error when executed. The SQL source includes a template of pseudo SQL source code. This template is described in greater detail below.

Data Store Related Tables

The store type 450 defines the types of RDBMS's supported by the system 100.

The data store 440 defines a logical data source, or sink, used during the extraction. The data store 440 includes the following attributes: the data store key, a data store flag, a description, a name, a source system key, and a store type. The data store key is the primary key. The datamart flag indicates whether or not this data store is the special datamart store. Since the datamart 150 and the metadata 160 can reside in the same database or different, the data mark helps resolve the location of the datamart 150. The description is for documentation of the particular data store. The name is the logical name of the data store. The source system key points to the source system identifier to which this data store belongs. This allows live, and backup, source systems to share the same identifier. The store type indicates the store type of this data store.

The source system 442 is a logical identifier for a source system 110 from which data can be pulled. This allows two physical databases to act as one master database and one backup, for example. The source system 442 includes a description attribute, a source system key and a source system name. The description is for documentation to describe the source system. The source system key is a primary key for this table. This number also becomes identified source system field in the staging tables 130 being filled. The source system names is a logical name for a source system 110 from which the system 100 is pulling data.

The following store tables are subtypes of the data store table 440. They address specific data stores.

The file store table 441 defines the files in which data can be stored. The file store 441 defines a directory and file name for each file.

The Oracle store 454 defines information about particular Oracle databases. The Oracle store 454 includes the following attributes: a data store key, an instance name, an Oracle store key, a password, an SQL network name, a user name, and a version. The data store key is a one to one relationship key to the data store being defined. The Oracle store key is the primary key. The password and user name are used to access a specific Oracle system. The version number is the Oracle vendor version number. The SQL network name is the SQL net instance name. The store version is a version of the store type (the database vendor's version for example) that the system recognizes. The store version has a pointer to the store type being defined and also includes a version number attribute.

The SQL server store table 456 defines details about an SQL server system. The SQL server store includes the following attributes: a data store key, a database name, a password, a server, and SQL server store key, a user name, and a version. The data store key is a one to one relationship to a data store entry. The database name is an SQL server database name ($$DEFAULT means the database in which this role resides). The password is the SQL server password. $$ DEFAULT again means the password currently logged into to read this data. The server is the SQL server name. The SQL server store key is the primary key. The user name is the SQL server user name. The version is the vendor's version number of this SQL server. $$DEFAULT means use the default value for the current database being used. For example, the database name means the database in which this role resides.

Extraction Metadata Use

The following describes the tables of FIG. 4 in the context of the extraction process 204. The job, the job step, and the connector, group extraction steps for extracting information from the source systems 110 and cause that information to be placed in the datamart 150. This organization allows for a very flexible extraction process. For example, where a two phase extraction is required, one connector could be used to extract the information from the source system 110, while a second connector could then be used to take this extracted data from an external table.

The job defines the order of the execution of the connectors. The job also allows for the running of an external program, such as system call, between connector executions. Thus each, job step in a job can be a system call or a connector.

The following is an example illustrating the organization of job. Assume that a consultant wants to extract information from a source system that provided a raw set of home addresses. A system call could be run as part of a job step. The system call would determine the zip codes associated with those addresses. The zip codes could then be included in the datamart 150.

The relationship between the connector 406, the connector step 408, and the extraction node 410 is that the connector 406 allows for the reuse of extraction nodes in multiple connectors (through the connector step). This relationship is particularly important where similar connectors are created. For example, assume that a consultant wants to create a connector that runs some steps Monday through Friday and different steps on Saturday and Sunday. Most of the steps in the connector will be common, however some will be different. Through the use of the connector step, the consultant can reuse many of these connector steps in each connector.

As noted before an extraction node can be a leaf or a grouping mechanism for extraction. It can correspond to an SQL statement extraction step or a semantic conversion step. During the definition of the schema, the consultant defines the specific SQL statements for extraction and the specific semantic instances for the facts and dimensions.

An SQL statement is a single step in an extraction run that represents a data push or a data pull. The SQL source code dictates the action for a given extraction node. After the SQL statements are run, the staging tables 130 are ready. The semantic conversion of the data in the staging tables 130 can occur.

The semantic instance represents the use of a single generic template on one fact or dimension table. The semantic type associated with the semantic instance is one of a number of pre-defined recognized data meanings within the system 100 (e.g., an "order"). The semantic types correspond to programs for converting the data in the staging tables 130 into data for use in the datamart 150. An example of a semantic type is a "slowly changing dimension" type.

The semantics types, as mention previously, are made up of a series of templates. These templates include tokens that can be replaced with information from the corresponding dimension base or fact table. An example of an adaptive template is one that would be used in re-indexing of a fact table. This could be used as the last step in the semantic transformation of facts. The re-indexing will help speed the operation of the datamart 150. Importantly, this same indexing is performed for each fact table. No matter which semantic type is chosen for a given fact table, the same indexing is performed. Thus, this adaptive template can be used in each semantic type through its semantic type definition.

The following describes the slowly changing dimension semantic type. (See Appendix A.) In this semantic type are an insert dimension and an index dimension adaptive template. Each adaptive template has a corresponding set of pseudo-SQL statements. During the semantic template conversion 140 this pseudo-SQL will be transformed into real SQL source code. This is done by converting the pseudo-SQL tokens into actual dimension column names, etc. (the column names and table names are derived from the schema definitions 161).

Thus, during the extraction, the extraction node associated with a particular semantic type instance is processed. This causes the adaptive template blocks associated with the semantic instance to be processed. The dimension information associated with that semantic instance, or the fact table information associated with the semantic instances, can then be used to replace the tokens with the specific information associated with that dimension or that fact.

Some embodiments of the invention correspond to only one or more semantic templates and a computer readable media, a computer, an electromagnetic waveform, or the like.

Further Discussion of Templates

The following describes the pre-parsed template and the post-parsed results in greater detail. Each token begins with a $$. In the example template, for the slowly changing dimension semantic type, a number of tokens begin with $$ DIM KEY. Similarly, tokens appear that begin with $$FSTGTBL[]. In the post-parsed template, the dimension key tokens have been changed to cost center keys, account key, subaccount keys, etc. Note any tokens, and their surrounding text, that are not replaced are removed from the post-parsed text. If more tokens need to be replaced then are available in the template, then an error flag will be set. In other embodiments of the invention, the templates are dynamically generated according to the number of columns defined in the schema definition 161. In other embodiments, templates are not used but the "post-parsed SQL" results are dynamically generated from the schema definitions 161 and the semantic instance types.

In this example, the net price corresponds to a fact column in a fact table. This indicates that the table entitled SSA in the post-parsed example includes one fact called net price.

In some embodiments, the pre-parsed templates include additional tokens to deal with specific data stores. For example, the "select into" statement is a token in the pre-parsed version. This compensates for whether the data store is in Oracle database or an SQL server.

Another feature of the pre-parsed language is that "—#begin#" is used to break the pre-parsed version into adaptive template blocks.

EXAMPLES

Appendix A illustrates semantic types that may be supported and their corresponding adaptive template names. For example, the Pipelined semantic type is made up of, in this order, the map_keys the pipe_state and the index_fact adaptive templates. The example pre-parsed and post parsed SQL adaptive templates are then provided.

As mentioned previously, the use of the semantic types significantly reduces the amount of work needed to implement the datamart 150. By selecting a semantic type for a particular fact table or dimension table, the consultant automatically selects the corresponding pre-parsed SQL adaptive templates. The selected adaptive templates are then automatically converted into post-parsed SQL statements that include the schema specific information for the datamart 150. Additionally, these post-parsed SQL statements include the SQL for converting the data in the staging tables 130 into data that can be used in the datamart 150 tables.

Additional Templates

Two types of templates not described in Appendix A are "team" templates and "denormalized" templates.

The team template is used to properly populate an "associative" dimension table. Such a table is used whenever there is a one-to-many relationship between an individual fact row and a dimension. For example, if multiple salespeople can split the credit for an order, one needs some way to represent this situation in the datamart. In a star schema, one normally associates a tuple of dimension values with a fact row (e.g. product, customer, salesrep dimensions for the fact row containing price, quantity etc.). Since there is only a single salesrep_key, one could normally have only one salesrep associated with this transaction. There are two solutions. One is to introduce multiple fact rows for a transaction involving one to many relationships. If there were three salesreps on a specific order, there would be three fact rows for this order stored in the database. This has the disadvantage of multiplying the data size by a factor of three and slows queries. Also queries that are concerned with the total number of transactions become more difficult to process since duplicate rows, due to the multiplication by the number of salesreps, must be eliminated.

Another solution is to introduce an associative table between the actual salesrep dimension table and the fact table. Conceptually, the associative table contains "teams" of salespeople. If salesreps A, B and C often sell products together, they will be associated with a unique team key. The team key will be stored in each fact row for orders sold by the A, B, C team. The associative table will associate the team key with the three rows for A, B and C in the salesrep table. The associative table will have 3 rows representing this team (A-key, team1-key), (B-key, team1-key) and (C-key, team1-key). If the team of A, B, D and Q also sold products together, the associative table would have four additional rows (A-key, team2-key), (B-key, team2-key), (D-key, team2-key), (Q-key, team2-key). The team template scans the staging table used to load the fact table and generates the appropriate rows for entry into the associative table, only for those teams THAT ACTUALLY OCCUR in the fact rows being loaded.

Also, if a team is already present in the associative table it will be reused.

In real world situations, the number of teams that actually occur is much smaller than the total space of all possible teams.

Note that this team template can be used wherever there is a one to many relationship between fact and dimension rows.

Another example is in a Sales Force Automation system where the fact rows correspond to a sales "opportunity".

An opportunity may be associated with the dimensions of Sales Lead Source, Product and Customer Contact. All of these may be one to many relations, amenable to the "team" concept.

As mentioned above, the other type of template is the denormalized data template. This is a variant of the "Team" template where instead of introducing the extra associative table between the dimension and fact tables, the dimension table is a combination of the associative table and the actual dimension table. This effectively flattens the data. In the above example the dimension table would contain rows like ("Greg Walsh", A-key, team1-key), ("Craig", B-key, team1-key), ("Ben", C-key" team1-key), ("Greg Walsh", A-key", team2-key) etc. Greg Walsh is a member of both teams 1 and 2 and his name (and other attributes) rather than just his key (A-key) is stored twice. Used judiciously this can result in faster queries than the associative table case but results in duplicate data being stored.

The population of both the denormalized team dimension and the associative table are difficult to code properly. This is especially true if this is done incrementally (e.g., on nightly extracts) and if you want to be independent of team order (e.g. A, B, C) is the same as (A, C, B). Thus, allowing the consultant to simply select this data semantic provides a significant improvement over previous systems.

Runtime Metadata

FIG. 5 illustrates the schema for the runtime environment within the system 100. The runtime schema 500 represents the schema description for the schema of the running datamart 150. That is, when the datamart 150 is created or modified, the schema definition is propagated into the runtime schema 500. Thus, the runtime schema 500 allows for the datamart 150 to be changed without having to rebuild all the tables and repopulate all of those tables. Additionally, the runtime metadata 500 provides the support for aggregate navigation. Aggregate navigation involves determining which aggregate to use in response to a query. Schema modification and aggregate navigation will now be explained in greater detail.

The schema modification involves comparing the changed schema definition with the present schema definition. As will be seen below, an actual table 502 keeps track of all of the dimension tables and the fact tables in the datamart 150. When a change is made to the schema definition, a comparison is made between the old definition and the new definition. The difference between these definitions defines the set of tables, columns, and rows that need to be added, deleted or modified, in some way. Importantly, the modifications can often be made without losing any data in the datamart 150.

The aggregate navigation process determines which aggregate most closely suits a particular query. The runtime metadata 160 keeps track of the aggregates available in the datamart 150. The query and reporting program 104 initiates a view of the runtime metadata 500 (in particular, the tables holding the aggregate tables definitions). The view results indicate which aggregates are available to answer the particular query. The view results are further examined to determine the best aggregate to use (the one that most closely corresponds to the query).

Importantly, the query machinery does not need to be aware of aggregates to be able to take advantage of them. Aggregates are simply presented to the query machinery as a solution to a query.

Additionally, aggregates can use other aggregates to build themselves. This is because the schema definition can be used to determine the relationship between aggregates.

Runtime Metadata List

The runtime schema 500 includes the following elements: an actual table 502, an actual column 504, a fact aggregate table 512, a fact aggregate dimension 514, a dimension base aggregate 516, a dimension base aggregate column 518, a datamart letter 510, the dimension base 306, the fact table 304, the external table 422, an actual column 504, a physical type definition 530, an actual table type 336, an actual column type 540, the physical type 330, a database physical type 595, the translation string 332, a translation actual 539, a store type 450, a date 560, a business process 570, an adaptive template profile 580, and a transaction type 590.

Runtime Metadata Descriptions

The actual table 502 corresponds to metadata 160 that describe which dimension base and fact tables "actually" exist in the datamart 150.

The actual table 502 includes the following attributes: an actual table key, an actual table name, an actual table type, a dimension base key, an external table key, a fact table key, an index flag, a mirror flag, and a logical table name. The primary key is the actual table key. The actual table name corresponds to the physical name of this table in the database implementing the datamart 150. The actual table type is the logical type of this physical table. For example, if this is a dimension staging table or a fact staging table. The dimension base key points to the dimension base table definition that defined the corresponding physical table. The external table key points to the external table definition that defined the physical table. The fact table key points to the fact table definition that defined the corresponding physical table. The index flag and the mirror flag are used in indexing and mirroring, respectively. The logical table name defines the logical name for this table.

The actual column 504 is metadata describing a physical column in a physical table in the datamart 150. The actual column table latches this definition information when the physical tables are built in the datamart 150. The actual column 504 includes the following attributes: the actual column key, an actual column name, an actual column type, an actual table key, a dimension role name, a foreign table key, a group by field, a hierarchy, a list order, a parent hierarchy, a physical type, a primary key, and a time navigation field. The actual column name is the name of the physical column in the physical table in the datamart 150. The actual column type is the logical type of the column. The actual table key points to the actual table in which the actual column lives. The dimension role name is the logical role name of the dimension in the fact table for dimension foreign keys inside of a fact table. The foreign table key points to the actual dimension base tables in the actual tables 502 (the foreign table key is applicable to fact actual columns that are foreign keys to dimensions). The group by field, for dimension table, is true when this column should be included in an aggregate builder group. The hierarchy for dimension, for dimension columns, indicates that aggregate builder group to which this column belongs. The list order is the order of the column in the actual table 502. The parent hierarchy, for dimension columns, indicates the parent aggregate builder group to which this column belongs. The physical type is a logical data type of the column. The primary key, for dimension tables, is true when this column is the primary key of the actual table 502. The time navigation field, for the database dimension, is true if this field can be used by the time navigator.

The fact aggregate table 512 includes a list of fact aggregates in the datamart 150. The fact aggregates includes attributes that point to the actual fact table in which this aggregate belongs. The fact aggregate table 512 indicates which numbered aggregate represents the fact table in question, the number of rows in this aggregate, a datamart letter, and an enabled flag. The datamart letter indicates the mirrored datamart to which this fact aggregate belongs.

Mirror is used to ensure that partially completed extractions from the source systems 110 do not cause the database to become inconsistent.

The fact aggregate dimension 514 lists which aggregates contain which dimensions. The fact aggregate dimension includes the following attributes: an actual dimension role key, a dimension base aggregate key, a fact aggregate dimension key, and the fact aggregate key. The actual dimension role key is the dimension foreign key in this fact aggregate that is being defined. The dimension base aggregate key is the dimension aggregate that this fact aggregate points to for this foreign key. The fact aggregate dimension key is the primary key. The fact aggregate key points to the fact aggregate being defined.

The dimension base aggregate table 516 lists all the dimension aggregates in the datamart. The dimension base aggregate includes the following attributes: an actual table key, an aggregate number, an aggregate size, a datamart letter, a dimension base aggregate key, and an enable flag. The actual table key points to the physical header for this dimension base. The aggregate number, for the dimension table in question, is the number of this particular aggregate. The aggregate size is the number of rows in the aggregate. The datamart letter indicates which mirrored database this aggregate lives in. The dimension base aggregate key is the primary key. The enable flag indicates whether or not the aggregate navigator should work with this aggregate.

The dimension base aggregate column 518 is a list of columns in a given dimension aggregate. The dimension base aggregate column includes attributes which point to which column is included in this dimension aggregate, and a pointer to a dimension aggregate being defined.

The datamart letter 510 indicates which of two mirrored datamarts a particular aggregate belongs to. This is an optional element which may not be required if mirroring does not occur in the datamart 150. Mirroring duplicates the tables in the datamart 150. Changes can then be made to one copy of the datamart 150, while the other datamart 150 continues running. These changes can then be propagated when possible.

The actual column type 540 is a logical description of role a column plays in the system 100. The actual column type 540 includes attributes that define the default value to be used in a database for a column of this type.

The physical type definition 530 defines which physical types are allowed for which table types. The physical type definition 530 includes attributes which point to an actual table type. The actual table type is a logical type of a physical table (for example, dimension, fact etc.) being defined. The physical type definition also includes an attribute that indicates whether to select this item by default when giving the consultant or user a choice.

The database physical type 595 defines the name of the physical database.

The translation actual table 539 defines the actual values of translations strings for a single relational database management system. These translations strings are the real strings to use for a given translation string within a store type. The translation actual table 539 also includes attributes that point to the store type.

FIG. 5 also illustrates additional tables used in the system 100.

The date table 560 is used to track date information in the datamart 150. Importantly, times and dates are always treated corrected in the datamart 150. This can be guaranteed because the consultant cannot change the definition of dates in the datamart 150. Thus, for example, the month of September will always have 30 days, and leap years will be handled correctly.

The transaction type table 590 is a list of the available transaction types within the system 100.

The adaptive template profile 580 is used as a communications mechanism for templates. The adaptive template profile 580 includes a number of rows being communicated back to the calling program. The adaptive template profile 580 also indicates the logical name for information being communicated back from an adaptive template to the calling program.

The business process table 570 is a look up table for supported business process types during the extraction. The business process 570 includes a business process key and a process name. The process name corresponds to a logical name for a business process to which fact staging table belongs. The process key identifies a business process record in a fact staging table.

Time Navigation

An important feature of some embodiments of the invention is the ability to compactly store and rapidly query "historical" backlog/balance/inventory quantities. By historical we mean the amount of backlog or inventory as it existed at a given point in time--not necessarily today. Note that backlog/balance/inventory quantities are different than transactional quantities. For example, your bank balance at the end of Q1 1997 is not the sum of your bank balances at the end of Jan, Feb and March. It is computed by adding all of the deposit transactions and subtracting all the withdrawals from the balance at the end of Q4 1996. One could compute balances by this method when a user queries the system but because this method requires rolling forward all of the appropriate transactions "from the beginning of time," the queries will likely be slow.

The traditional solution in datamarts is to store periodic "snapshots" of the balance. The snapshots are often stored at daily intervals for the recent historical past, and at greater intervals (e.g. weekly or monthly) for less recent history. This approach has two big disadvantages. The first is an enormous multiplication of data volume. If, for example, you are keeping track of inventory in a store you must store a snapshot for each product you hold in inventory for each day, even if you only sell a small fraction of all of your products on a given day. If you sell 10,000 different products but you only have 500 transactions a day, the "snapshot" datamart is 20 times larger than the transactional datamart. The second disadvantage relates to the most common solution for alleviating the first problem, namely storing snapshots at less frequent intervals for less recent history. This results in the inability to compare levels of inventory in corresponding time periods since the same level of detail is not present in earlier data. For example, in manufacturing companies it is often the case that much business is done near the end of fiscal quarters. If one wants to compare inventory levels between Q1 1995, Q1 1996 and Q1 1997, and focus on the most important changes which occur near quarter end, one cannot use the approach of storing the snapshots at coarser levels of detail since daily data would be required.

In some embodiments of the system, the aggregate tables are used to answer queries about backlog/balance/inventory quantities. In order to answer such queries, the previously described rolling forward from the beginning of time is done. However, this is performed efficiently through the accessing of the appropriate time aggregates. For example, assume the datamart 150 has five years of historical transaction data beginning in 1993. Assume that one desires the inventory of some specified products on May 10, 1996. This would be computed by querying all of the transactions in the 1993, 1994 and 1995 year aggregates, the 1996 Q1 quarter aggregate, the April 1996 month aggregate, the May 1996 week 1 aggregate and finally 3 days of actual May, 1996 daily transactions. These transactions (additions and subtractions from inventory) would be added to the known starting inventory in order to produce the inventory on May 10. Note that this "time navigation "hops" by successively smaller time intervals (year, quarter, month, week, day) in order to minimize the number of database accesses. What is important is the exploitation of aggregate tables, that already exist in the system in order to answer transactional queries rapidly (e.g. What were the total sales of product X in Apr 1996?). This avoids the need to build what is essentially a second data datamart with the balance/inventory/backlog snapshots.

Query Mechanism Metadata

Figure 6B:
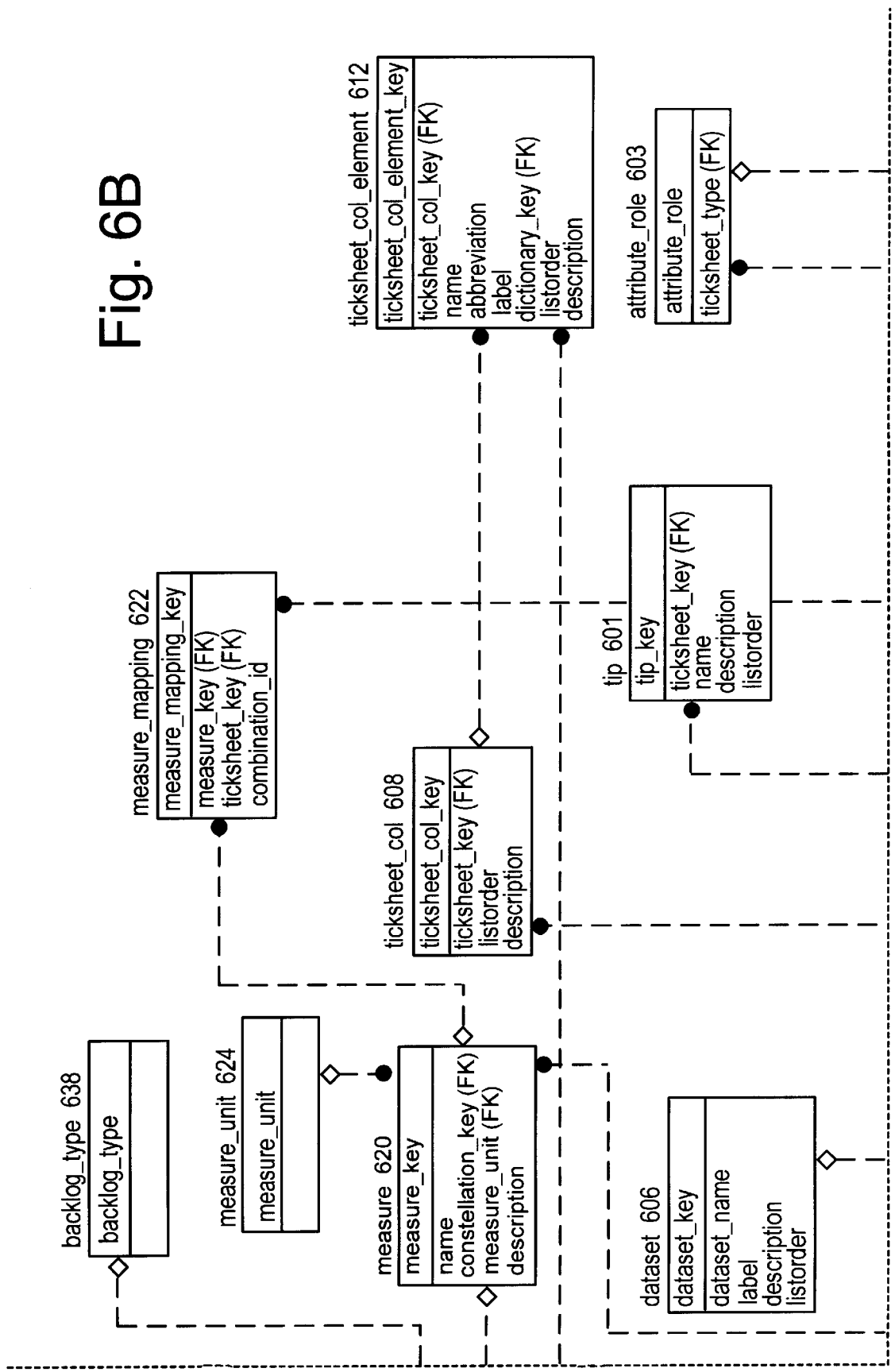
FIG. 6 illustrates a query mechanism and user interface schema.
Figure 6C:
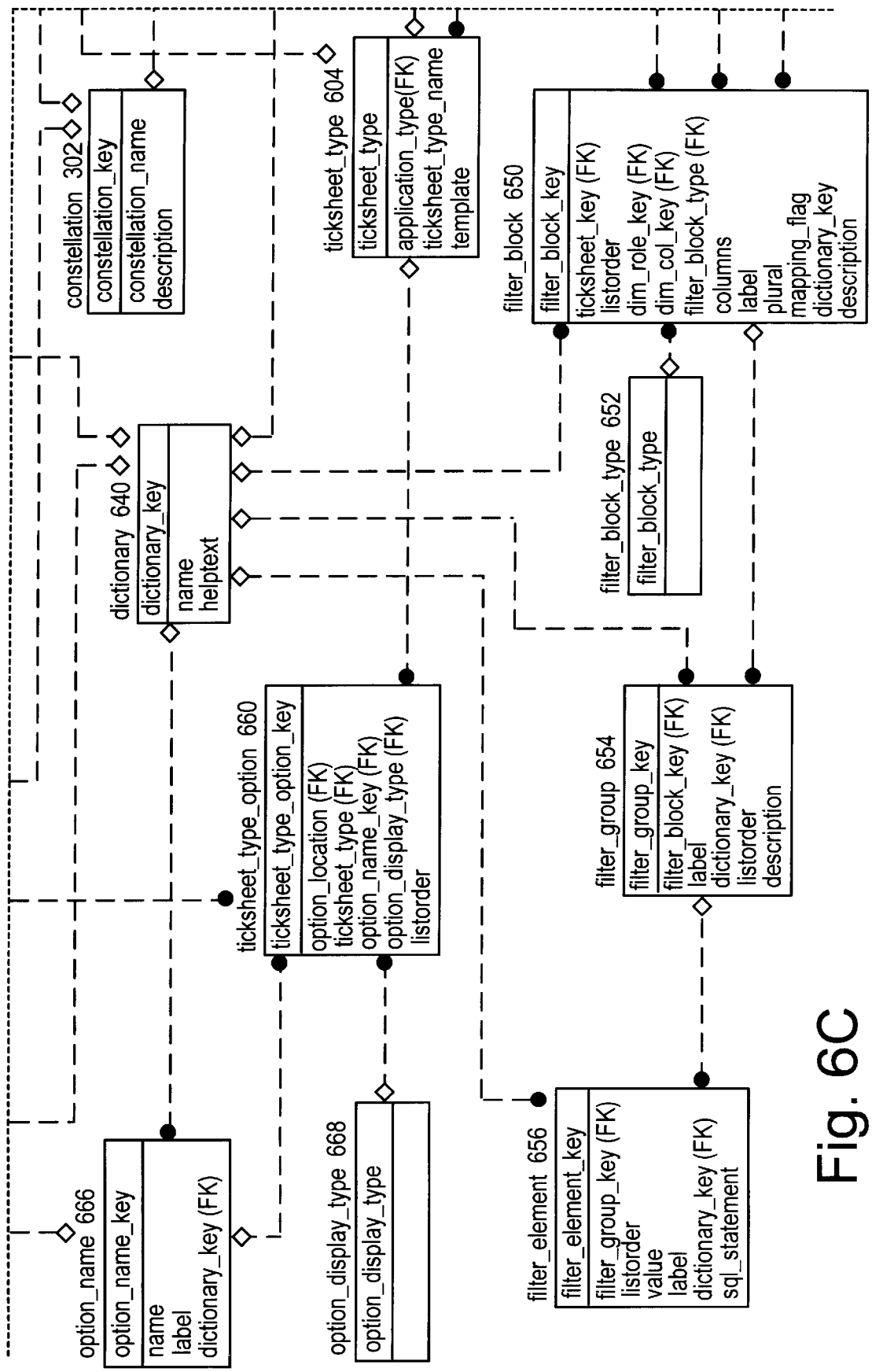
Figure 6D:
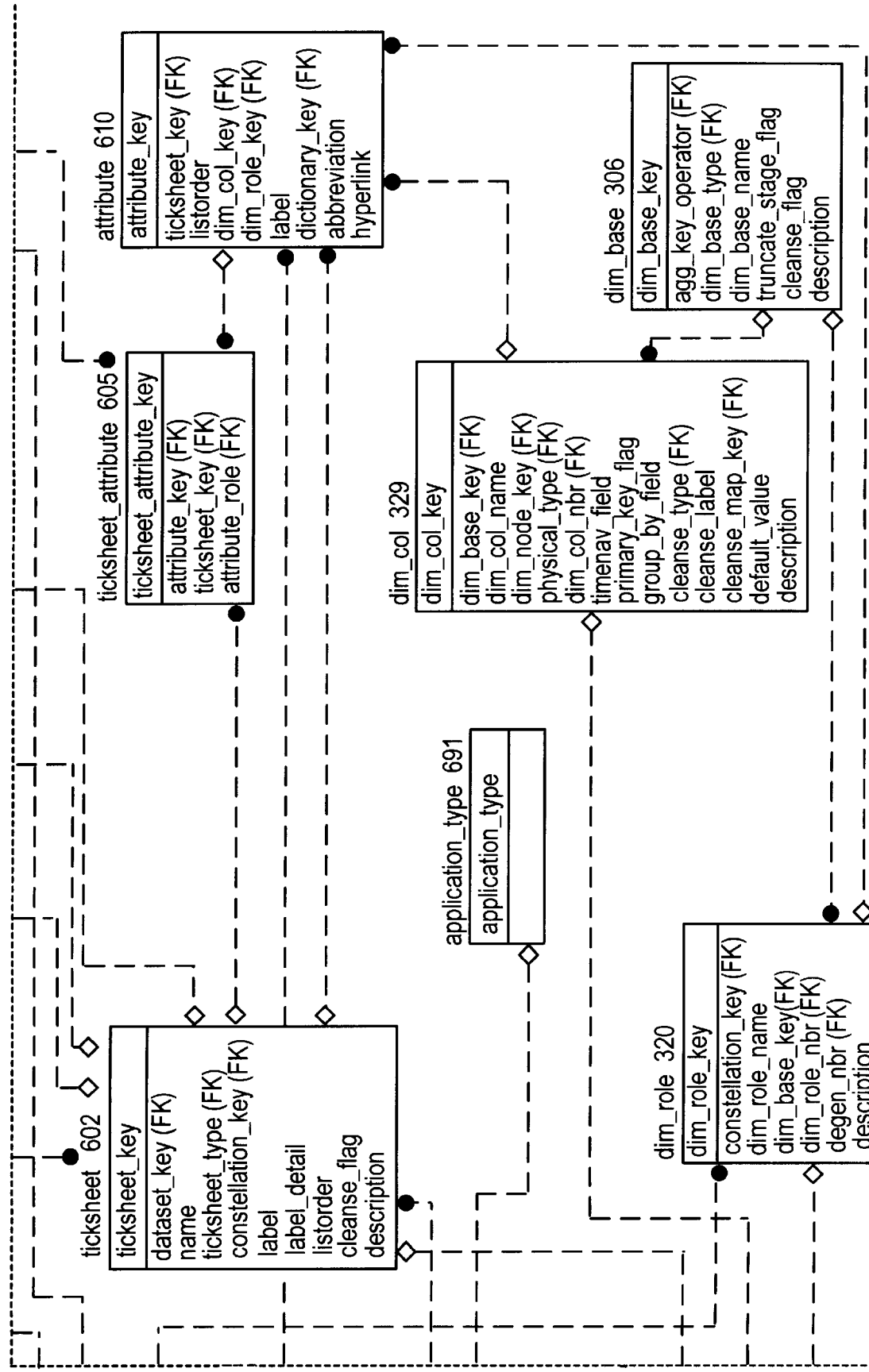

The following describes the metadata 160 used in the query/reporting program 104. This metadata is shown in FIG. 6. Generally, the query mechanism metadata can be broken into ticksheet metadata, measurement metadata, filtering metadata and display options metadata. The ticksheet metadata defines the user interface objects for user interaction with the datamart 150. The ticksheet defines how users can initiate queries and how results are presented back to the user. The measurement metadata defines a logical business calculation that can be presented to a user. Typically, the measurement metadata defines a format for presenting information to user that is more easily understood by the user or provides a more valuable result to the user. The filtering metadata defines how a user can filter results. Filtering allows the results set to be limited to particular dimension values. The display options metadata defines display options that can be provided to the user.

The following describes some important features of the user interface. The user interface allows the user to drill down through data. Also, portions of the query forms can be dynamic based upon values in fields (e.g., a list box can be dynamically updated because it is tied to a field in the datamart 150, that when changed, cause the values in the list box to change). Also, a query is guaranteed to be consistent with the schema because the query is tied to the schema definition.

Query Mechanism Schema List

FIG. 6 includes the following elements: the constellation 302, a ticksheet 602, a data set 606, a ticksheet column 608, a tip 601, an attribute role 603, an attribute 610, a ticksheet attribute 605, a ticksheet type 604, a measure 620, a measure term 630, a measure unit 624, a term operator 632, a transaction type 590, an RPN operator 636, the fact column 310, the fact table 304, a backlog 638, a measure mapping 622, a ticksheet column element 612, a dictionary 640, a filter block 650, a filter block type 652, a filter group 654, a filter element 656, a ticksheet type option 660, an option location 662, an option value 664, an option name 666, an option display type 668, an application type 691, the dimension role 320, the dimension column 329, and the dimension base 306.

Query Mechanism Schema Metadata Descriptions

Ticksheets Metadata

Under the constellation 302, the ticksheet is a top level object for defining the user interface objects for user interaction. The ticksheet 602 table includes a data set key, a name, a ticksheet type, a constellation key, a label, label detail, a list order, a cleanse flag, and a description. The cleanse flag indicates whether or not to cleanse the filter data on this ticksheet. The constellation flag indicates the constellation in which the dimensions and measures for this ticksheet reside. The data set key indicates the page in which the end user makes report selections. The data set key represents a logical grouping of similar ticksheets. The description is for documentation purposes. The label is the string for the name of the ticksheet. The list order indicates the ticksheet list order. The name is the hidden name of the ticksheet. The ticksheet includes a primary key. The label detail allows for more verbose documentation. The ticksheet type indicates the type of application that interprets the selections made on this ticksheet.

The data set table 606 is a grouping mechanism for ticksheets into sets that describe their contents. The data set table 606 includes the following columns: a data set key, a data set name, a label, a description, and a list order. The data set name is a logical name for top level user definition of like ticksheets across ticksheet types. The description is the description of the data set.

The ticksheet column 608 defines a single column for displaying measure choices on a ticksheet. The ticksheet column table 608 includes the ticksheet column key, the list order, the ticksheet key, and the description. These columns and the ticksheet column table 608 operate in a manner similar to such columns in other tables in this metadata.

The ticksheet column element 612 is a single value within a measure display column on a ticksheet. The ticksheet column element 612 includes an abbreviation, a description, a dictionary key, a label, a list order, a name, a ticksheet column element key, and a ticksheet column key. The ticksheet column element key is the primary key for this table. The ticksheet column key points to the ticksheet column 608 entry. The name is the hidden name for the column element. The abbreviation is the shortened name for the user display. The dictionary key is the key for help text entry for this element. It is a key into the dictionary 640. The other columns act in a manner similar to columns in other tables of similar names.

The tip table 601 includes a ticksheet key, a name, a description, and a list order. The tip is a definition of user tips for using a particular ticksheet.

The attribute table 610 defines the dimension attribute choices within a ticksheet. These choices are tied to a single dimension column in the schema definition of the datamart 150. The attribute table 610 includes an abbreviation, an attribute key, a dictionary key, a dimension column key, a dimension role key, a hyperlink, a label, a list order, a name, and a ticksheet key. The abbreviation is the shortened user string for the attribute. The attribute key is the primary key for this attribute. The dictionary key is a pointer to the dictionary 640 that includes help message for a particular attribute. The dimension column key is the dimension column in which this attribute refers. For degenerate dimensions this reference is null. The dimension usage, within a constellation, is defined by the dimension role key. The hyperlink is an html text for navigating return values for this attribute to other web sites, such as a company name look-ups etc. The label is what the user sees for a particular attribute. The list order defines a sort order on pop-up menus where one is the topmost in the list. The name is the internal name for the attribute. The ticksheet key indicates the ticksheet to which this attribute belongs.

The attribute role 603 table is a lookup table list of valid roles for attributes within a ticksheet type. The attribute role includes the attribute role key and the ticksheet type.

The ticksheet attribute 605 indicates the roles played by dimension attributes within a ticksheet. The ticksheet attribute 605 includes the attribute key, an attribute role, a ticksheet attribute key, and a ticksheet key. The attribute key indicates the attribute in the attribute table 610 which has a role define on the ticksheet. The attribute role is the role being granted. The ticksheet attribute key is the primary key. The ticksheet key is the ticksheet being defined.

The application type 691 is the top level grouping for ticksheet types.

The ticksheet type table 604 lists the applicable applications that can use ticksheets. Examples may be simple reporting applications or relevancy applications or trend type of applications. The ticksheet type 604 includes the application type, a ticksheet type, a template, and a ticksheet type name. The application type is the definition of the high level application in which a particular ticksheet type resides. The ticksheet type is the logical name for a program that interprets ticksheets. The template is the template for the ticksheet. The ticksheet type name is the name displayed for a particular ticksheet type.

Measurement Metadata

The following describes the measures used in the query mechanism schema 600. The measure table 620 defines a top level object for a logical business calculation. The measure table 620 includes a constellation key, a description, a measure key, a measure unit, and a name. The constellation key points to the constellation in which the measure resides. The description is for documentation purposes. The measure key is the primary key for the measure table 620. The measure unit is an indicator of the manner in which numbers are to be displayed. The name is the logical name of the measure.

The measure unit table 624 is a lookup table of the valid list of measure unit types. An example of such unit types is currency.

The measure term table 630 indicates a single component of a measure. The measure term can be combined arithmetically to construct a measure. The measure term table 630 includes a backlog type, a fact column key, a fact table key, a list order, a measure key, a measure term key, an RPN operator, a term operator, and a transaction type key. The backlog type indicates the type of backlog operation to use for a particular term (e.g., "beginning of period" and "end of period"). This can possibly be none. The backlog types are defined in the backlog type table 638. The fact column key points to the particular numeric column to operate on in the fact table. The fact table key indicates the fact table being operated on. The list order is the order of this term in the measure 620. The measure key is the measure being defined. The measure term key is the primary key for this table. The RPN operator is for the measure terms that perform arithmetic operations on other terms. (The RPN operator table lists the valid arithmetic operations to use when constructing a measure.) The term operator is an SQL operator to use on a set of fact rows. (The term operator table 632 indicates the valid set of SQL operators to use on a measure term.) The transaction type is the transaction type values to filter on for the fact in question.

The relation between measures and ticksheets is handled through the measure mapping table 622. The measure mapping table 622 includes the measure key, the ticksheet key, and the combination ID. The measure key points to the particular measure that is related to the particular ticksheet. The combination ID identifies a set of ticksheet column elements being defined.

Filtering Metadata

Filtering allows results to be limited to only particular dimension values. For example, a user may want to limit the results to particular customer names.

The following describes the filtering tables. The filter block 650 is a top level grouping table for filter area within a ticksheet. The filter block 650 is tied to a particular dimension column in the schema definition. The filter block 650 includes, columns, a description, a dictionary key, a dimension column key, a dimension role key, a filter block key, a filter block type, a label, a list order, a name, a plural, a mapping flag, and a ticksheet key. The columns field indicates the number of columns in this filter block. The description is for documentation. The dictionary key points to the help dictionary. The dimension column key points to the actual column name and the datamart to be filtered on. A null value here means degenerate dimension as determined by the dimension role key. The dimension role key points to the dimension role in the constellation of the ticksheet that is the form key to filter on for all facts in this constellation. A null value here means that a special dimension shared by all constellations is being used. The filter block key is the primary key for this table. The filter block type points to the filter block type table 652 which defines the ways in which this filter block is displayed to the user (e.g., a checkbox or a radio button). The label is the text that appears to the user for the filter block. The list order is the order that the filter block should appear in a list. The name is the name of the filter block. The plural field is the text that appears to the user for the filter block. The mapping flag is used in mapping. The ticksheet key points to the ticksheet that this filter block belongs.

The filter group 654 is a mid-level grouping for a filter on a ticksheet. This groups individual selections into logical units.

The filter element table 656 defines individual values for a dimension attribute within a filter block. The filter element table 656 includes a dictionary key, a filter element key, a filter group key, a label, a list order, a name, an SQL statement, and a value. The dictionary key points to the user help text for a particular filter element. The filter element key is the primary key. The filter group key points to the filter group to which this element belongs. The label is the user displayed string for the element. A list order is the order of this element within a filter group. The name is the hidden name of this element. The SQL statement is an SQL statement used to build the list of values for a dynamic list box filter group. The value is the database value that this element translates into in a SQL "WHERE" clause.

Display Options Metadata

To control the method in which information is displayed with a ticksheet, a set of options are supplied. The ticksheet type option table 660 helps support this feature. The ticksheet type option table 660 includes a list order, an option display type, an option location, an option name key, a ticksheet type, and a ticksheet type option key. The list order is the order to display options for a ticksheet type. The option display type is an html control type to use when displaying a particular option. The option location is the location of the option on the ticksheet. (The option location table 662 holds the list of possible locations of options on a ticksheet.) The option name key is the option being included in a ticksheet type. (The option name table 666 defines an option that has meaning for one or more applications that can be used by users.) The ticksheet type is the ticksheet type being defined. The ticksheet type option key is the primary key for this table.

The option name table 666 includes option name key, a name, a label, and a dictionary key. The option name key is the primary key. The name is the logical name for the option.

The label is the label seen by the user as the name of the option. The dictionary key is the pointer to the help text dictionary.

The option value table 664 defines single valid values for options. The option value table 664 includes the dictionary key, a label, a list order, an option name key, an option value key, and a value. The dictionary key is the help text dictionary key. The label is the label seen by the user for this option choice. The list order is the order of the valid values for the option. The option name key is the option set being defined. The option value key is the primary key for this table. The value is the hidden value for the option.

The option display type table 668 is a lookup table indicating the valid way that options can be displayed.

The dictionary table 640 is a table for help text for users.

User Interface Example of Defining Metadata

General Schema Definitions User Interface

The following describes a constellation used in a business. In this example a new dimension is added very simply and the changes are automatically propagated into the datamart 150. The enterprise manager interface 192 is used by the consultant to define and manipulate the system 100.

Figure 7:
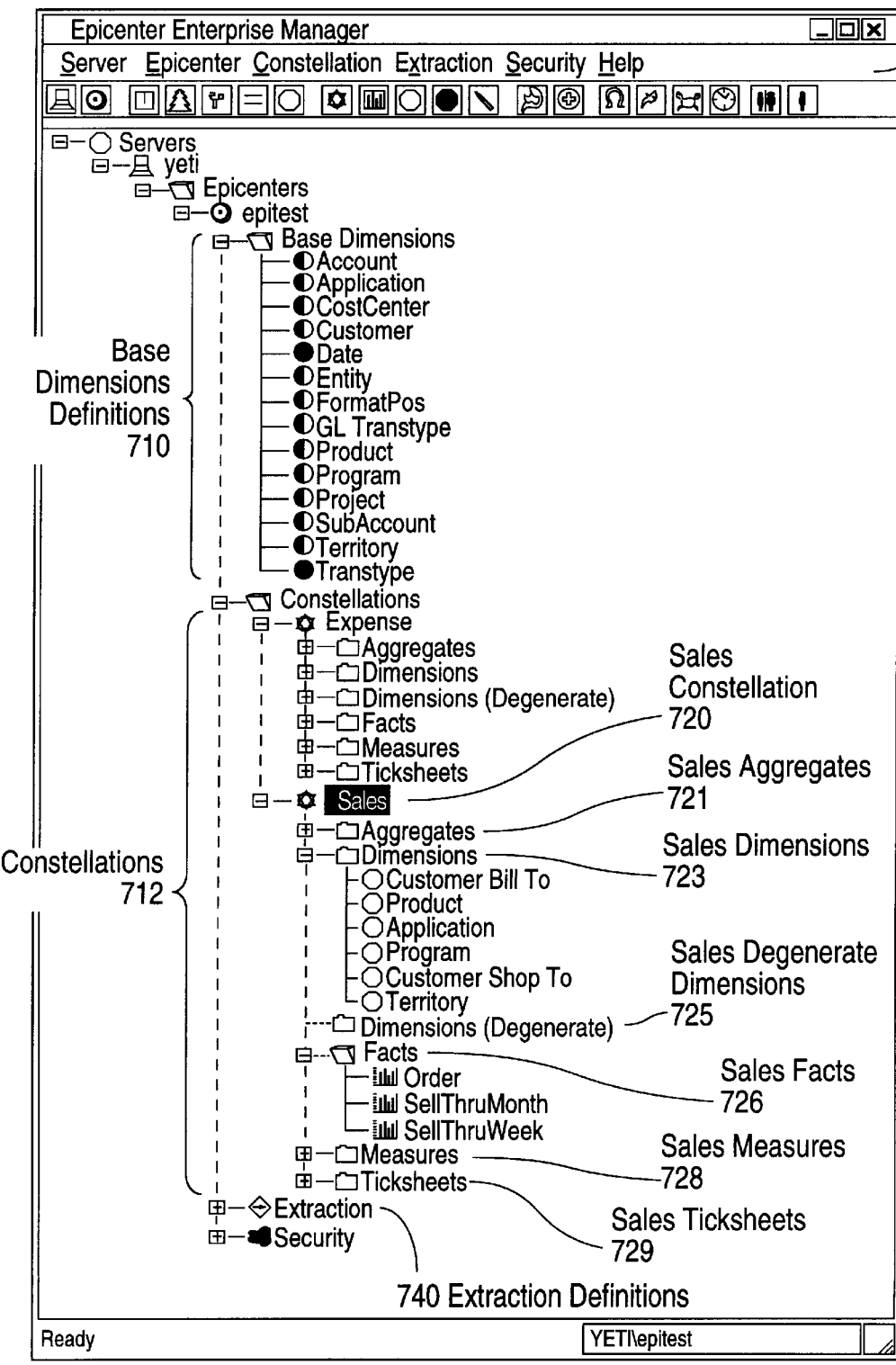

FIG. 7 illustrates the enterprise manager interface 192. Multiple system 100's can be connected to through that interface. Many of the objects and tables in the system 100 are shown. The base dimensions definitions 710 correspond to the base dimensions available under the "epitest" datamart. The constellations 712 for this datamart include an expense constellation and a sales constellation 720. Thus, the sales constellation 720 would appear as a row in the constellation table 302. Under the sales constellation 720 appear the definitions for the sales aggregates 721, the sales dimensions 723, the sales degenerate dimensions 725, the sales facts 726, the sales measures 728, and the sales ticksheets 729. Also, the extraction definitions 740 and security definitions for the "epitest" datamart are accessible. The sales dimensions 723 define rows in the dimension role table 320. These rows include customer billed to, product, application, program, customer ship to, and territory.

Figure 8:
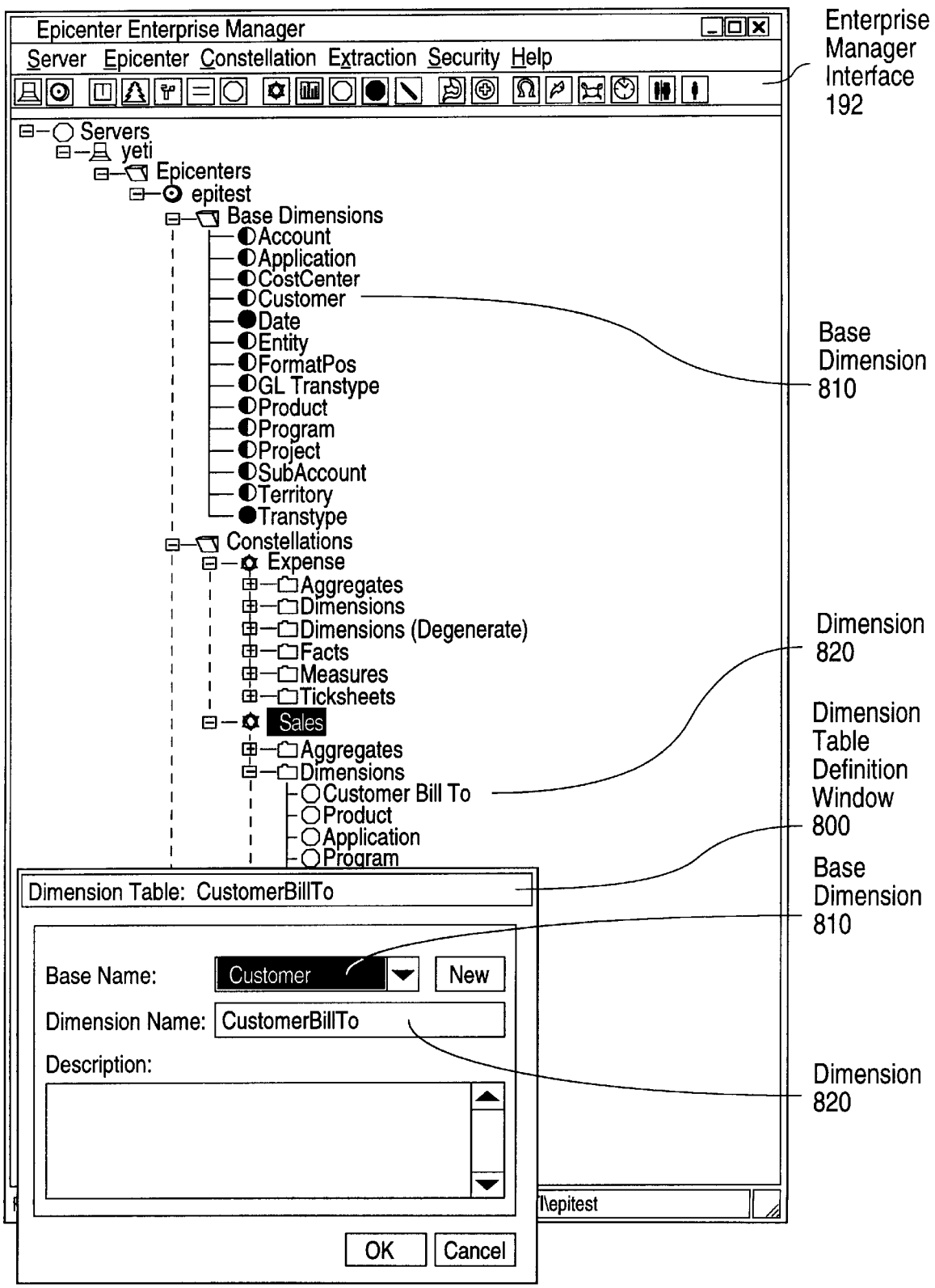

FIG. 8 illustrates the dimension table definition window 800 (presented to the consultant as the result of selecting the customer billed to dimension role under dimensions). A dimension table definition window 800 show that the dimension 820 is customer bill to and the base dimension 810, to which the dimension 820 points to, is named customer.

Figure 9:
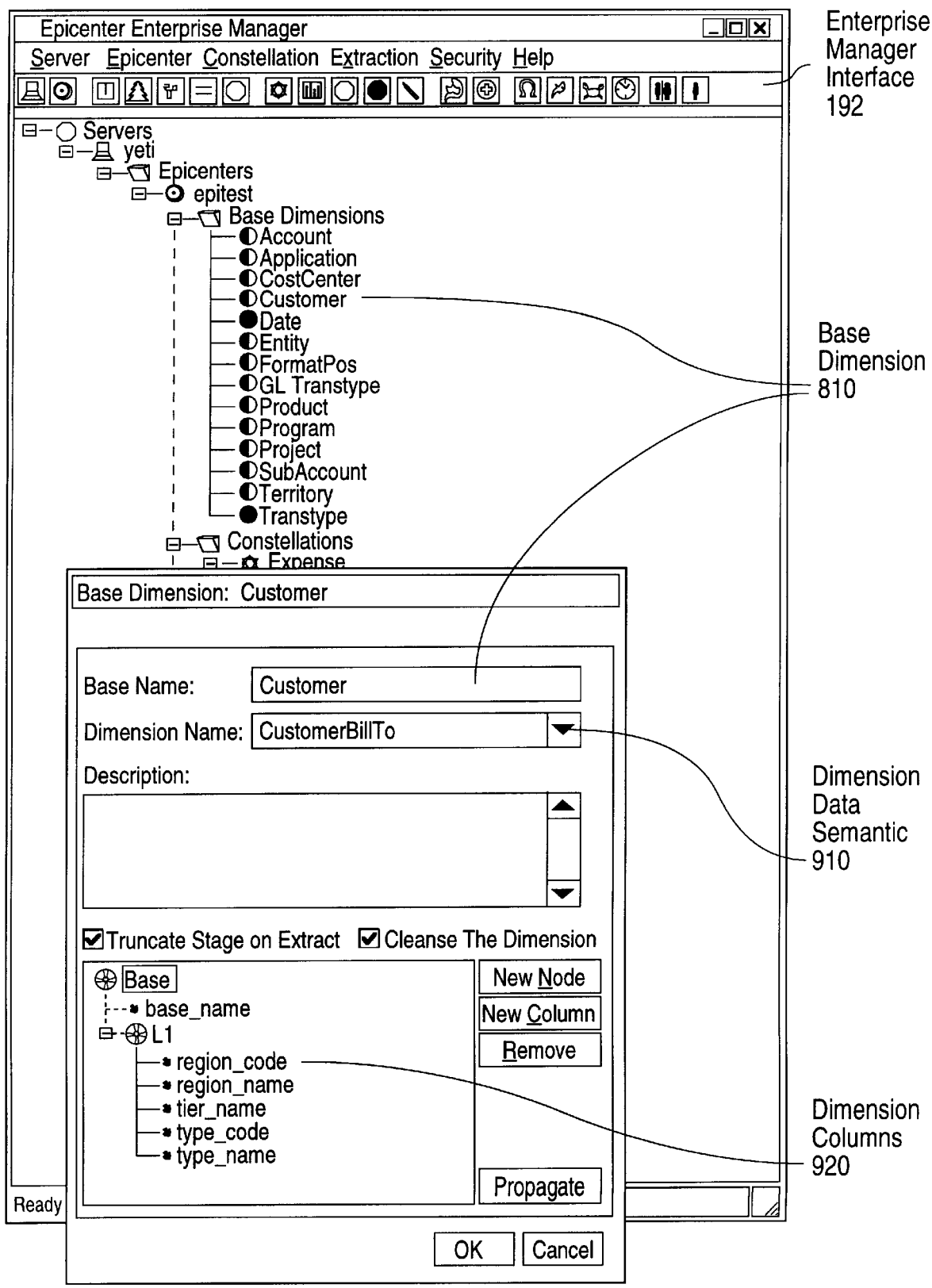

FIG. 9 illustrates a base dimension window 900 showing the definition of the base dimension 810 named customer. In this case, the customer base dimension has a "slowly changing dimensions" dimension data semantic 910. In this example, the dimension base 810 customer has a number of dimension columns 920. L1 is an example of a dimension node.

Figure 10:
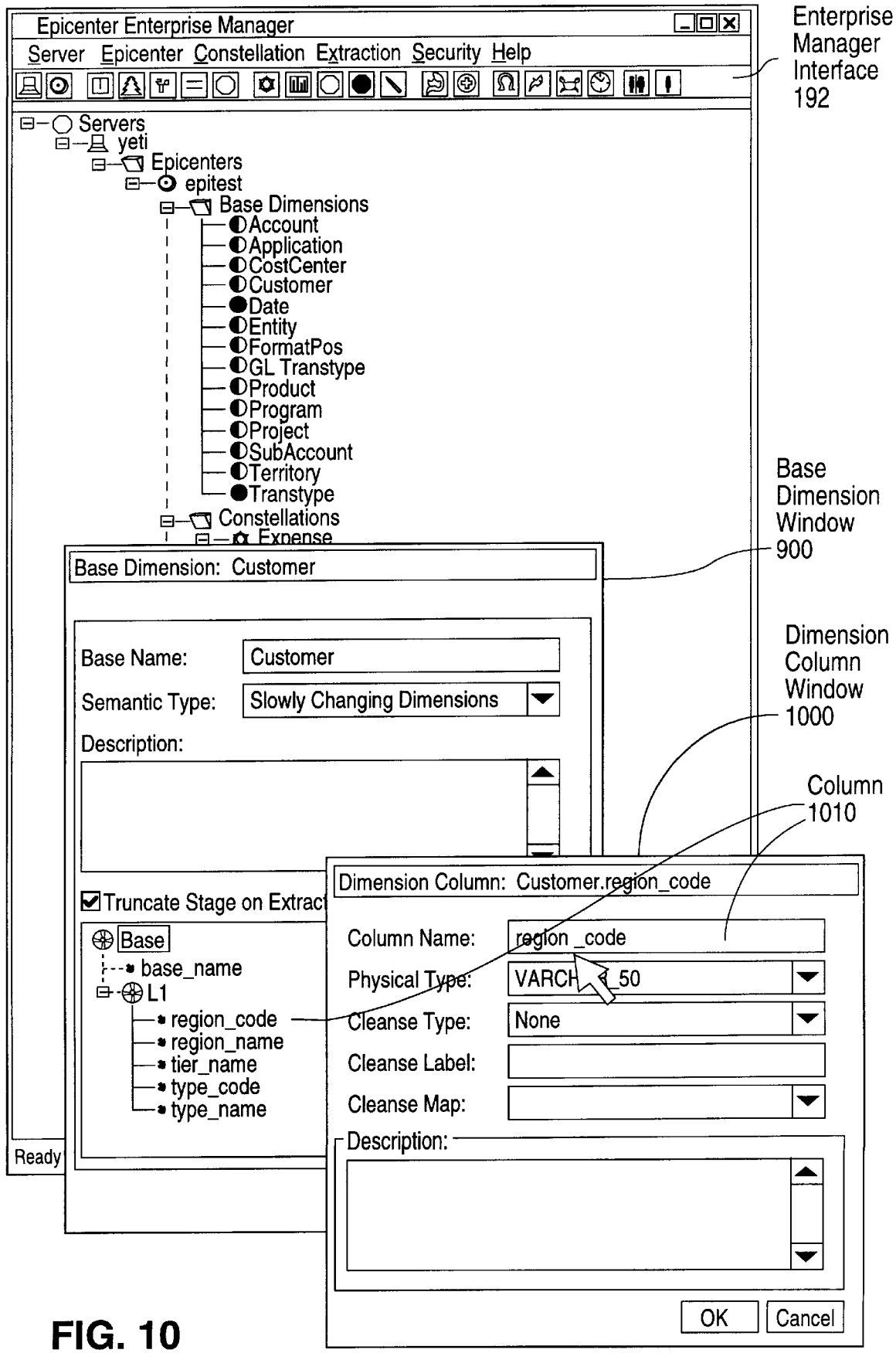

FIG. 10 illustrates the dimension column window 1000 for the customer region code column 1010. The physical type is the type of data defining that dimension column. The VARCHAR__50 physical type is then mapped to an actual type through the physical type table 330. The translation is dependent on the store type.

Figure 11:
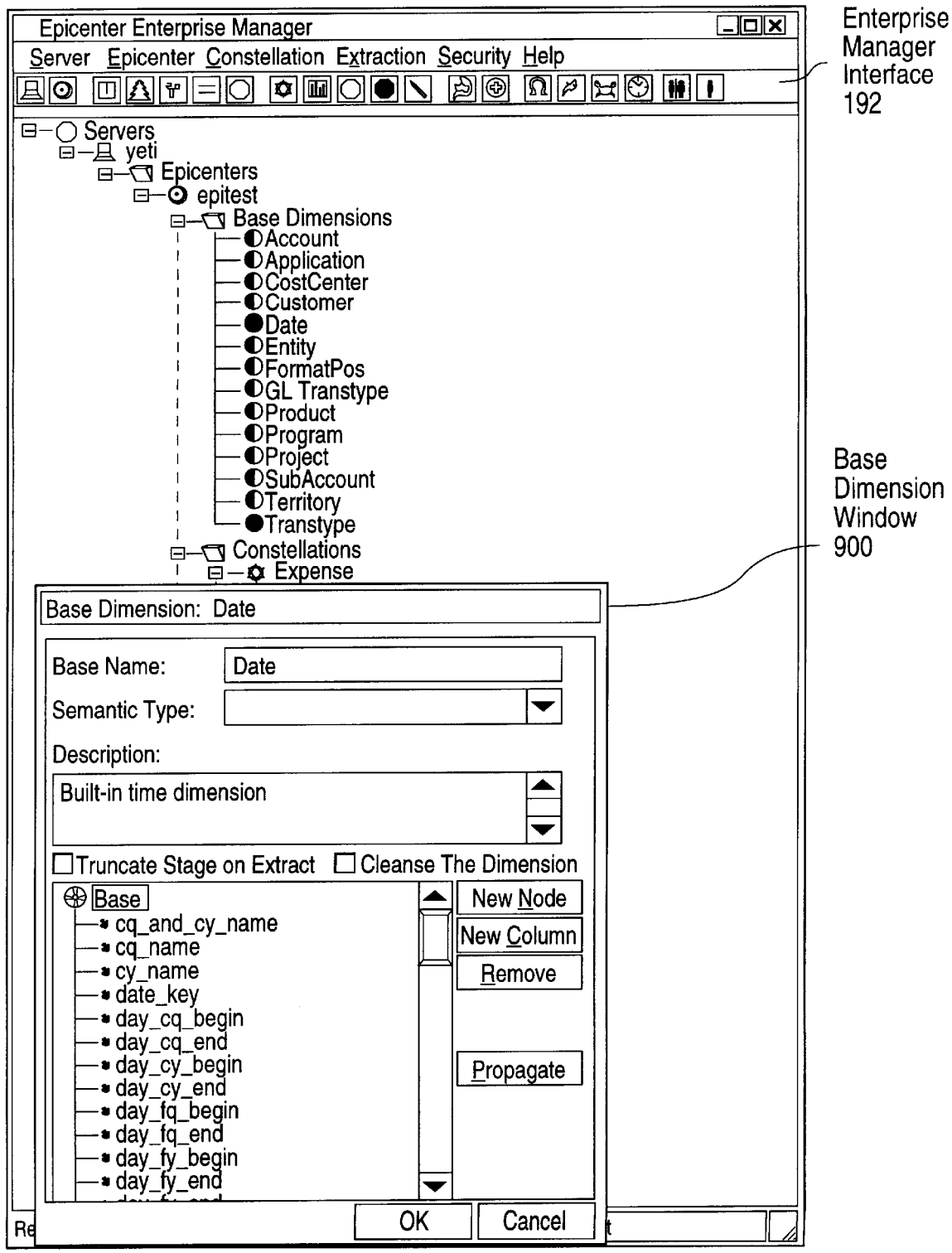

FIG. 11 illustrates the base dimension window for the base dimension date (substantially un-editable). The user interface indicates that the date dimension is not an editable base dimension (shown as black circles under "Base Dimensions"), and grayed out in the base dimension window 900. The transtype (transaction type) is similarly not editable and is similarly shown in the user interface.

Figure 12:
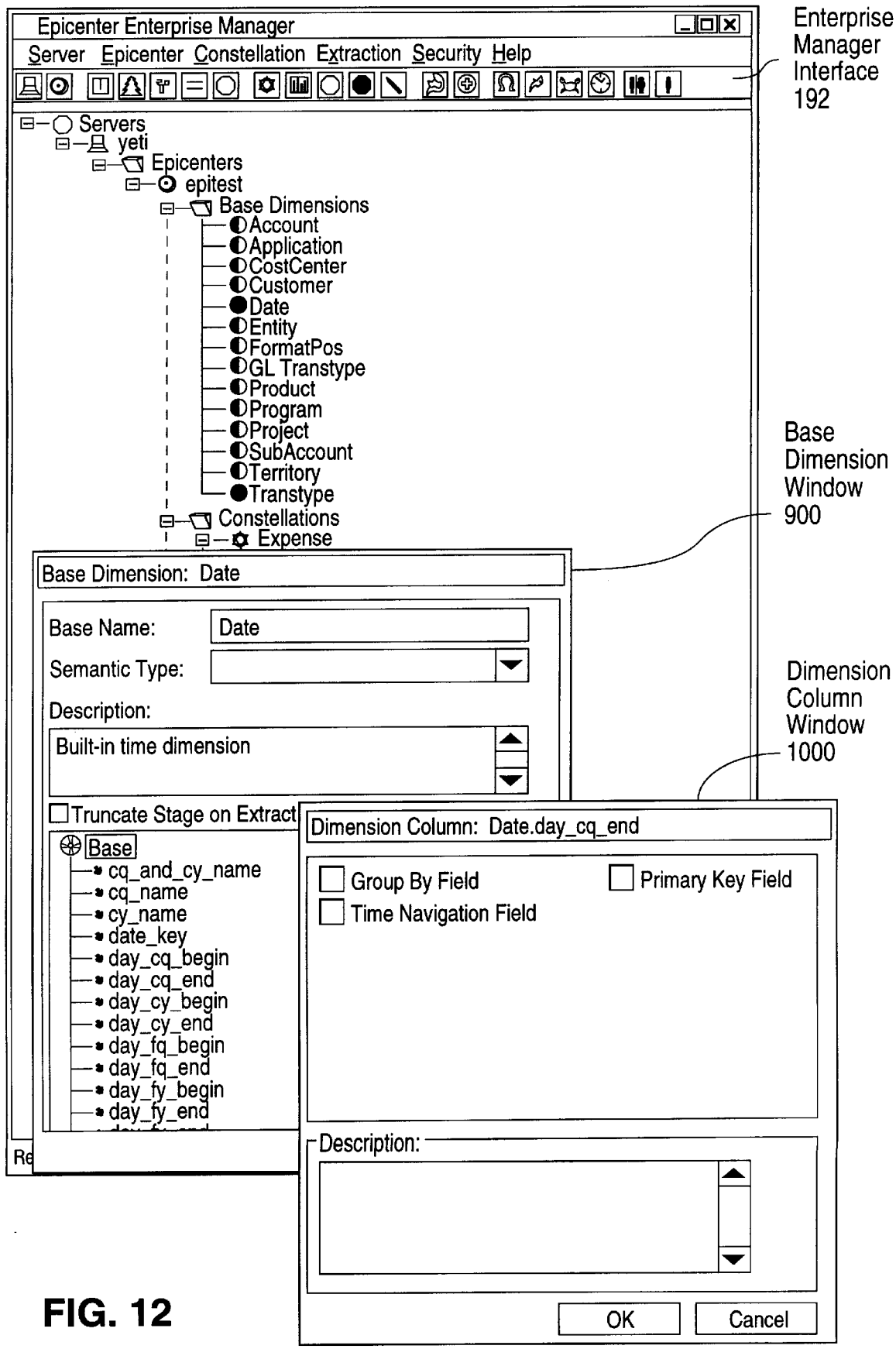

FIG. 12 shows the dimension column "date day quarter end". Note that column cannot be edited.

Figure 13:
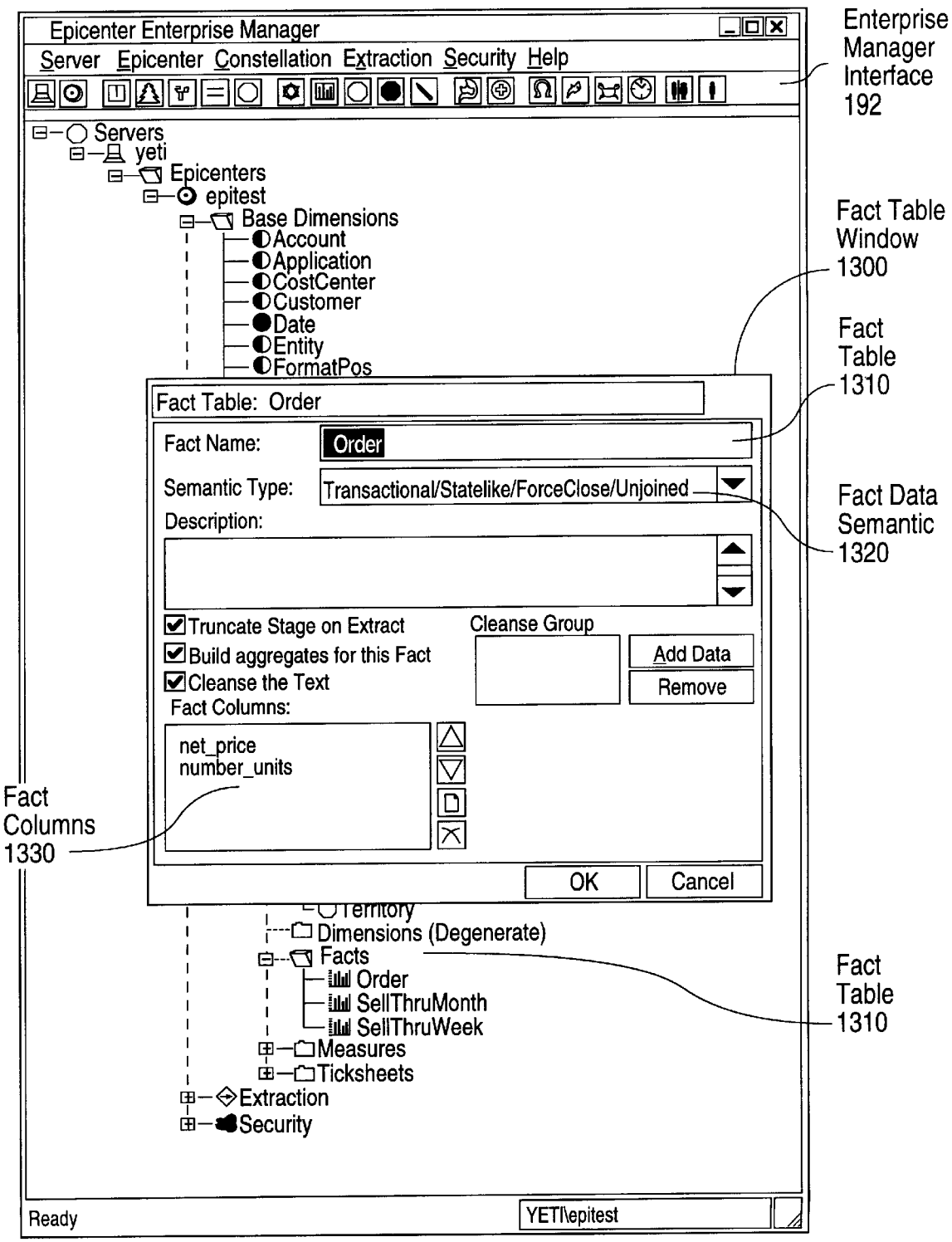

FIG. 13 illustrates a fact table window 1300 that is open on the order fact table 1310 definition. The fact data semantic 1310 is transactional/state like/force close/unjoined. The transactional/state like/force close/unjoined means that the invoice part of an order is transactional, the booking is state like, orders that are not otherwise dealt with, are closed out, and the data may become dirty and so it needs to be cleansed, thus, it is unjoined. This semantic type is described in detail in Appendix A. Note that the user can select from many different types of fact table semantics. The fact table window 1300 also shows the fact columns 1330 for the order fact table.

Figure 14:
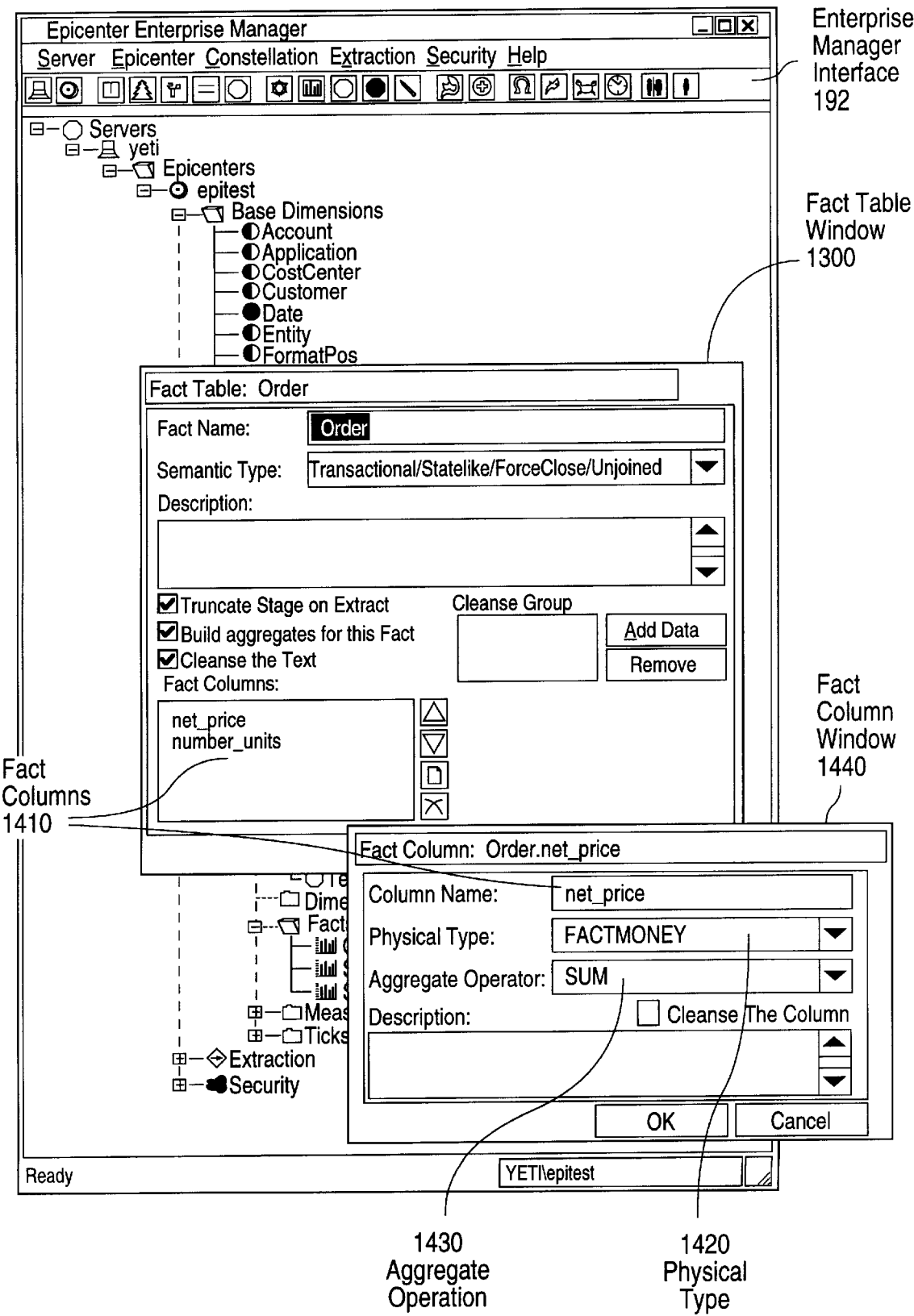

FIG. 14 illustrates a fact column window 1400 opened on the definition of the net__price fact column 1410. Here the fact column 1410 has a physical type 1420 called FACT-MONEY and an aggregate operation 1430 called a SUM.

Figure 15:
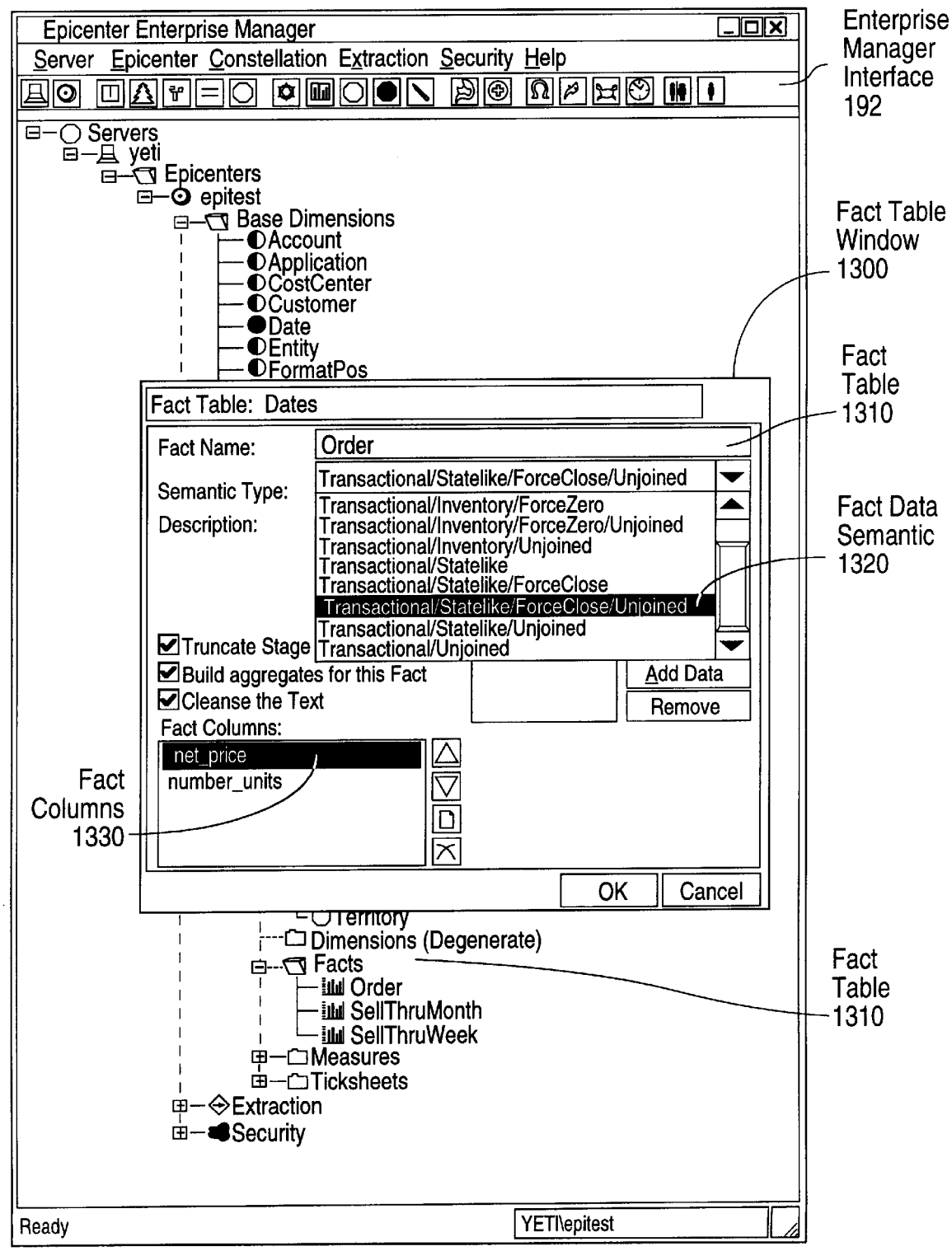

FIG. 15 illustrates how the consultant would select the semantic type for the order fact table 1310.

Figure 16:
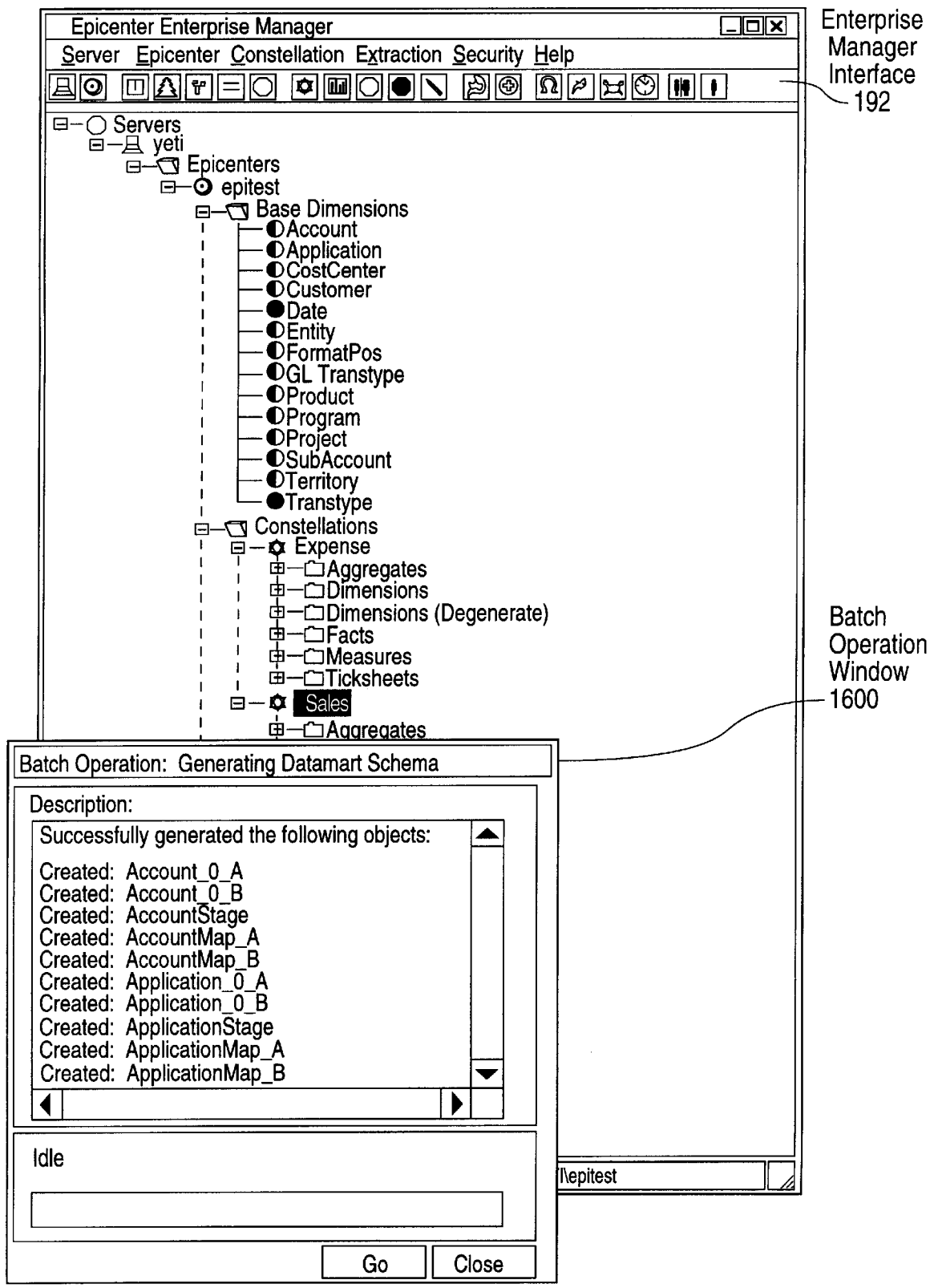

FIG. 16 illustrates the results of a request by the consultant to generate the datamart 150 from the definitions of the datamart. The results show that a number of tables have been created in the datamart 150. Importantly, FIG. 16 illustrates the results of an initial build process. In subsequent modifications, only those elements of the datamart that have changed will be changed. In other words, the subsequent changes are handled as an update process. An example of the update process is described below.

Extraction Interface Elements

The following describes the creation of the connectors 162. Once the schema definitions 161 are set, the consultant then defines the connectors 162 to the source systems 110. The connectors, as noted above, define how information is to be extracted from the source systems 110 and how that information is to be placed into the datamart 150.

Figure 17:
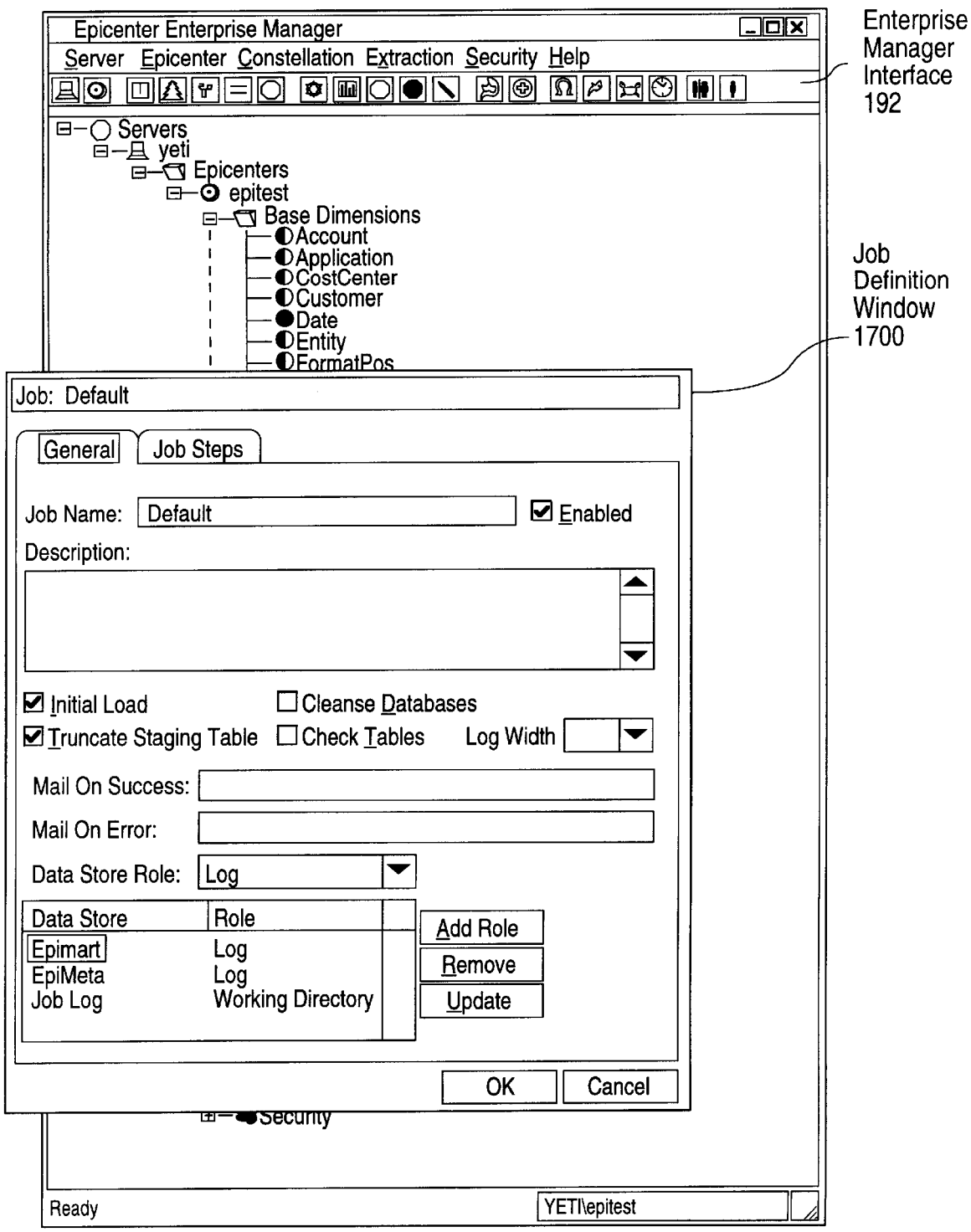

These connectors are defined under the extraction definitions 740. FIG. 17 illustrates the job definition window 1700 presented when the consultant has selected a particular job.

Figure 18:
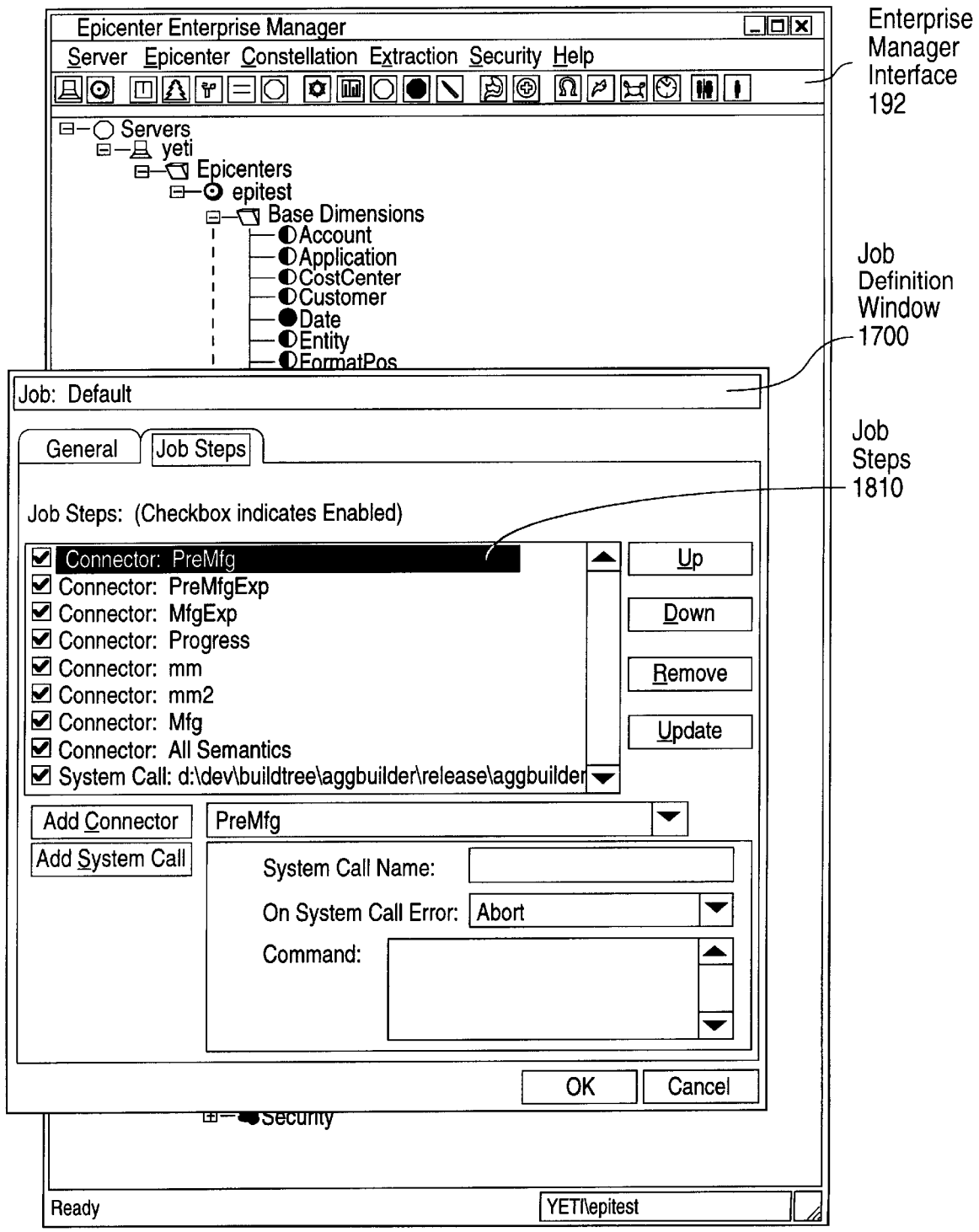

FIG. 18 illustrates the job steps 1810 within the default job. The checkbox indicates whether the particular job step is enabled for that job. The list of job steps is shown in the order that they are executed. The two foreign keys within the job step are shown in the dialog box of FIG. 17 to indicate whether the job step is a connector or a system call.

Figure 19:
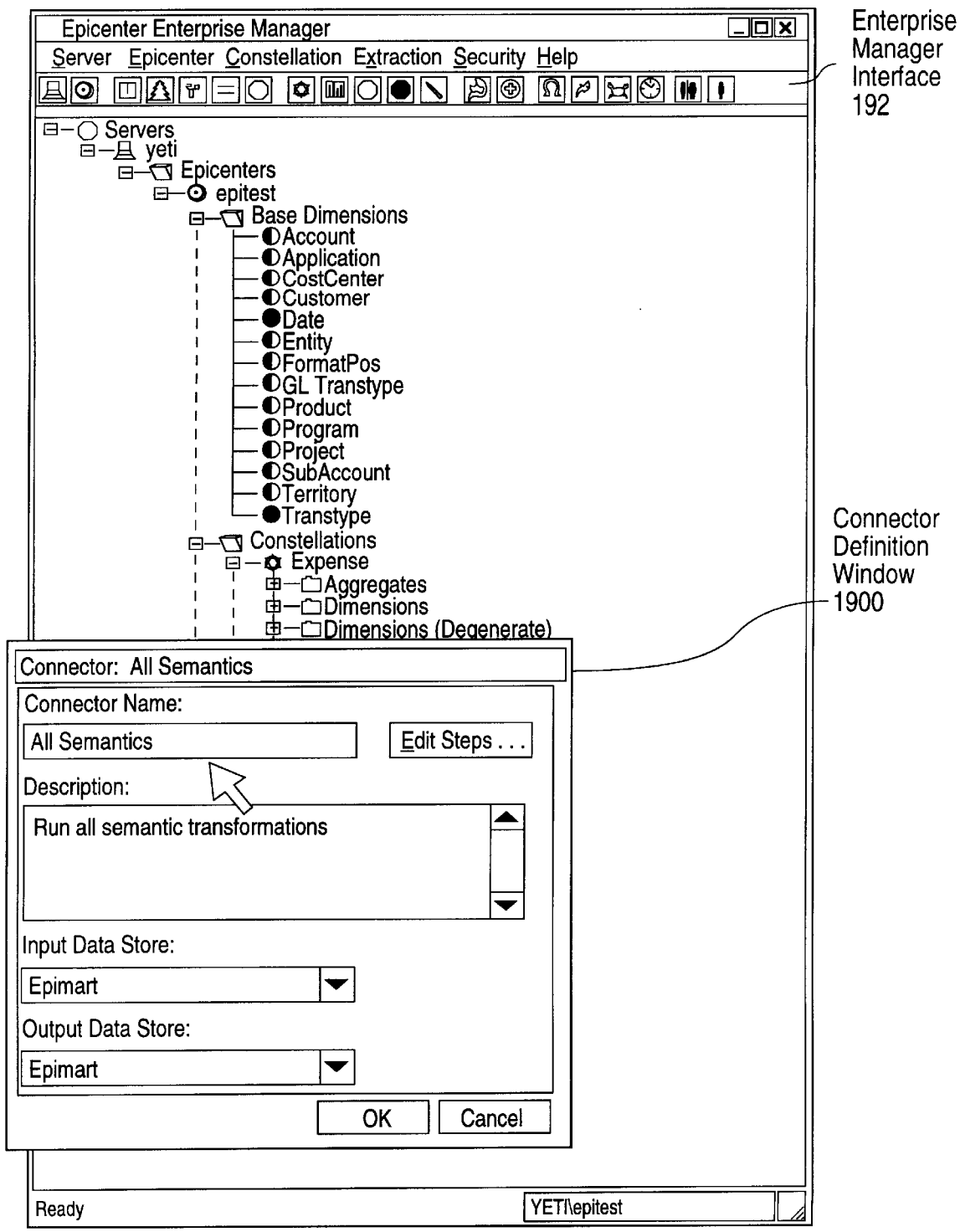

FIG. 19 illustrates the All Semantics connector as defined in the connector definition window 1900. This connector includes the description and a definition of the input and output data stores. In this case, both of the data stores are the "epimart" (which is the datamart 150).

Figure 20:
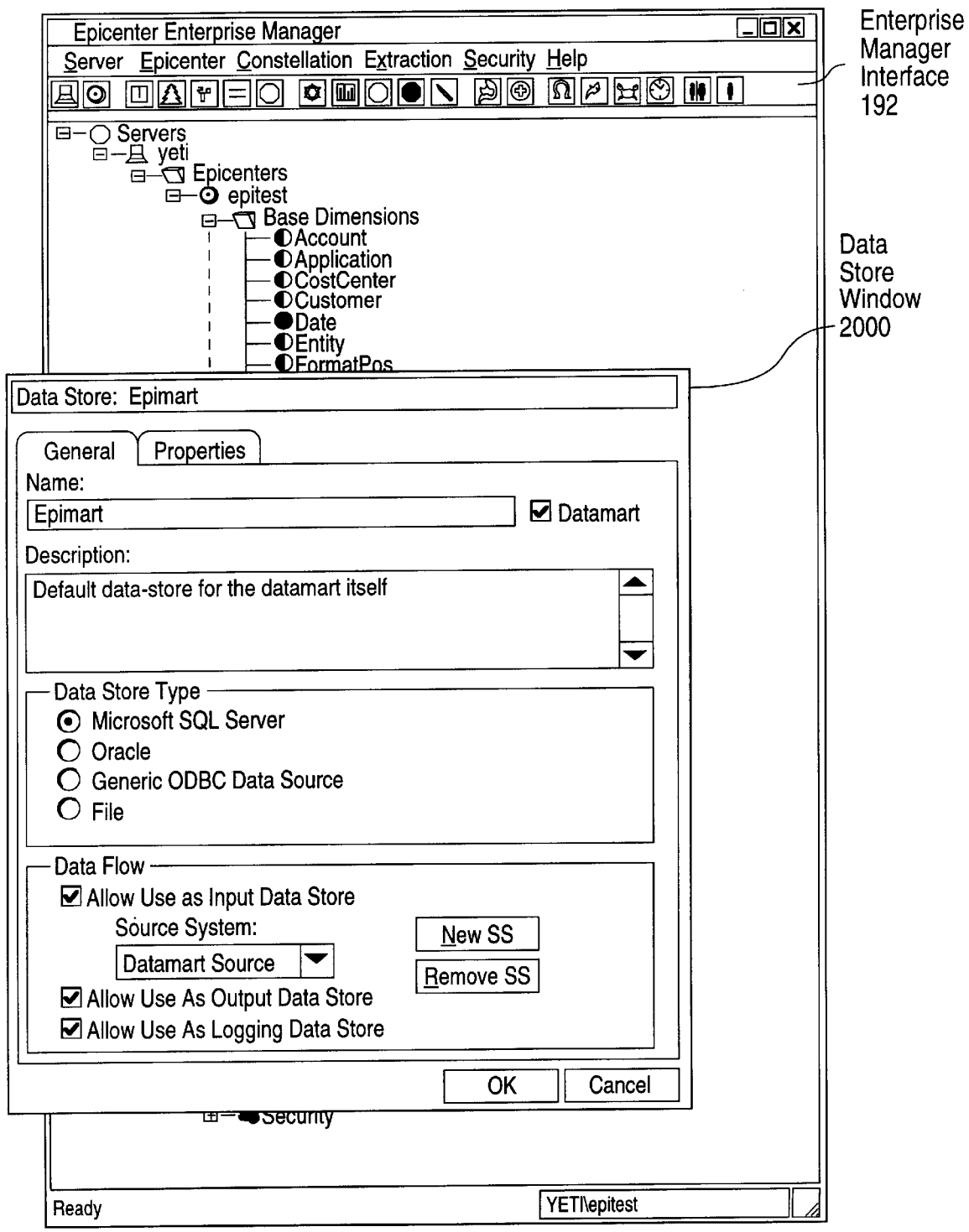

FIG. 20 illustrates the data store window 2000 interface for showing a data store. This is the data store that is referenced in the connector All Semantics.

Figure 21:
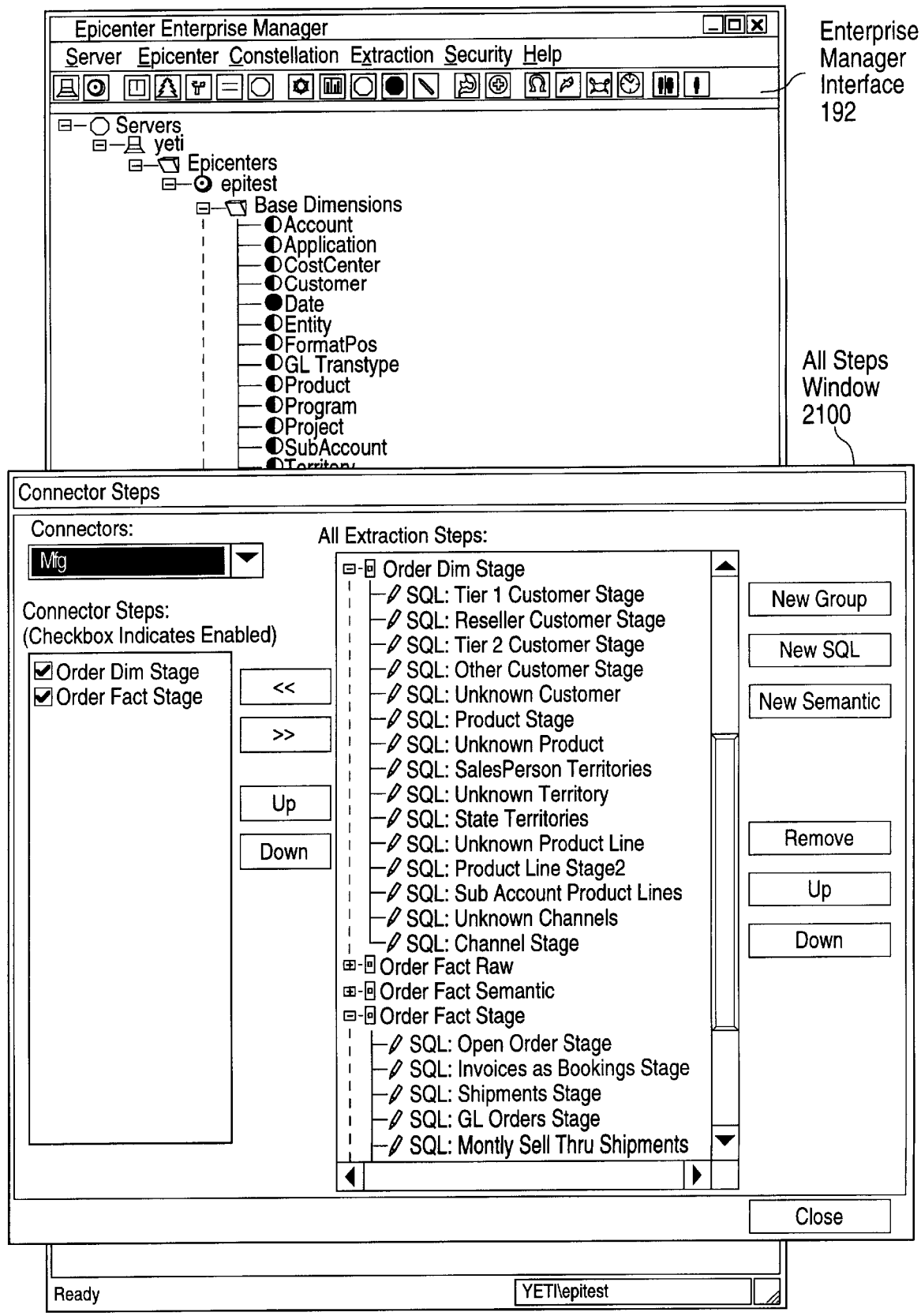

Returning to the discussion of connectors, FIG. 21 illustrates the connector entitled MFG. The MFG connector has two major steps: (1) order dimension staging, and (2) order fact staging. The results of these extraction steps are put in the staging tables 130. (The all extraction steps window 2100 illustrates all the possible steps in the system that can be used.)

Figure 22:
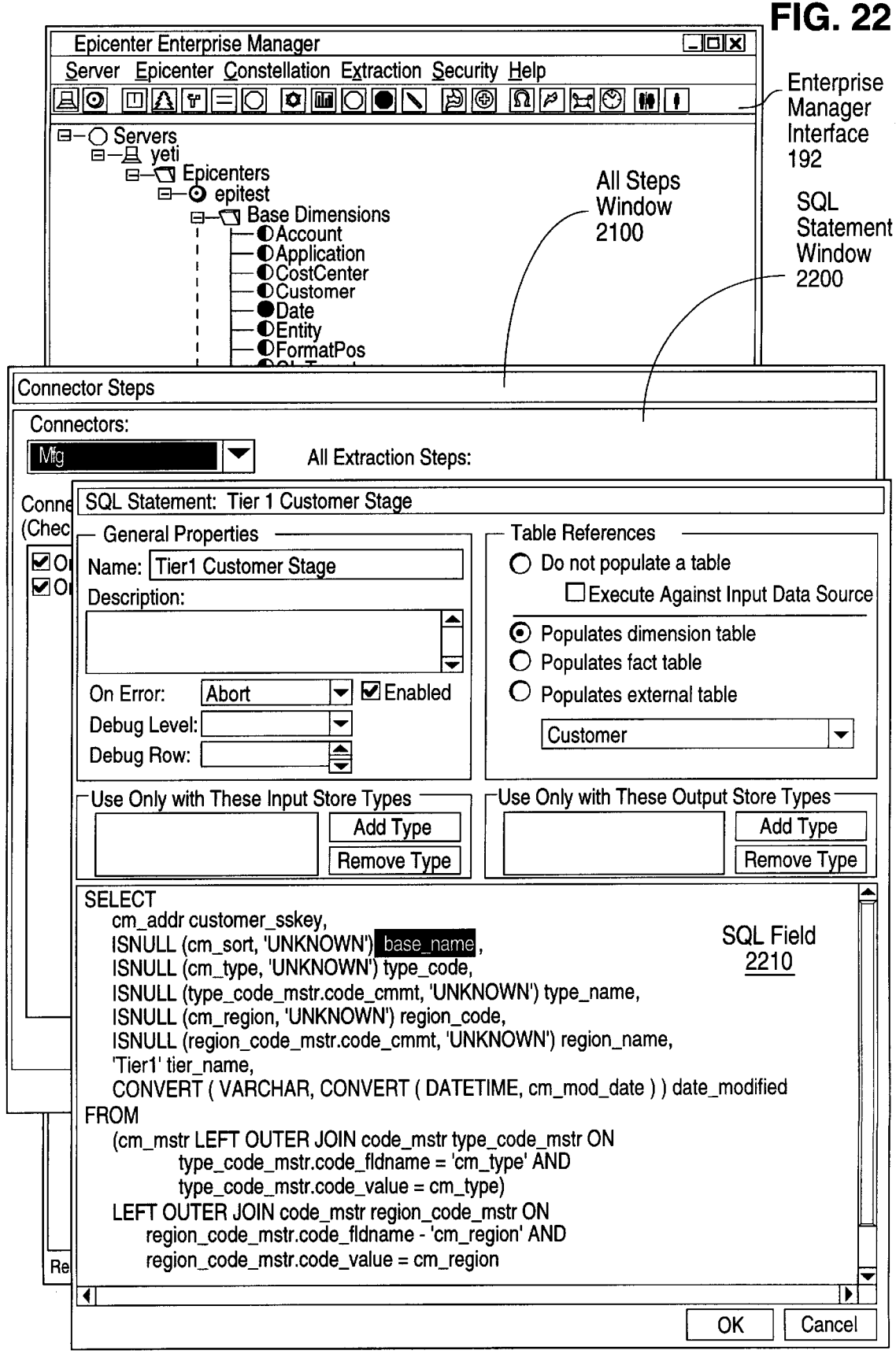

FIG. 22 illustrates the SQL statement window 2200. The SQL statement window 2200 has an SQL field 2210 that includes the SQL statements that loads a customer table. As shown in the dialog box, the table references for the SQL statement includes the customer dimension table column definitions. That is, this SQL statement is going to be used to populate the customer dimension table.

In this example, the base name, type code, type name, region code, region name and tier name corresponds to the column names within the customer dimension. The date modify is an additional field that is to be used to indicate when this field was last modified in the database. Additionally, there is a source system key that is automatically included in every dimension. The source system key helps ensure that the datamart 150 is well-formed.

In one embodiment of the invention, these names can be automatically propagated into the SQL field 2110 window via a template that is generated from the corresponding base dimension. This allows the consultant to more easily define the SQL selection statement.

Figure 23:
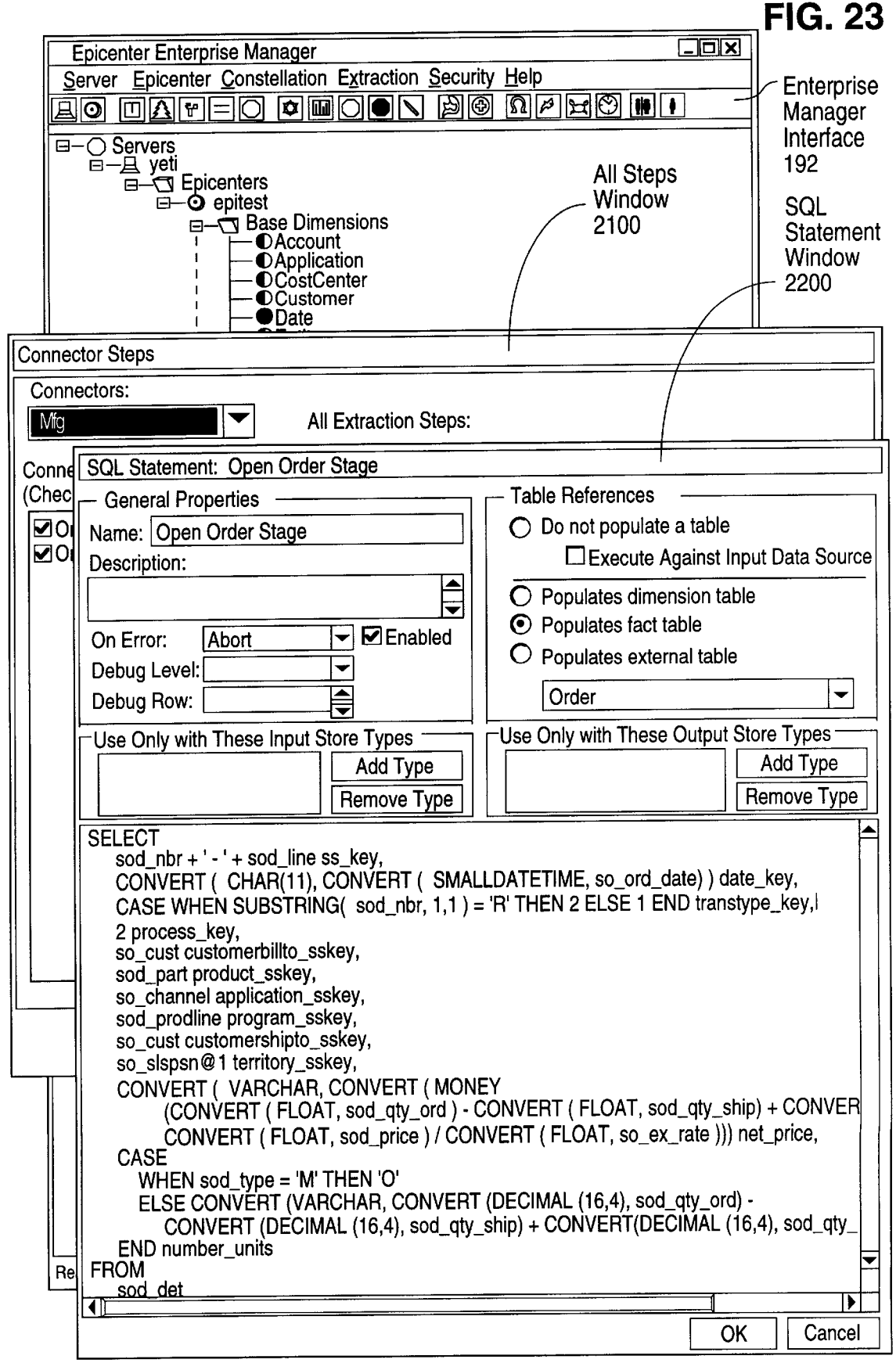

FIG. 23 illustrates the SQL statement for the Open Order Stage for populating the order fact table.

At this point the steps for generating the staging table information are complete. Now the semantic conversion steps are defined.

Figure 24:
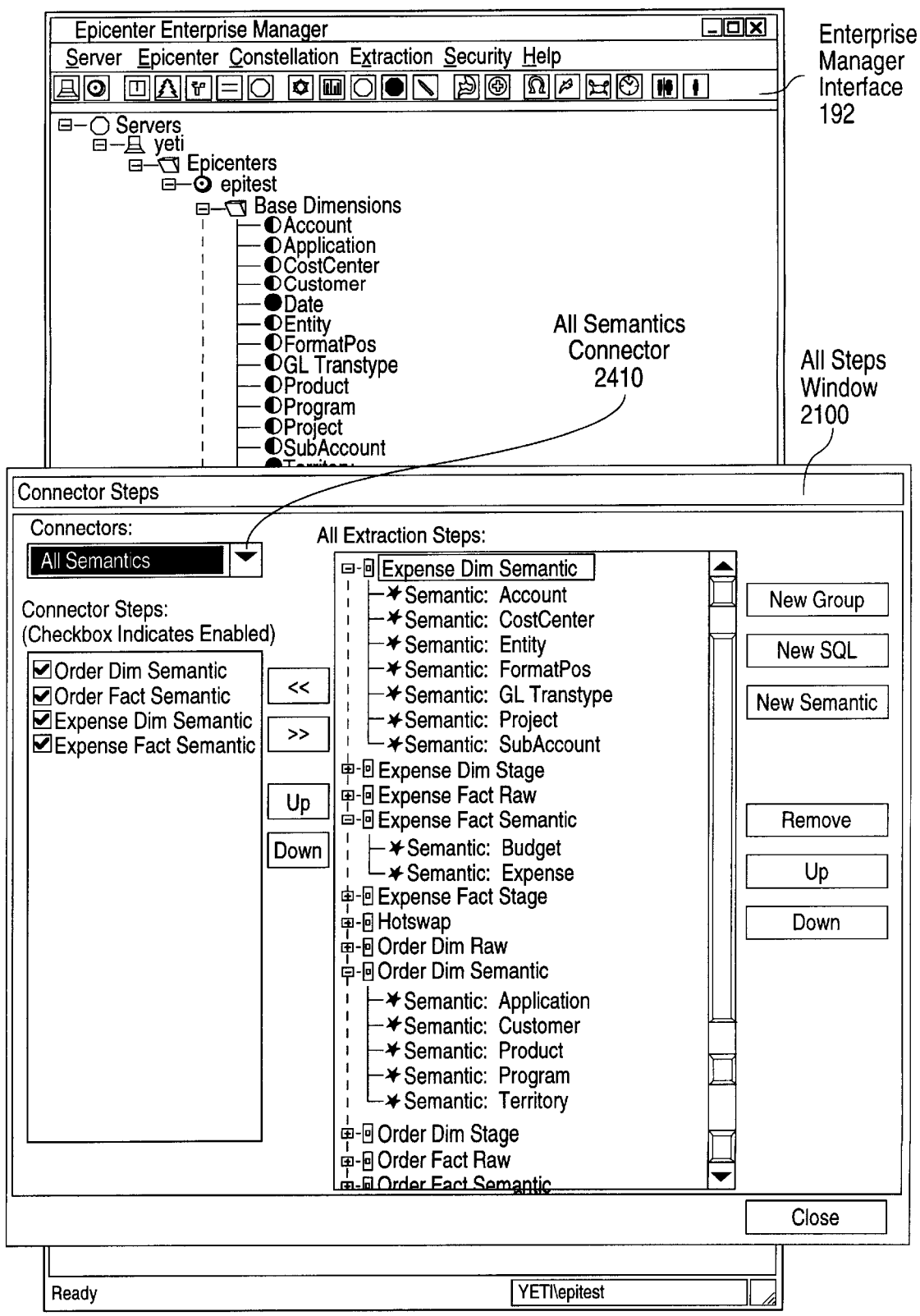

In FIG. 24, returning to the connector steps window, we have switched to an All Semantics connector 2410. The All Semantics connector 2410 causes the semantic conversion of the information in the staging table for use in the datamart 150.

Figure 25:
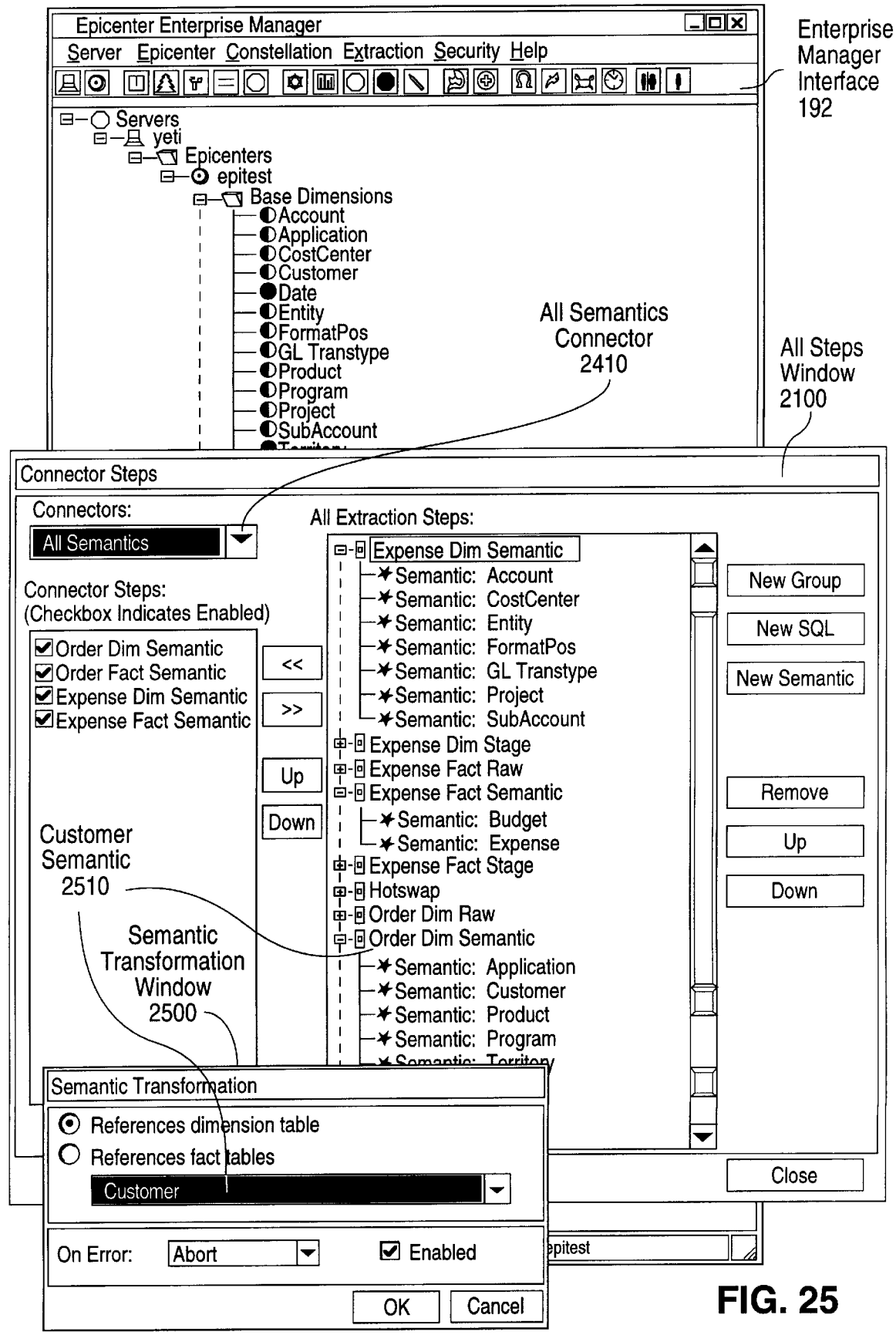

FIG. 25 illustrates the semantic transformation window 2500 showing the dimension table customer semantic 2510.

Figure 26:
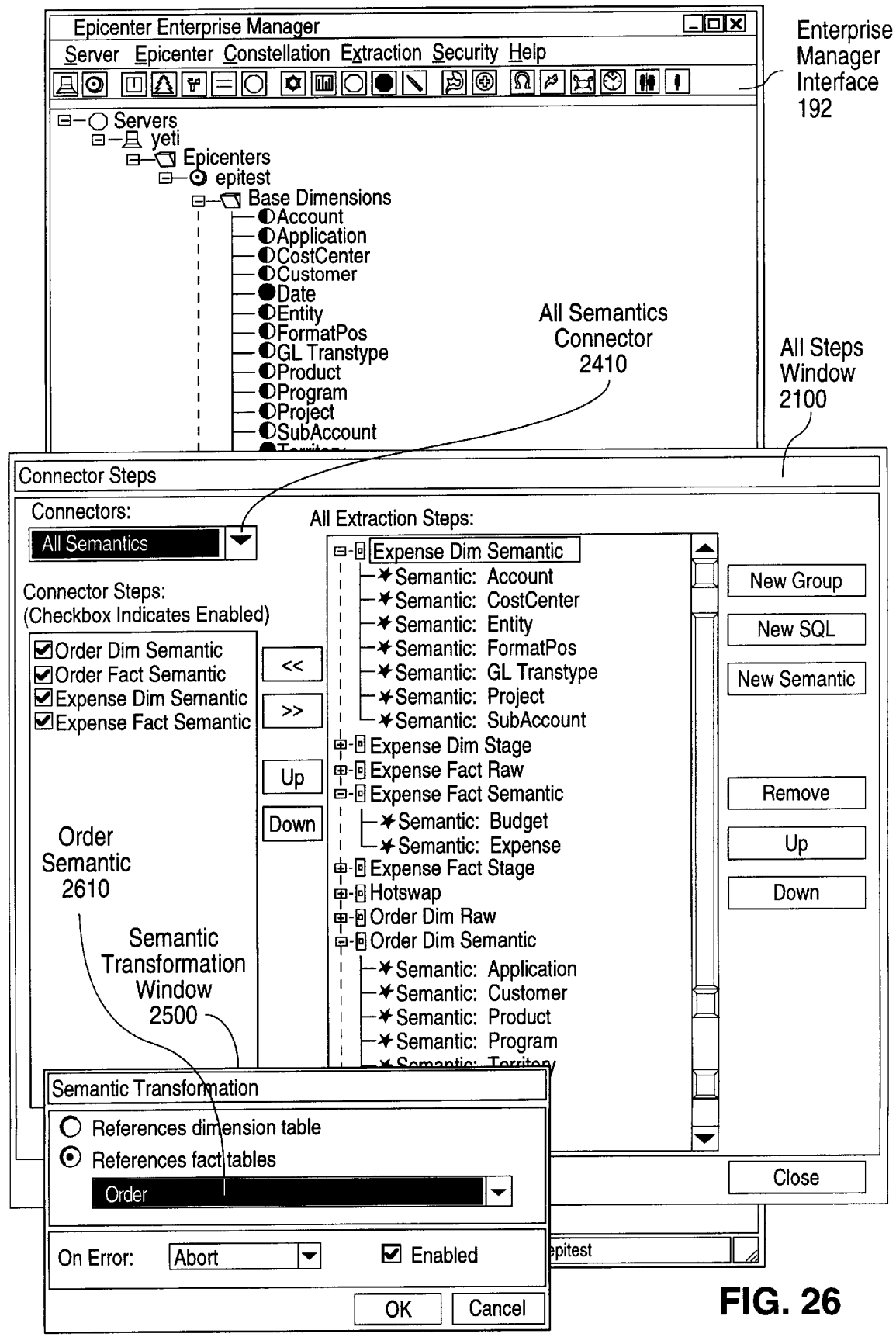

FIG. 26 illustrates the order fact semantic 2610 definition.

Figure 27:
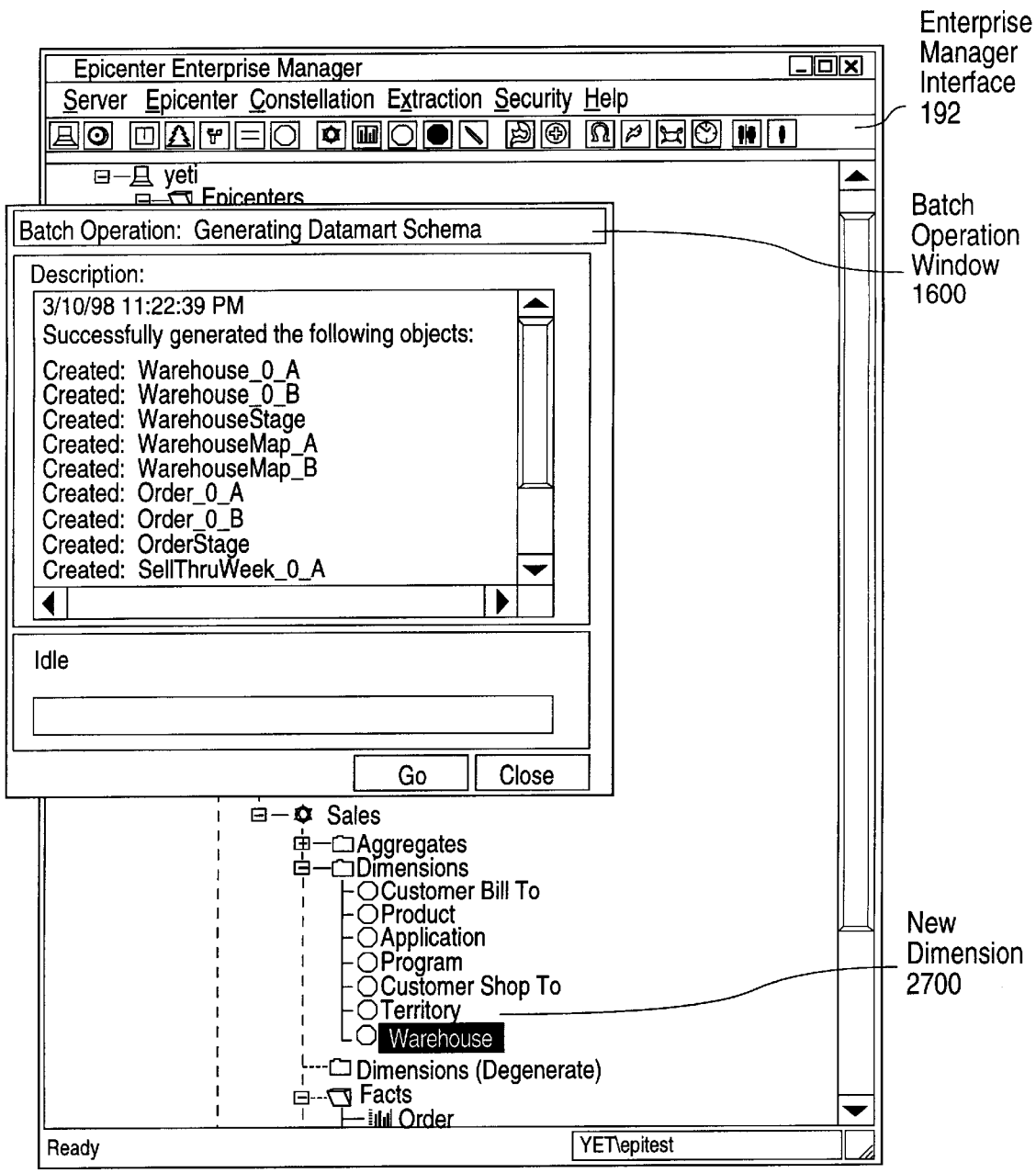

FIG. 27 illustrates the results of a consultant adding a new dimension 2700 (called warehouse) to the sales constellation 720. The batch operation window 1600 illustrates the changes that are being made to the datamart that was created in FIG. 16. To achieve these results, the consultant need only perform the following steps:

1. Define the new dimension.
2. Define the connector steps, including the SQL Statement to extract the warehouse data from the source systems 110.
3. Add the warehouse information to the Open Order Stage SQL Statement.
4. Define a semantic transformation for the warehouse, e.g., slowing changing dimension.
5. Have the enterprise manager 102 update the datamart 150.

Thus, changing the schema definition of the datamart 150 is significantly simpler than previous systems.

Additional Interface

Figure 28:
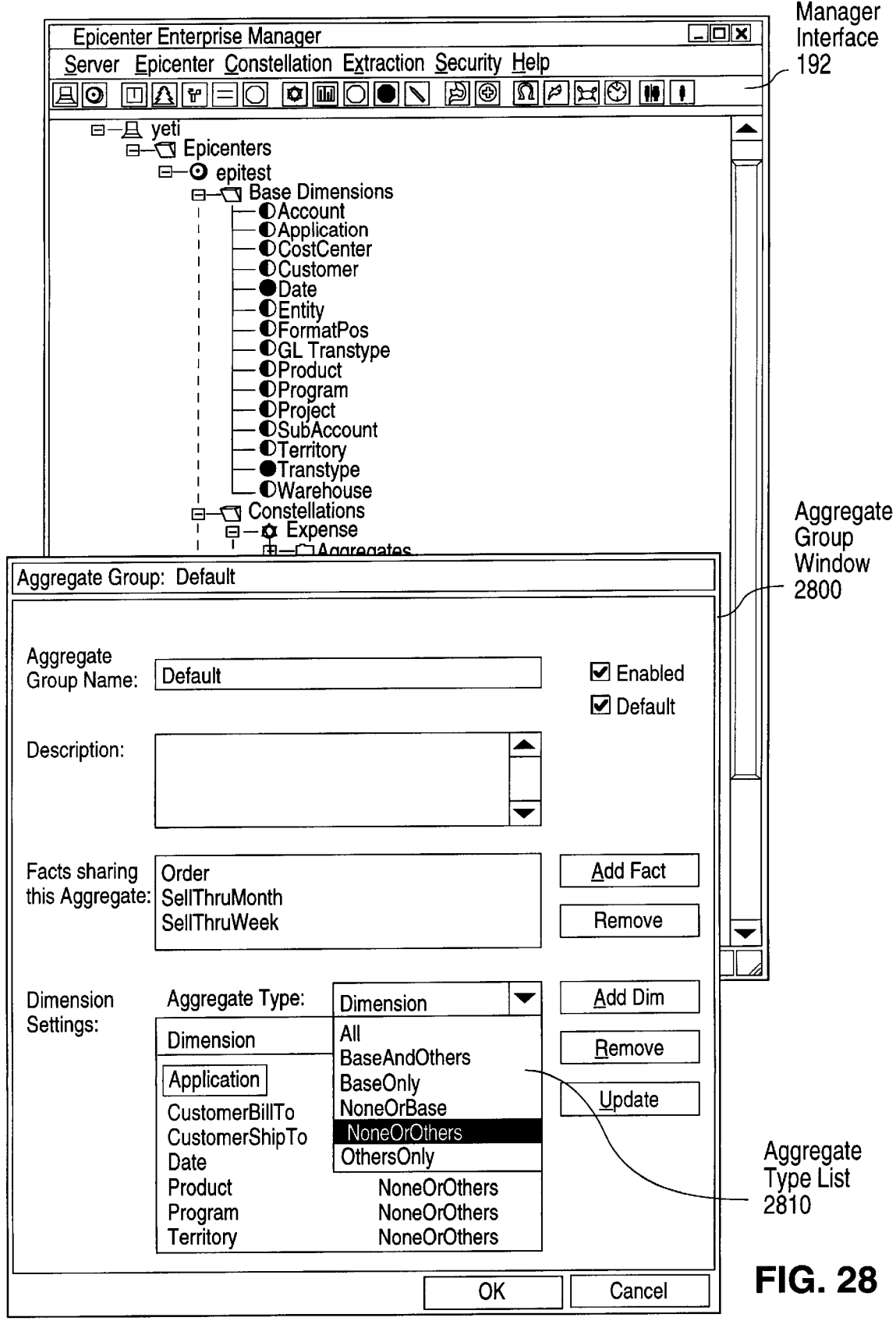

FIG. 28 illustrates the aggregate group window 2800, where aggregates can be defined. For a given aggregate group, the consultant can define which fact share the aggregate, and which type of aggregate should be built for a given dimension in the aggregate. Additionally, dimensions can be added to, or removed from, an aggregate group.

Figure 29:
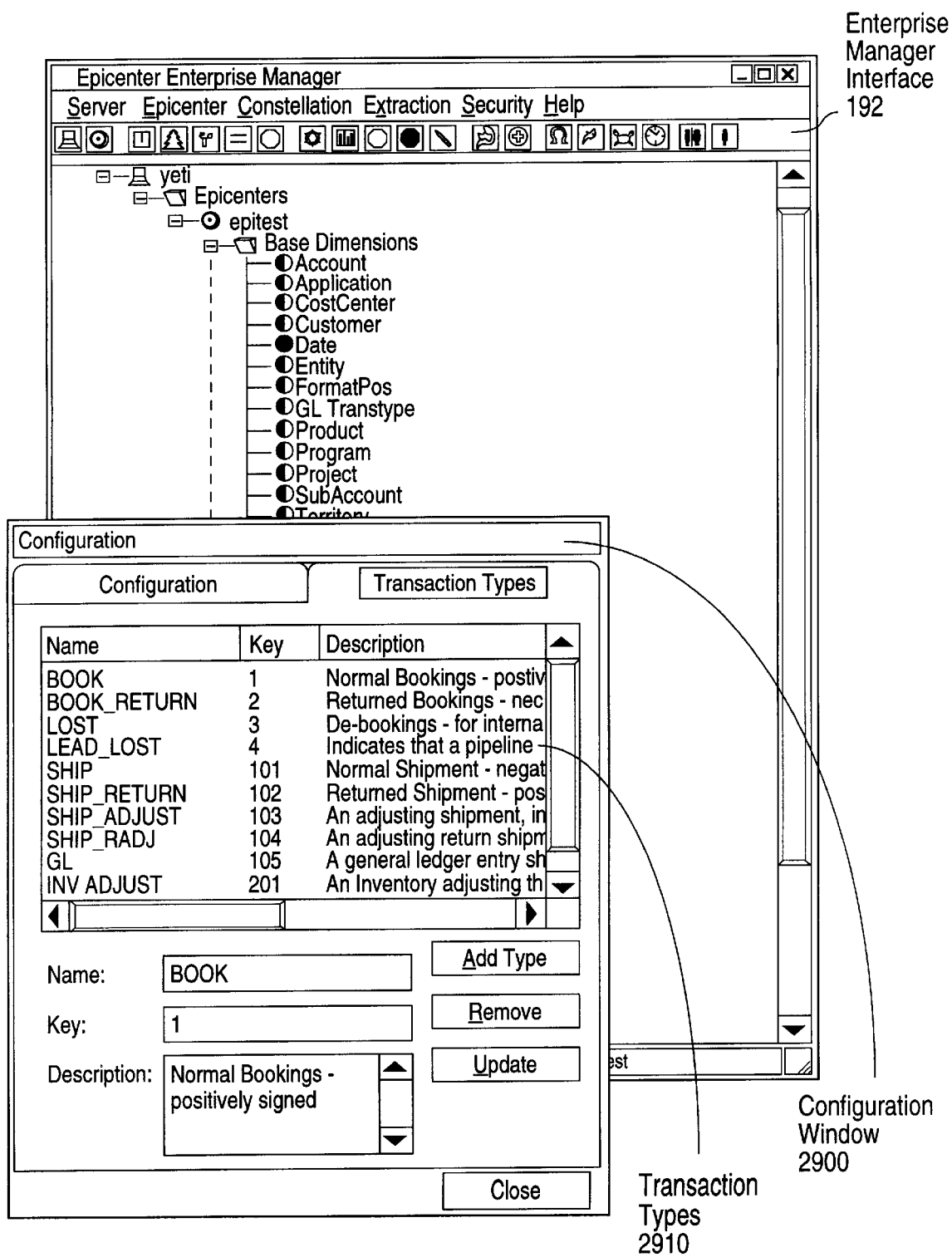

FIG. 29 illustrates a portion of the configuration window 2900. In this example, a partial list of the transaction types 2910 is shown. Thus, the consultant can determine which transaction types will be available to him/her.

End User Interface Definition and Example

Figure 30:
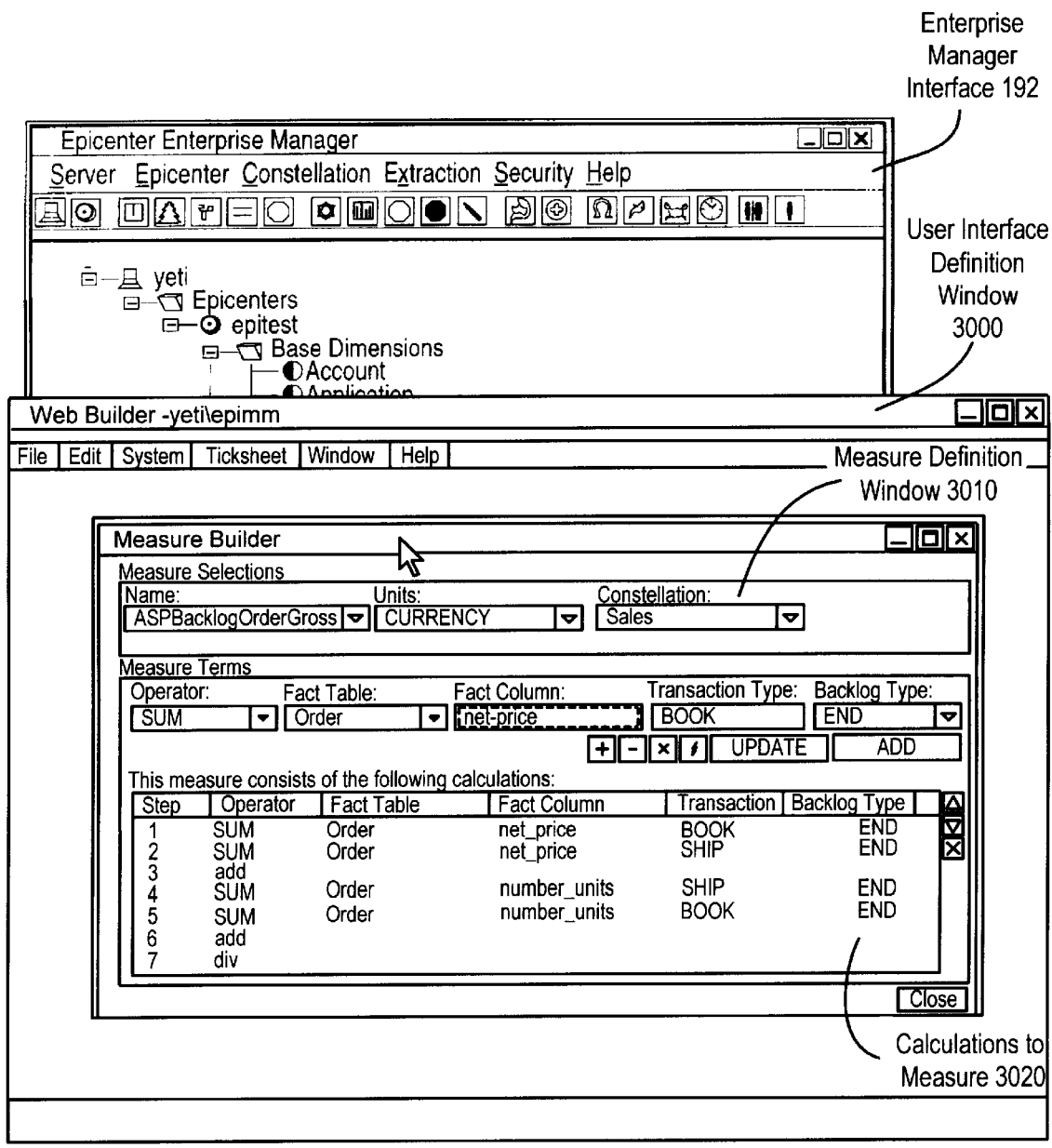

FIG. 27 illustrates the interface used to define a user interface for the end user. FIG. 30 includes a user interface definition window 3000 which can be used to define measures and ticksheets. In this case, the measure definition window 3010 is shown.

The measure definition window 3010 allows the consultant to define which measures will be available in the system. The consultant defines the name, units, and constellation for a particular measure. The measure is further defined by defining the list of measure terms that make up a measure (the calculations for the measure 3020). In this example, the ASPBacklogOrderGross measure has seven calculation steps, some of them arithmetic (e.g., SUM) and others RPN (Reverse Polish Notation).

Figure 31:
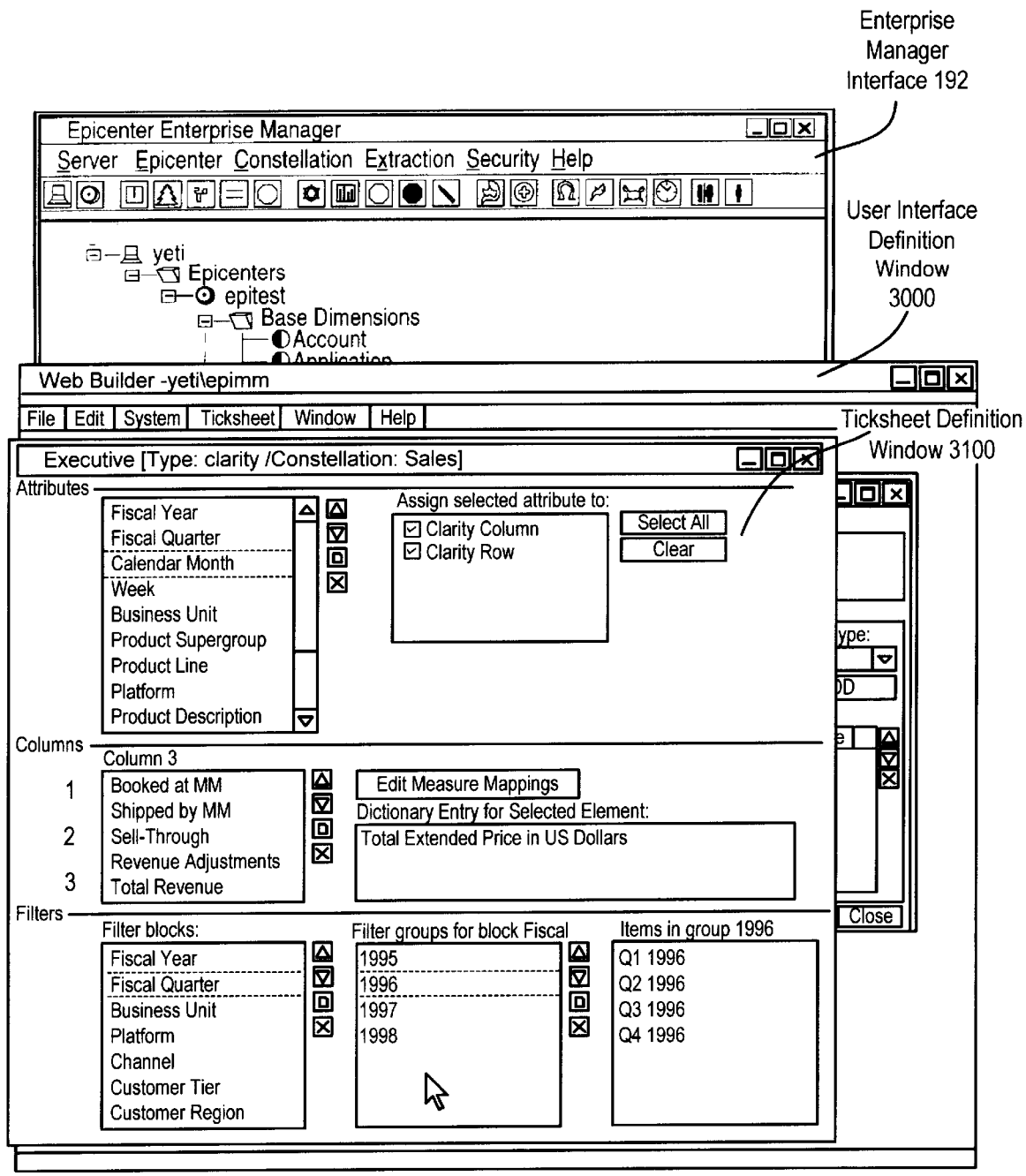
Figure 32:
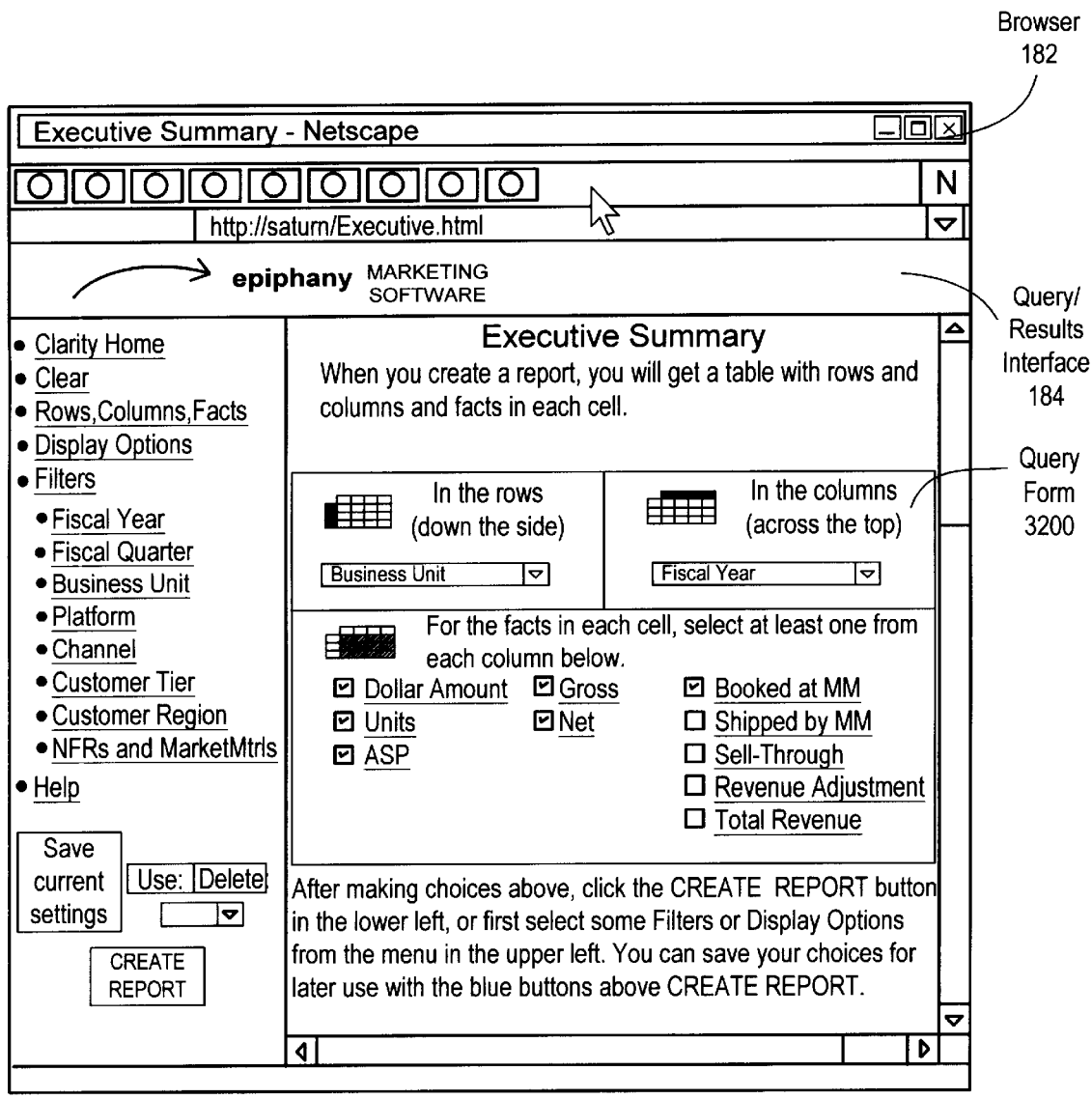

FIG. 31 illustrates the ticksheet definition window 3100. The ticksheet definition window allows a consultant to define a ticksheet that will be used to generate a query form for a user. The consultant defines the attributes, the columns, and the filters for a ticksheet. FIG. 32 illustrates the query form 3200 generated from the ticksheet defined in FIG. 31.

Figure 33:
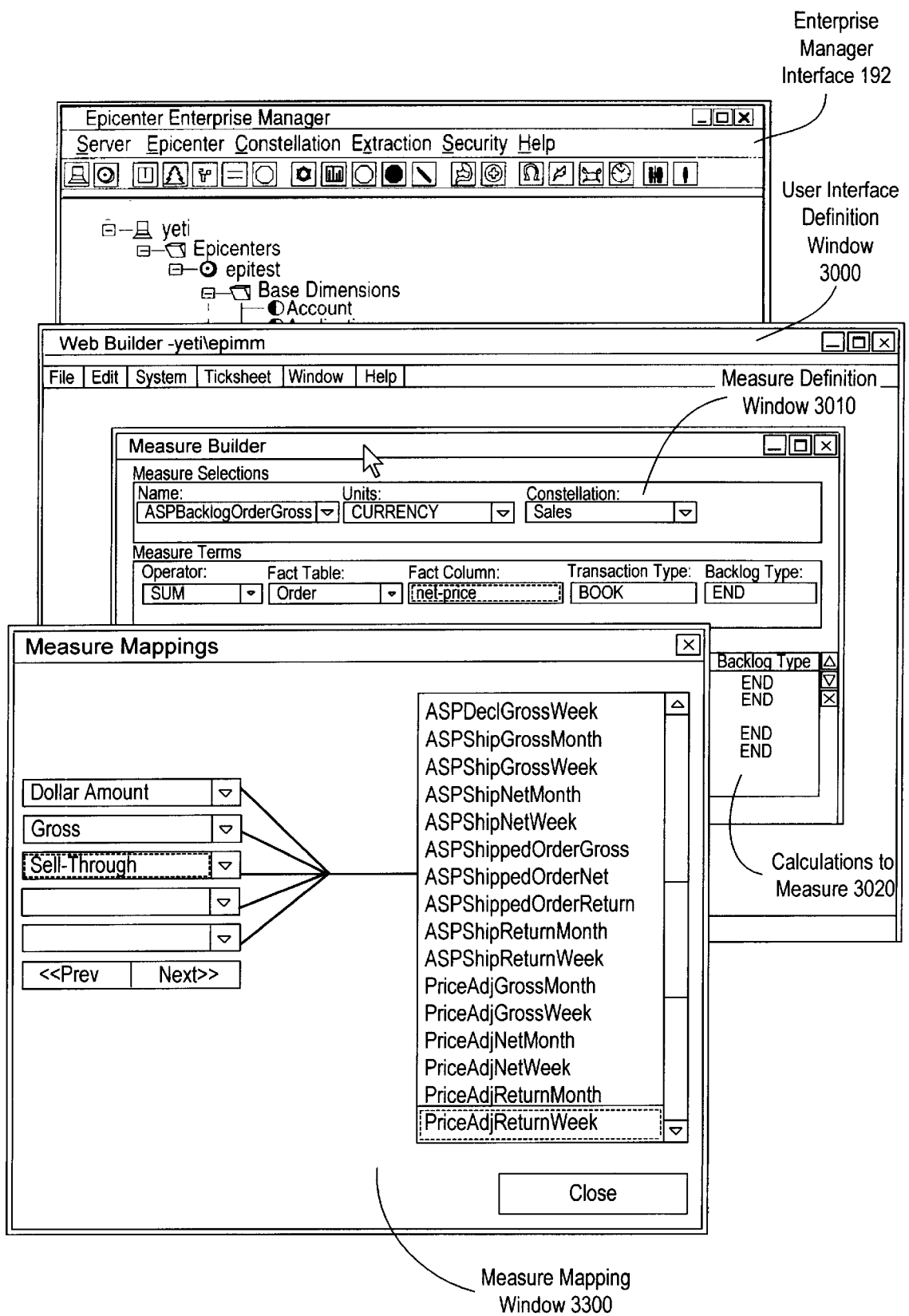

FIG. 33 illustrates the measure mappings window 3300, that allows the consultant to map measure definitions to user friendly measure names. In the example of FIG. 33, the

5

10

```
*********************************************************************
Query log
********************************************************************* time    : <A Date Here>
addr    : 192.0.0.210
host    : 192.0.0.210
user    :
agent   : Mozilla/4.01 [en] (WinNT; U)

Datebase information: DRIVER={SQL SERVER};SERVER=bigfoot;DATABASE=macromedia

Keys and values coming in from the browser:
        file =
        fileDesc =
        queryaction = QUERY
        hidden_queryaction = QUERY
        OK_callback =
        NOK_callback =
        ticksheet = Orders
        hidden_ticksheet = Orders
        Rows = Customer
        hidden_Rows = Customer
        Columns = Fiscal Year
        hidden_Columns = Fiscal Year
        units = Price
        hidden_units = Price
        facttype = Shipped
        hidden_facttype = Shipped
        facttype2 = Gross
        hidden_facttype2 = Gross
        stage = Orders
```

```
        hidden_stage = Orders
        currencyunits = Thousands
        hidden_currencyunits = Thousands
        rowtotal = yes
        hidden_rowtotal = yes
        columntotal = yes
        hidden_columntotal = yes
        percent = none
        hidden_percent = none
        precision = 0
        hidden_precision = 0
        charts = 3D
        hidden_charts = 3D
        maxrows = 10
        hidden_maxrows = 10
        rowsorttype = value
        hidden_rowsorttype = value
        Fiscal_Years = All
        hidden_Fiscal_Years = All
        Fiscal_Quarters = All
        hidden_Fiscal_Quarters = All
        Calendar_Months = All
        hidden_Calendar_Months = All
        Business_Units = All
        hidden_Business_Units = All
        Product_Lines = All
        hidden_Product_Lines = All
        Product_Supergroups = All
        hidden_Product_Supergroups = All
        Platforms = All
        hidden_Platforms = All
        Product_Languages = All
        hidden_Product_Languages = All
        Product_SKUs = All
        hidden_Product_SKUs = All
        Product_SKU =
        Sales_Reps = All
        hidden_Sales_Reps = All
        Channels = All
        hidden_Channels = All
        Customer_Types = All
        hidden_Customer_Types = All
        Customer_Regions = All
        hidden_Customer_Regions = All
        Customers = All
        hidden_Customers = All
        Customer =
        sqStyle = classic
        hidden_sqStyle = classic Contents of %FormData:
        Columns = Fiscal Year
        rowsorttype = value
        ticksheet = Orders
        Customers = All
        charts = 3D
        Customer Types = All
        Product SKUs = All
        Customer Regions = All
        Fiscal Quarters = All
        Rows = Customer
        Channels = All
        precision = 0
        Product Supergroups = All
        percent = none
        maxrows = 10
        Sales Reps = All
        columntotal = yes
        Calendar Months = All
        queryaction = QUERY
```

```
        sqStyle = classic
        Fiscal Years = All
        Product Languages = All
        Platforms = All
        Product Lines = All
        rowtotal = yes
        currencyunits = Thousands
        Business Units = All The colheaders are:

The Cellitems are:
        Price Shipped Gross Orders

The Cellitems abreviated are:
        Dollar Amount Shipped Gross Orders pid is: 310
spid is: 25
The valid collheaders are:

The invalid colheaders are:

The valid cellitems are:
        Price Shipped Gross Orders
The invalid cellitems are:

The unitstack is:
        CURRENCY
The cellstack is:
        -SUM(Order.net_price)
The selectstack is:
        -SUM(Order.net_price)
The typestack is:
        SHIP
Transtypes are:

"BEGIN_RETURN" = 1007
        "END_GROSS" = 1004
        "END_SRBOTH" = 1018
        "END_SRADJ" = 1012
        "BOOK" = 1
        "BEGIN_ANET" = 1013
        "END_IADJ" = 1024
        "END_ICOMP" = 1022
        "BEGIN_GROSS" = 1003
        "BEGIN_SRBOTH" = 1017
        "END_SBOTH" = 1016
        "END" = 1002
        "BEGIN_SRADJ" = 1011
        "END_SADJ" = 1010
        "BEGIN_IADJ" = 1023
        "BEGIN_ICOMP" = 1021
        "END_NET" = 1006
        "SHIP_ADJUST" = 103
        "LOST" = 3
        "END_SALL" = 1020
        "BEGIN_SBOTH" = 1015
        "BEGIN" = 1001
        "BEGIN_SADJ" = 1009
        "BOOK_RETURN" = 2
        "END_FADJ" = 1026
        "BEGIN_NET" = 1005
        "BEGIN_SALL" = 1019
        "GL" = 105
        "SHIP_RETURN" = 102
        "SHIP_RADJ" = 104
        "SHIP" = 101
        "END_RETURN" = 1008
```

```
        "INV_ADJUST" = 201
        "LEAD_LOST" = 4
        "BEGIN_FADJ" = 1025
        "FINV_ADJUST" = 202
        "END_ANET" = 1014
The facttable is:
        Order
The limitvalues are:

The access limitations are:

The limitvalues are:

The header took 261 milliseconds.
Parsing took 160 milliseconds.
Generating the header took 0 milliseconds.
Building user limits took 0 milliseconds.

Phase 0: Aggregate navigator initialization.
        Phase 1: Getting dimensions from SQL.    ( 10 )
        Phase 2: Getting fields available from SQL.    ( 90 )
        Phase 3: Getting degenerate fields from SQL.    ( 0 )

Phase 0: Preparing for query building and execution.R2[0 -> 0] = (SUM(Z0))
R1[0] = SUM(Z0)

The column router:
        Cell location 0 will be returned in column 0 when Type is SHIP.
The result router:
        Result location 0 is (SUM(Z0)) 0

The unique facttables are:Order

The number of unique facttables are:    1

The unique types are:SHIP
Table to unique number lookup
        Order => _0_

Begin work on the query based on the facttable Order
Phase 1: Table Order. Creating table aliases    ( 10 )
JOIN_FIELD IS CUSTOMER_BILLTO_KEY FOR Customer
JOIN_FIELD IS  FOR Fiscal Year SQL table aliases:
        Order□ : T3
        Date□ : T2
        Customer□CUSTOMER_BILLTO_KEY : T1
Table aliases:
        tablealiaslookup(T1) = Customer
        tablealiaslookup(T2) = Date
        tablealiaslookup(T3) = Order
selectalias:
        Customer: T1.base_name
        Fiscal Year: T2.fy_name
selectstackalias:
        -SUM(Order.net_price): -SUM(T3.net_price)
joinalias:
        Customer: T1.customer_key = T3.customer_billto_key
Phase 2: Building SELECT clause    ( 0 )
Phase 3: Building FROM clause    ( 0 )
Phase 4: Building WHERE clause    ( 0 )
Phase 5: Building GROUP BY clause    ( 0 )

SQL before going through the aggregate navigator:
SELECT
   Columns = T2.fy_name,
   Type = T3.Transtype_key,
   C0 = -SUM(T3.net_price),
   Rows = T1.base_name
```

```
  INTO #tmp_0_
FROM
   Customer T1,
   Date T2,
   Order T3
WHERE
   T1.customer_key = T3.customer_billto_key and
   T2.date_key = T3.date_key and
   T3.Transtype_key in (101)
GROUP BY
   T1.base_name,
   T2.fy_name,
   T3.Transtype_key

****************************************************************************
Selecting appropriate aggregate for the query.
****************************************************************************
        Phase 0: Aggregate navigator. Preparing for query building and execution.
        Phase 1: Spliting query into clauses.   ( 0 )
        Phase 2: Construction of aliases.   ( 0 )
        Phase 3: Extracting neededfields from where clause.   ( 0 )
        Phase 4: Extracting neededfields from group by clause.   ( 0 )
        Phase 5: Extracting neededfields from select clause.   ( 0 )
        Phase 6: Unaliasing.   ( 0 )
        Phase 7: Constructing the SQL to fetch smallest aggregate.   ( 20 )
        Phase 8: Running the big SQL.   ( 20 )
        Phase 9: Extracting results from the big SQL.   ( 0 )
        Phase 10: Adjusting input with aggregate information.   ( 0 )
Phase 6: Aggregate Navigating    ( 40 )

****************************************************************************
Appropriate aggregate determined (CUSTOMER_0, DATE_4, ORDER_86), now select
****************************************************************************
SQL after going through the aggregate navigator:
SELECT
   Columns = T2.fy_name,
   Type = T3.Transtype_key,
   C0 = -SUM(T3.net_price),
   Rows = T1.base_name
 INTO  #tmp_0_
 FROM
   CUSTOMER_0 T1,
   DATE_4 T2,
   Order_86 T3
 WHERE
   T1.customer_key = T3.customer_billto_key and
   T2.date_key = T3.date_key and
   T3.Transtype_key in (101)
 GROUP BY
   T1.base_name,
   T2.fy_name,
   T3.Transtype_key Phase 7: Building results table in sql    ( 10435 )
Phase 15: Splitting tables by type (needed = 0)    ( 0 )
Phase 16: Merging results into one table (needed = 0)    ( 0 )GR_COLS = C0 = SUM(C0)

SQL: SELECT Rows INTO #tmpAllRows FROM #tmp_0_ GROUP BY Rows ORDER BY SUM(C0) DESC
SQL: SELECT count(Rows) FROM #tmpAllRows
Phase 17: Extracting rows and doing number of total records (10508/10498)    ( 1022 )
SQL: set rowcount 10
SELECT Rows INTO #tmpTopRows FROM #tmpAllRows
set rowcount 0

Phase 19: Sorting, Top (needed = 10498)    ( 10 )

-- creating row totals
SELECT
   #tmp_0_.Rows,
```

```
     C0 = SUM(C0)
INTO #tmpRows
FROM #tmp_0_, #tmpTopRows
WHERE #tmp_0_.Rows = #tmpTopRows.Rows
GROUP BY #tmp_0_.Rows -- creating col, grand totals
SELECT
   Columns,
   C0 = SUM(C0)
INTO #tmpColumns
FROM #tmp_0_
GROUP BY Columns Checking ADJ of GRAND SQL: SELECT C0 = SUM(C0) INTO #tmpGrand FROM #tmpColumns -- final results table
SELECT #tmp_0_.Rows, Columns, C0
INTO #tmpFinalResults
FROM #tmp_0_, #tmpTopRows
WHERE #tmp_0_.Rows = #tmpTopRows.Rows Phase 20: Filtering results    ( 841 )
Phase 21: Reading Row Totals    ( 10 )
Phase 22: Reading Column Totals    ( 10 )
Phase 23: Reading Grand    ( 10 )
SQL:
-- calculate remaining columns
SELECT
Columns = #tmpColumns.Columns,
C0 = #tmpColumns.C0 - ISNULL(SUM(#tmpFinalResults.C0),0)
INTO #tmpRemaining
FROM #tmpFinalResults, #tmpColumns
WHERE #tmpColumns.Columns *= #tmpFinalResults.Columns
GROUP BY #tmpColumns.Columns, #tmpColumns.C0
select C0 = SUM(C0) from #tmpRemaining Phase 24: Reading Remaining Column Totals (needed = 10498)    ( 20 )
Phase 25: Final Results    ( 30 )
Phase 26: Sorting columns by time (if necessary).    ( 20 )
Phase 27: sorting rows by time or name (if necessary).    ( 0 )ERR FROM BUILD_AND_EXEC:0

Getting results took 12658 milliseconds.

Phase 0: Begining output generation.
Phase 3: performing cumulative (if necessary).    ( 0 )

Dollar Amount / Shipped / Gross
The columns are: 1994
        1995
        1996
        1997
        1998
The rows are: ******* A number of customer names here *************

The table headers are:
The contents of the results array are:
        *****************
        A number of customer name, value pairs
        *****************
The contents of the rowtotal array are:<
        key: *****Row totals*****<
        ...

The contents of the coltotal array are:
        1995: ******An amount******
        1996: ******An amount******
```

```
        1997: ******An amount******
        1998: ******An amount******
        1994: ******An amount******
The contents of the grdtotal array are:
        Grand: *******A grand total amount*******

Processing and formatting results took 220 milliseconds.
Total time was 13299 milliseconds.

Processing sylk took 81 milliseconds.
```

PriceShipGrossMonth measure is mapped to a combination of the dollar amount, gross, and sell-through being selected in the query form 3200.

Figure 34:
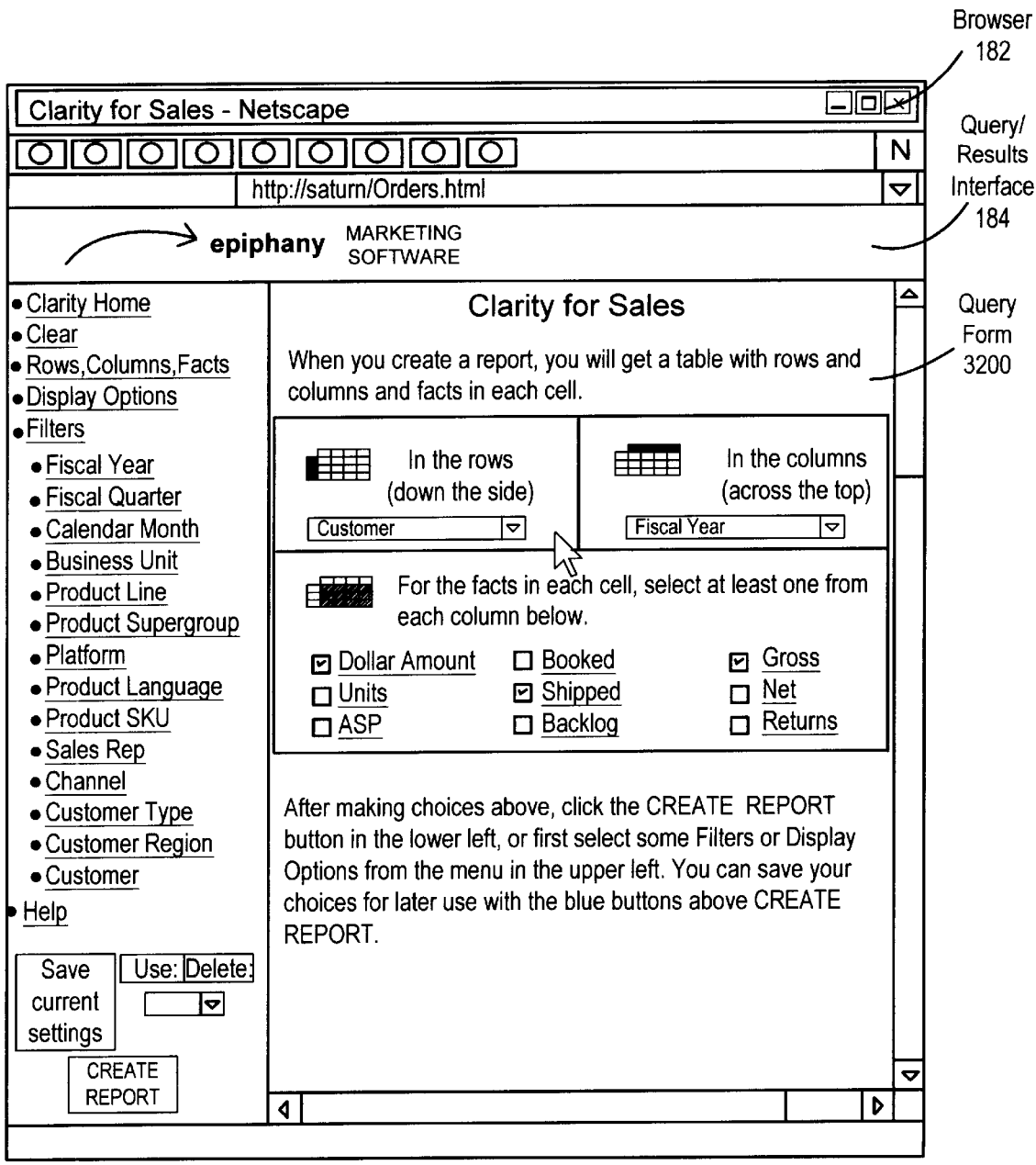
Figure 35:
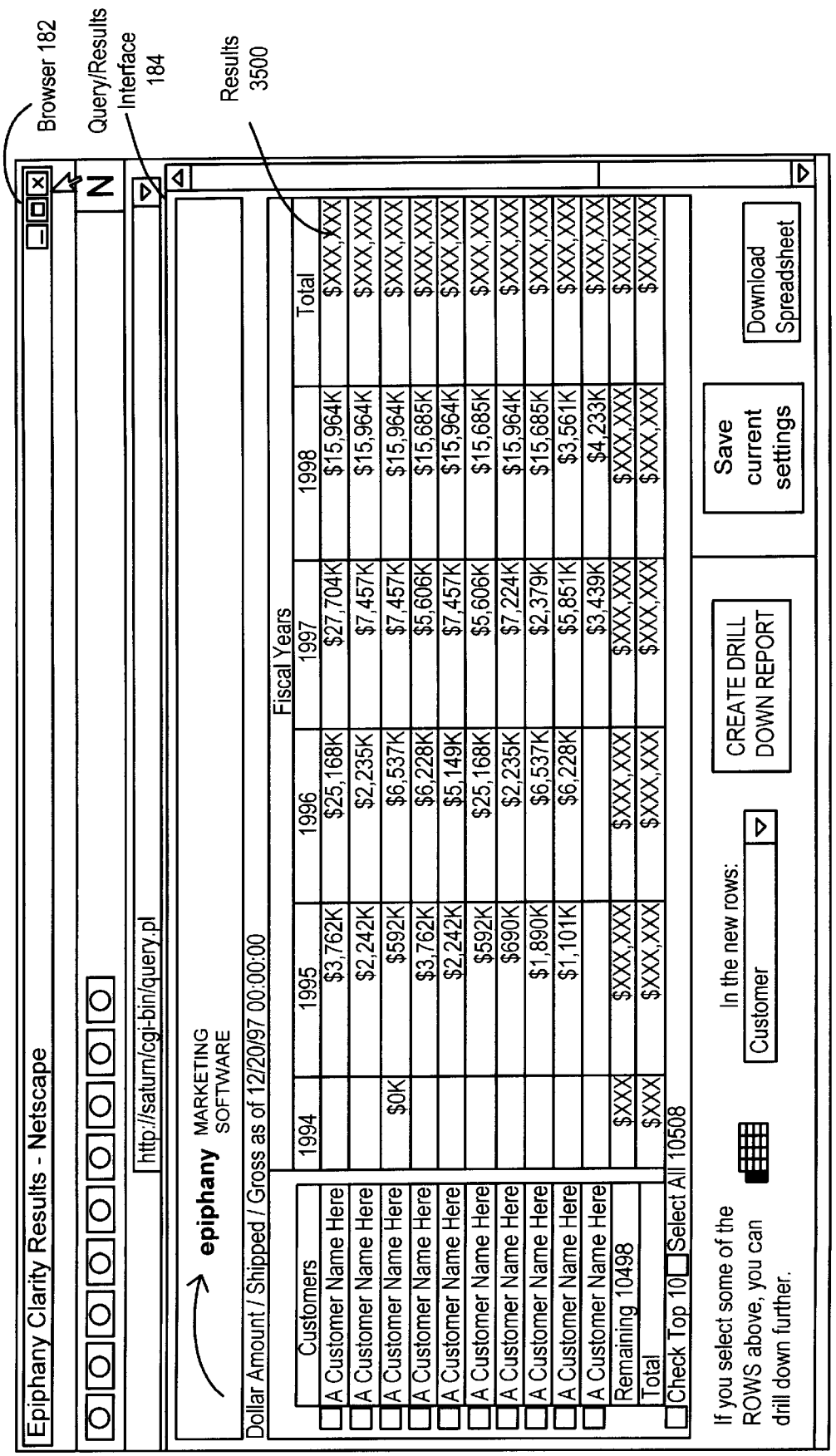

FIG. 34 illustrates another query form 3200 generated from a different ticksheet definition. When the user selects the create report button, the query is issued against the datamart 150. FIG. 35 illustrates some sample results from such a query.

The following query log illustrates the actual query that was executed against the datamart 150. The query log illustrates that an aggregate and navigation process determined which aggregate would be the most appropriate. The aggregate builder had created these aggregates. The most appropriate aggregate for the requested query was selected. The results were then returned.

Figure 36:
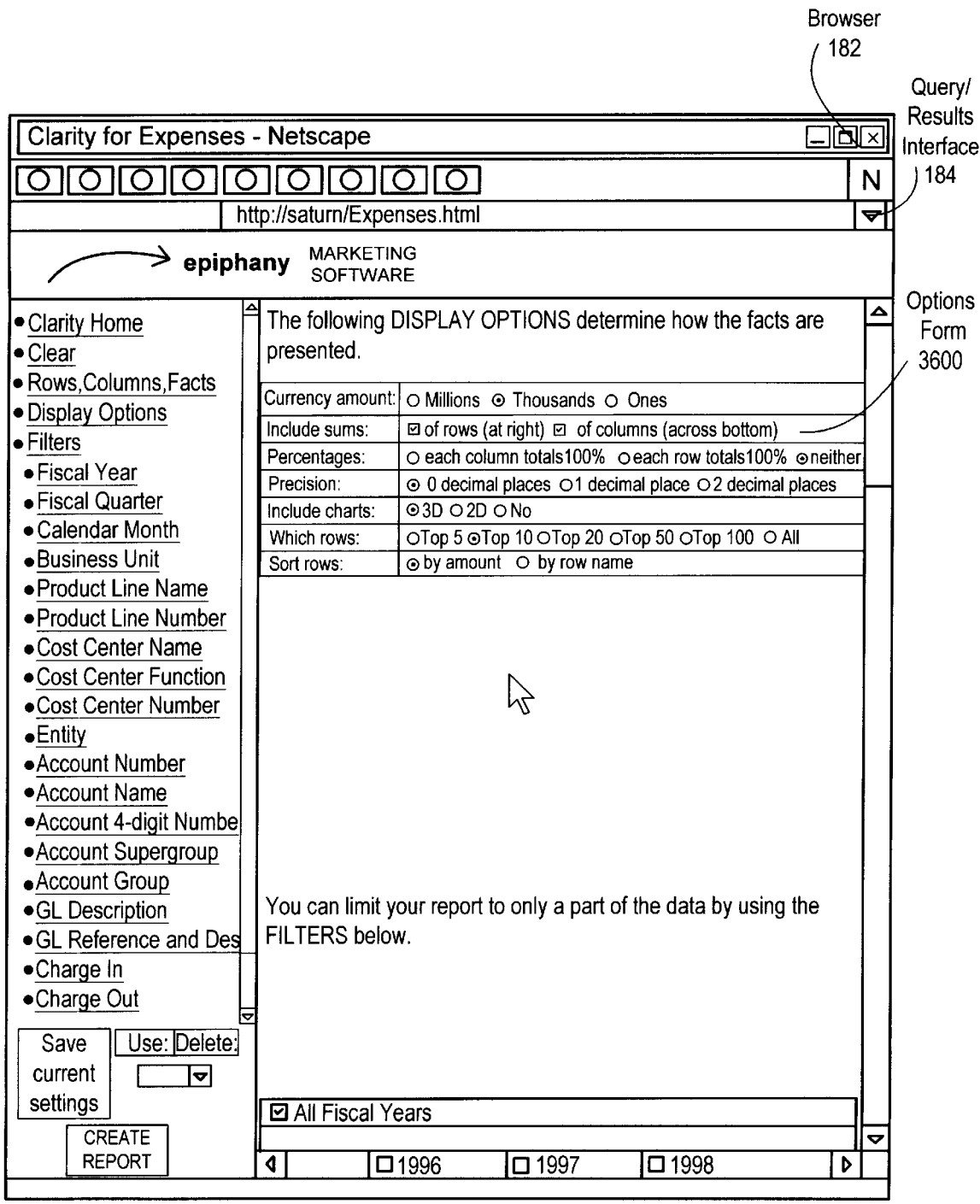

FIG. 36 illustrates the options form 3600 that the user can use to select the display options for a result.

Alternative Embodiments

The following describes alternative embodiments of the invention.

Importantly, various embodiments of the invention do not necessarily include all of the features described above. For example, some embodiments of the invention do not include the first phase of the extraction process (loading the staging tables) because the source system data is provided to the system 100 directly by other extraction programs. Another example is where the datamart 150 is created, but a separate query interface is used to query the datamart 150. The query interface could use only a different communications protocol (e.g., instead of HTTP), or could be a completely different front end.

Other embodiments of the invention are configured differently than the embodiments described above. For example, the extraction node key in the semantic instance table 308 is not included, but the extraction node 410 includes a semantic instance key.

What is claimed is:

1. A method of generating a datamart, the datamart including a set of tables having rows and columns, at least some of the tables of the set of tables being related, the method comprising:

accessing a description of a schema, the schema defining the relationships between the tables of the set of tables, the description of the schema including a definition of a fact table, one or more dimensions, and a set of relations between the fact table and the one or more dimensions that corresponds to a star schema;

generating a set of commands to create the set of tables, the set of commands being generated from the description;

executing the set of commands to generate the set of tables; and wherein, the set of commands further includes commands for accessing and manipulating the set of tables.

2. The method of claim 1 further comprising generating a second set of commands to convert imported data into data for use in the datamart, the imported data being the data imported into the datamart.

3. The method of claim 1, wherein the fact table, the one or more dimensions and the set of relations, are included in the definition of a constellation, wherein the constellation corresponds to a business process.

4. The method of claim 3 wherein the results of the query are used to generate a set of generate table commands, and wherein the set of commands includes the set of generate table commands.

5. The method of claim 1 wherein the generating the set of commands includes performing a query on the description, the results of performing the query being used to generate the set of commands.

6. The method of claim 5 wherein the query includes a dimension staging table query, a dimension table query, a dimension mapping table query, a fact table query, and a fact staging table query.

7. The method of claim 1 wherein the set of commands includes a plurality of SQL statements, wherein the datamart is generated using a database that is responsive to SQL statements, and wherein the executing the set of commands to generate the set of tables includes transmitting the set of SQL statements to the database, and the database executing the set of SQL statements to generate the set of tables.

8. The method of claim 1, wherein the generating the second set of commands includes accessing the description to determine a set of operations to import the data into the datamart, the set of operations corresponding to one or more templates, and wherein the generating the second set of commands includes substituting source specific identifiers for generic identifiers inside the templates.

9. The method of claim 8 wherein a template of the set of templates includes SQL statements for manipulating data in a database.

10. The method of claim 1 wherein the second set of commands includes commands for accessing one or more source systems, and for extracting the data from the one or more source systems.

11. The method of claim 1 wherein generating the set of tables includes issuing a plurality of generate table commands.

12. The method of claim 1 wherein generating the set of tables include issuing a plurality of modify table commands.

13. A method of automatically extracting data from a datamart, the method comprising:

using a set of source system access definitions to extract source system data from one or more source systems, the source system data being stored in a set of temporary tables; and using a set of predetermined data semantic definitions to automatically convert the source system data to data having a corresponding semantic meaning for the datamart, wherein converting the source system data includes converting data stored in the temporary tables.

14. The method of claim 13 wherein the source system access definitions include one or more query language statements, wherein each query language statement is for accessing a set of data from a source system, and wherein the source system data is extracted by issuing the query language statement to a source system.

15. The method of claim 13 wherein the using the set of predetermined data semantic definitions to automatically convert the source system data to data having a corresponding semantic meaning includes accessing a predefined template, wherein the predefined template performs at least one step in converting the source system data into the data having the predetermined semantic meaning.

16. The method of claim 15 wherein the predefined template includes a plurality of tokens, and wherein the step of converting includes replacing the plurality of tokens with information from a schema definition for the datamart.

17. The method of claim 13 wherein the predetermined data semantic definition includes a slowly changing dimension data semantic, and wherein the data from the source system is converted into data for the datamart that represents a slowly changing dimension within the datamart.

18. A system comprising:

a database;

a first program for accessing a definition of the schema for the database, the first program further for using the definition to generate a set of create table commands and for issuing the set of create table commands to the database, the first program further for accessing a definition of how to populate the database and the definition of the schema to populate the database and a set of staging tables and wherein the first program populates the database by moving data into the staging tables, manipulating the data according to a corresponding semantic meaning for the data, and for populating the data into the database according to the corresponding semantic meaning.

19. The system of claim 18 wherein the semantic meaning defines a set of operations to be performed on the data in the staging tables.

20. A computer program product comprising:

a memory medium; and a computer program stored on the memory medium, the computer program comprising instructions for accessing a description of a schema, the schema defining the relationships between the tables of the set of tables, generating a set of commands to create the set of tables, the set of commands being generated from the description, executing the set of commands to generate the set of tables, wherein, the set of commands further includes commands for accessing and manipulating the set of tables, the description of the schema including a definition of a fact table, one or more dimensions, and a set of relations between the fact table and the one or more dimensions that corresponds to a star schema.

21. A computer data signal embodied in a carrier wave comprising:

a computer program, the computer program comprising instructions for accessing a description of a schema, the schema defining the relationships between the tables of the set of tables, generating a set of commands to create the set of tables, the set of commands being generated from the description, executing the set of commands to generate the set of tables, wherein, the set of commands further includes commands for accessing and manipulating the set of tables, the description of the schema including a definition of a fact table, one or more dimensions, and a set of relations between the fact table and the one or more dimensions that corresponds to a star schema.

* * * * *